(12) United States Patent
Lee et al.

(10) Patent No.: US 11,007,695 B2
(45) Date of Patent: May 18, 2021

(54) ACTUATOR COOLING APPARATUS AND METHOD

(71) Applicant: Synventive Molding Solutions, Inc., Peabody, MA (US)

(72) Inventors: Christopher Lee, Beverly, MA (US); Vito Galati, Rowley, MA (US)

(73) Assignee: Synventive Molding Solutions, Inc., Peabody, MA (US)

(*) Notice: Subject to any disclaimer, the term of this patent is extended or adjusted under 35 U.S.C. 154(b) by 150 days.

(21) Appl. No.: 15/811,877

(22) Filed: Nov. 14, 2017

(65) Prior Publication Data

US 2018/0079121 A1 Mar. 22, 2018

Related U.S. Application Data

(63) Continuation-in-part of application No. 15/204,555, filed on Jul. 7, 2016, now Pat. No. 10,005,215, which is a continuation of application No. PCT/US2016/016944, filed on Feb. 8, 2016, application No. 15/811,877, which is a continuation
(Continued)

(51) Int. Cl.
*B29C 45/73* (2006.01)
*B29C 45/28* (2006.01)
*B29C 45/72* (2006.01)

(52) U.S. Cl.
CPC ........ *B29C 45/7331* (2013.01); *B29C 45/281* (2013.01); *B29C 45/2806* (2013.01); *B29C 45/72* (2013.01); *B29C 45/73* (2013.01); *B29C 2045/2868* (2013.01);
(Continued)

(58) Field of Classification Search
CPC .... B29C 45/281; B29C 45/73; B29C 45/7331
See application file for complete search history.

(56) References Cited

U.S. PATENT DOCUMENTS 6,294,122 B1 9/2001 Moss et al.
6,343,925 B1 2/2002 Jenko
(Continued)

FOREIGN PATENT DOCUMENTS

EP 1223018 B1 5/2005
WO 0178962 A1 10/2001
(Continued)

OTHER PUBLICATIONS

Int'l. Search Report and Written Opinion dated Apr. 22, 2016 in corresponding Int'l. Appln. No. PCT/US2016/016944.
(Continued)

*Primary Examiner* — James Sanders
(74) *Attorney, Agent, or Firm* — Polsinelli, PC

(57) ABSTRACT

An injection molding apparatus (5) comprising:
an actuator (10) comprising a rotor (60) driven by a drive device (174) that consumes electrical energy (187) that generates heat,
a thermal conductor (500) comprised of a thermally conductive material,
a clamp plate (80) being mounted in thermal communication with the thermal conductor,
a conductive surface (500s) of the thermal conductor being urged into contact with the clamp plate (80) under a spring force (SF) exerted between the actuator (10) and the thermal conductor (500), the heat (197) generated by the electrical energy (187) being conducted from the actuator housing (12) to the clamp plate (80).

39 Claims, 28 Drawing Sheets

Related U.S. Application Data of application No. PCT/US2017/059641, filed on Nov. 2, 2017.

(60) Provisional application No. 62/135,871, filed on Mar. 20, 2015, provisional application No. 62/421,696, filed on Nov. 14, 2016.

(52) U.S. Cl.
CPC ............... *B29C 2045/7271* (2013.01); *B29C 2045/735* (2013.01); *B29K 2995/0013* (2013.01)

(56) References Cited

U.S. PATENT DOCUMENTS

| | | |
|---|---|---|
| 6,555,044 B2 | 4/2003 | Jenko |
| 6,729,871 B2 | 5/2004 | Sattler et al. |
| 8,562,336 B2 | 10/2013 | Lee |
| 2005/0123641 A1 | 6/2005 | Kim |
| 2006/0147577 A1 | 7/2006 | Tooman |
| 2012/0231109 A1 | 9/2012 | Lee |
| 2014/0035563 A1 | 2/2014 | Tan et al. |
| 2014/0353875 A1 | 12/2014 | Tan et al. |

FOREIGN PATENT DOCUMENTS

| | | |
|---|---|---|
| WO | 2009052611 A1 | 4/2009 |
| WO | 2011119791 A1 | 9/2011 |
| WO | 2014/153330 A1 | 9/2014 |
| WO | 2014153330 A1 | 9/2014 |
| WO | 2015/006261 A1 | 1/2015 |
| WO | 2015006261 A1 | 1/2015 |
| WO | 2016/153704 A1 | 9/2016 |
| WO | 2016153704 A1 | 9/2016 |

OTHER PUBLICATIONS

Int'l. Search Report and Written Opinion dated Feb. 5, 2015 in corresponding Int'l. Appln. No. PCT/US2014/051026.
Written Opinion dated Apr. 12, 2016 in corresponding Int'l. Appln. No. PCT/US2014/051026.
Bill Rousseau: "Know Your Options in Valve-Gated Hot Runners", Jul. 29, 2016, pp. 1-5, www.ptoline.com.
International Search Report and Written Opinion for corresponding PCT Application No. PCT/US2017/0569641; dated Feb. 5, 2018.
Know Your Option in Valve-Gated Hot Runners by Bill Rousseau, Director of Applications and Technical Services, Synventive Molding Solutions, posted Jul. 29, 2016.
International Search Report and Written Opinion in PCT/US2017/059641, dated May 2, 2018.

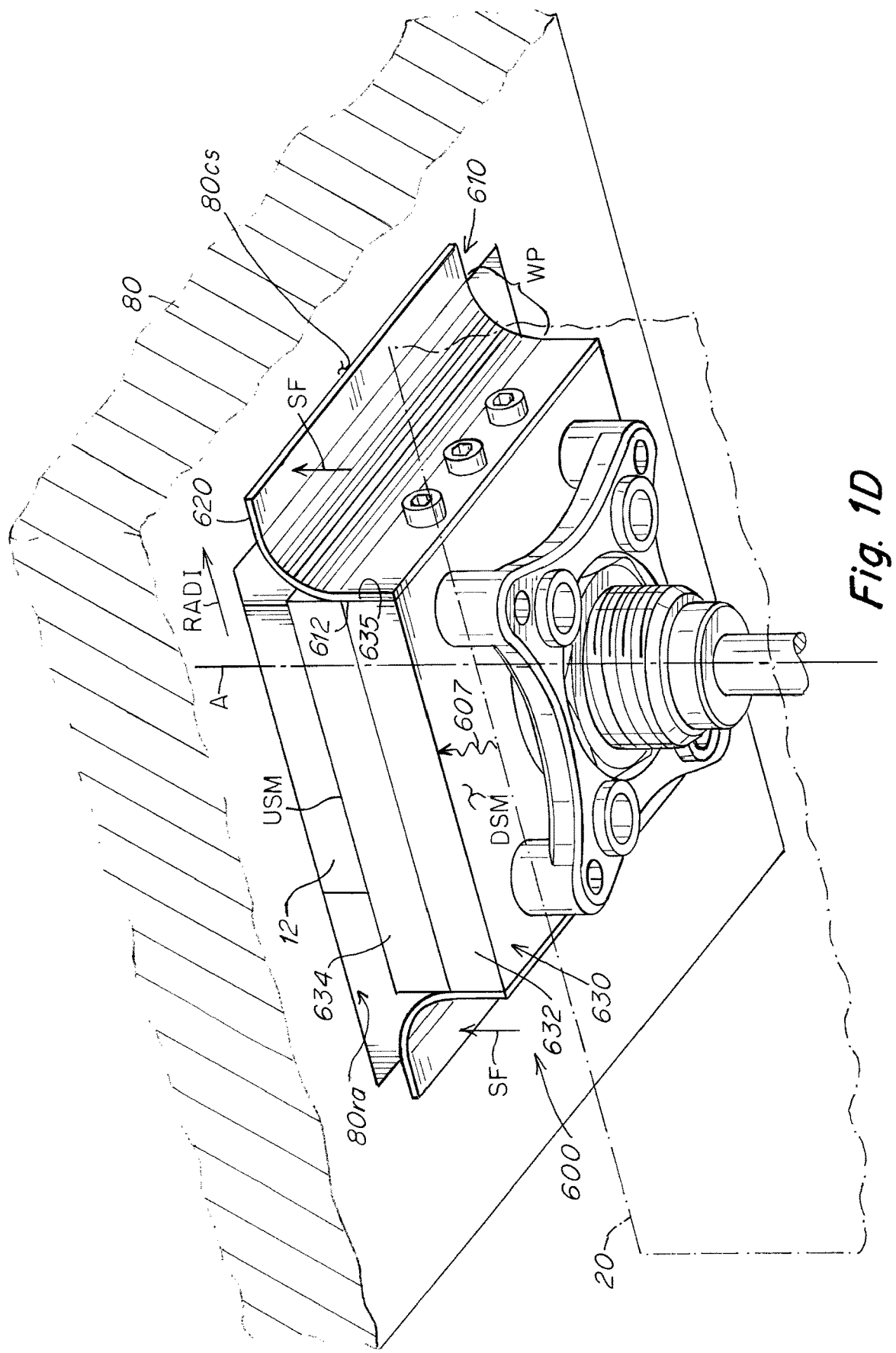

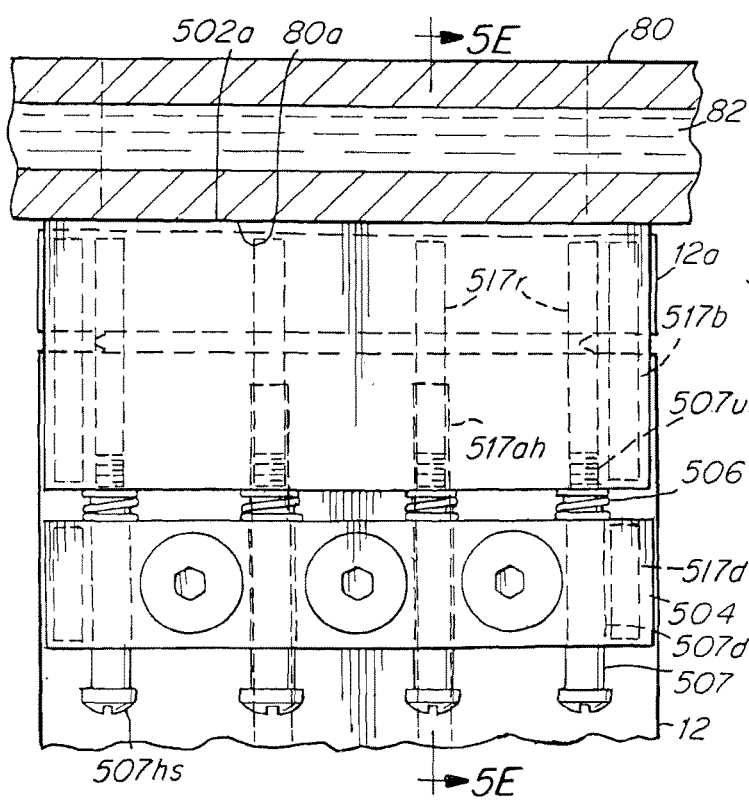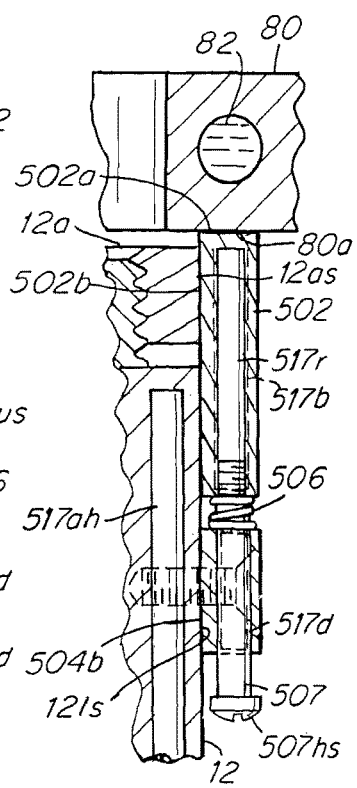
Fig. 5D    Fig. 5E
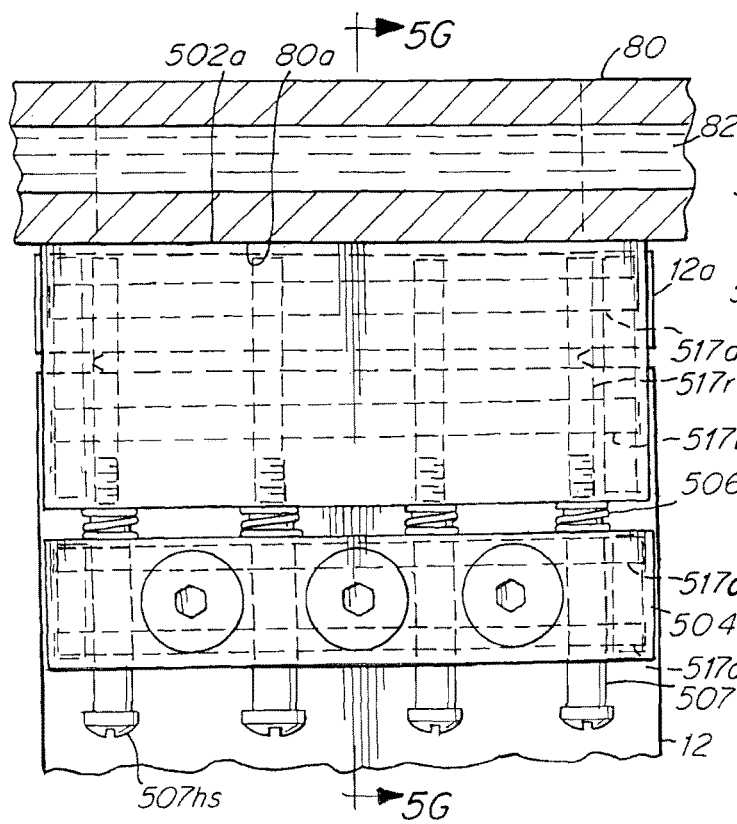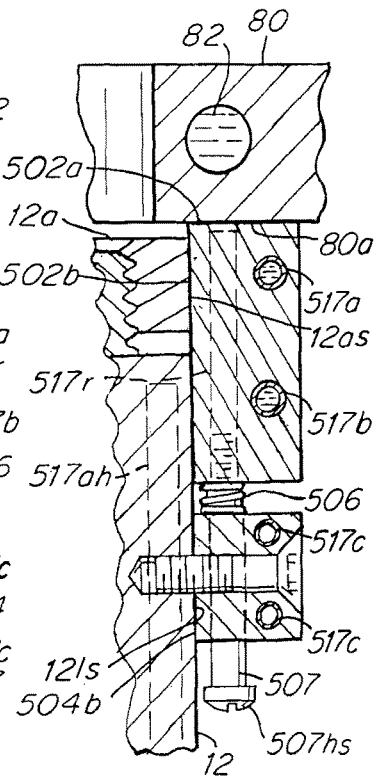
Fig. 5F    Fig. 5G

ACTUATOR COOLING APPARATUS AND METHOD

RELATED APPLICATIONS

This application is a continuation-in-part of and claims the benefit of priority to U.S. application Ser. No. 15/204,555 filed Jul. 7, 2016 which is a continuation of PCT/US16/016944 filed Feb. 8, 2016 which in turn claims the benefit of priority to U.S. provisional application No. 62/135,871 filed Mar. 20, 2015, the disclosures of all of which are incorporated by reference as if fully set forth herein.

This application is also a continuation of and claims the benefit of priority to PCT/US17/59641 filed Nov. 2, 2017 and to U.S. provisional application Ser. No. 62/421,696 filed Nov. 14, 2016, the disclosures of which are incorporated by reference in their entirety as if fully set forth herein.

The disclosures of all of the following are incorporated by reference in their entirety as if fully set forth herein: U.S. Pat. Nos. 5,894,025, 6,062,840, 6,294,122, 6,309,208, 6,287,107, 6,343,921, 6,343,922, 6,254,377, 6,261,075, 6,361,300. 6,419,870, 6,464,909, 6,599,116, 7,234,929, 7,419,625, 7,569,169, U.S. patent application Ser. No. 10/214,118, filed Aug. 8, 2002, U.S. Pat. Nos. 7,029,268, 7,270,537, 7,597,828, U.S. patent application Ser. No. 09/699,856 filed Oct. 30, 2000, U.S. patent application Ser. No. 10/269,927 filed Oct. 11, 2002, U.S. application Ser. No. 09/503,832 filed Feb. 15, 2000, U.S. application Ser. No. 09/656,846 filed Sep. 7, 2000, U.S. application Ser. No. 10/006,504 filed Dec. 3, 2001, U.S. application Ser. No. 10/101,278 filed Mar. 19, 2002 and PCT Application No. PCT/US11/062099 and PCT Application No. PCT/US11/062096, U.S. Pat. Nos. 8,562,336, 8,091,202 and 8,282,388.

BACKGROUND OF THE INVENTION

Cooling mechanisms for fluid driven actuators, hydraulic or pneumatic, that direct heat from a manifold away from the actuator but not heat generated by the actuator itself to a cooled metal plate are disclosed in U.S. Pat. Nos. 8,349,244 and 8,562,336 and in WO2015/183332 and WO2016153704, the disclosures of which are incorporated in their entirety by reference as if fully set forth herein.

SUMMARY OF THE INVENTION

In accordance with the invention there is provided an injection molding apparatus (5) comprising a clamp plate (80), a heated manifold (20), an actuator (10) interconnected to a valve pin (17) having an axis (A), a mold (300) wherein, when assembled, the clamp plate (80) is mounted upstream of the mold (300), the manifold (20) being disposed between the clamp plate and the mold, an actuator (10) comprising a rotor (60) driven by a drive device (174) that consumes electrical energy (187) that generates heat (197), the rotor and drive device being housed within a heat conductive housing (12) in an arrangement such that the heat (197) generated by the electrical energy (187) is communicated to the heat conductive housing (12), the rotor (60) being interconnected to the valve pin (17) in an arrangement such that the valve pin (17) is drivable along the axis (A) between an upstream fully gate open position and a downstream gate closed position, a thermal conductor (500) comprised of a thermally conductive material having first (500f) and second (500s) heat conductive surfaces disposed between the clamp plate (80) and the heat conductive housing (12) of the actuator, the heat conductive housing (12) being mounted in thermal communication with the first conductive surface (500f), the clamp plate (80) being mounted in thermal communication with the second conductive surface (500s), the second conductive surface (500s) of the thermal conductor being urged into contact with the clamp plate (80) under a spring force (SF) exerted between the actuator (10) and the thermal conductor (500), the heat (197) generated by the electrical energy (187) being conducted from the actuator housing (12) to the clamp plate (80) via conduction of the heat (197) from the first conductive surface (500F) to the second conductive surface (500s) and contact of the second conductive surface (500s) with the clamp plate (80).

Such an apparatus can further comprising a spring (SPR) comprised of a heat conductive material, the spring being disposed in intimate or compressed contact with a heat conductive surface (12hcs) of the actuator housing (12) and a heat conductive surface (500f) of the thermal conductor (500), the spring (SPR) exerting the spring force (SF) between the actuator (10) and the thermal conductor (500) and conducting heat (197) generated by the electrical energy (187) to the thermal conductor (500).

The first conductive surface (500f) is preferably adapted to be slidably engaged (SE) with an outside surface (120s) of the actuator housing (12) such that heat (197) generated by the electrical energy (187) is conducted between the actuator housing (12) and the thermal conductor (500) via the slidable engagement (SE), the second conductive surface (500s) being adjustable in distance toward and away from the actuator housing by sliding movement (SE) of the first conductive surface (500f) on the outside surface (12os) of the actuator housing.

The thermal conductor, spring, actuator, manifold and clamp plate are typically assembled together in an arrangement wherein the spring is loaded urging the second conductive surface of the thermal conductor into compressed engagement with the clamp plate.

The apparatus can further comprise a thermally conductive mount (600) to which the actuator (10) is mounted on an upstream side (USM) of the mount (600), the mount being mounted on a downstream side (DSM) in an arrangement in thermal communication with the manifold (20), the mount being mounted in relation to the manifold such that heat (607) generated by the manifold (20) is conducted from the manifold to the mount, the mount including a wing mechanism (610) extending laterally or radially (RADI) away from the mount and having a wing engagement surface (620) that engages a complementary surface (80cs) of the clamp plate such that heat (607) conducted from the manifold (20) to the mount (600) is further conducted via the wing mechanism (610) to the clamp plate (80) upon assembly of the mount (600) together with the clamp plate, manifold, mold and actuator into an operating condition where the manifold is brought to elevated operating temperature.

The wing (610) is typically adapted to dispose the wing engagement surface (620) in compressed contact with the complementary surface (80cs) of the clamp plate when the clamp plate, manifold and mold are assembled together with the actuator and mount into an operating arrangement and the manifold is brought to elevated operating temperature.

The wing (610) is preferably adapted to exert a spring force (SF) that disposes the wing engagement surface (620)

in constant compressed contact with the complementary surface (80*cs*) of the clamp plate.

The spring force exerted by the wing can be created by deformation of a resiliently bendable or deformable portion (WP) of the wing 600, the mount 600 comprising a highly thermally conductive base (630) to or on which the actuator housing (12) is mounted, the base (630) being disposed between the manifold (20) and the actuator housing (12) receiving heat (607) from the manifold (20) and conducting said heat (607) to the wing (610), the wing (610) being attached to, formed together with or extending from a lateral surface (635) of the base such that heat (607) generated by the manifold (20) and received by the base (630) is transmitted to the wing (610).

In another aspect of the invention there is provided an injection molding apparatus comprising a clamp plate 80, a heated manifold 20, an actuator 10 interconnected to a valve pin 17 having an axis A, a mold 300 wherein, when assembled, the clamp plate 80 is mounted upstream of the mold 300, the manifold 20 being disposed between the clamp plate and the mold, an actuator 10 comprising a rotor driven by a drive device that consumes electrical energy that generates heat, the rotor and drive device being housed within a heat conductive housing in an arrangement such that the heat generated by the electrical energy is communicated to the heat conductive housing, the rotor being interconnected to the valve pin 17 in an arrangement such that the valve pin 17 is drivable along the axis A between an upstream fully gate open position and a downstream gate closed position, a clamp plate, a heated manifold and a mold having a mold cavity, a thermally conductive mount (600) to which the actuator (10) is mounted on an upstream side (USM) of the mount, the mount being mounted on a downstream side (DSM) in an arrangement in thermal communication with the manifold, the mount being mounted in relation to the manifold such that heat (607) generated by the manifold is conducted from the manifold to the mount, the mount including a wing mechanism (610) extending laterally or radially away (RADI) from the mount and having a wing engagement surface (620) that engages a complementary surface (80*cs*) of the clamp plate (80) such that heat (607) conducted from the manifold to the mount is further conducted via the wing mechanism to the clamp plate upon assembly of the mount together with the clamp plate, manifold, mold and actuator into an operating condition where the manifold is brought to elevated operating temperature.

In such an apparatus the wing is typically adapted to dispose the wing engagement surface in compressed contact with the complementary surface of the clamp plate when the clamp plate, manifold and mold are assembled together with the actuator and mount into an operating arrangement and the manifold is brought to elevated operating temperature.

Preferably, the wing is adapted to exert a spring force that disposes the wing engagement surface in constant compressed contact with the complementary surface of the clamp plate.

The spring force exerted by the wing is typically created by deformation of a portion of the wing.

Such an apparatus can further comprise a thermal conductor comprised of a thermally conductive material having first and second heat conductive surfaces disposed between the clamp plate and the heat conductive housing of the actuator, the heat conductive housing being mounted in thermal communication with the first conductive surface, the clamp plate being mounted in thermal communication with the second conductive surface, the second conductive surface of the thermal conductor being urged into contact with the clamp plate under a spring force exerted between the actuator and the thermal conductor, the heat generated by the electrical energy being conducted from the actuator housing to the clamp plate via conduction of the heat from the first conductive surface to the second conductive surface and contact of the second conductive surface with the clamp plate.

Such an apparatus can further comprise a spring comprised of a heat conductive material, the spring being disposed in intimate or compressed contact with a heat conductive surface of the actuator housing and a heat conductive surface of the thermal conductor, the spring exerting the spring force between the actuator and thermal conductor and conducting heat generated by the electrical energy to the thermal conductor.

The first conductive surface is preferably adapted to be slidably engaged under compression with an outside surface of the actuator housing such that heat is conducted between the actuator housing and the thermal conductor via the slidable engagement, the second conductive surface being adjustable in distance toward and away from the actuator housing by sliding movement of the first conductive surface on the outside surface of the actuator housing.

The thermal conductor, spring, actuator, manifold and clamp plate are typically assembled together in an arrangement wherein the spring is loaded urging the second conductive surface of the thermal conductor into compressed engagement with the clamp plate In another aspect of the invention there is provided a method of performing an injection molding cycle comprising operating an apparatus as described above to form an injection molded part.

In another aspect of the invention there is provided an injection molding apparatus (5) comprising a clamp plate (80), a heated manifold (20), an actuator (10) interconnected to a valve pin (17) having an axis (A) and a mold (300) wherein, when assembled, the clamp plate (80) is mounted upstream of the mold (300) and the the manifold (20) is disposed between the clamp plate and the mold, an actuator (10) comprising a rotor driven by a drive device that consumes electrical energy that generates heat, the rotor and drive device being housed within a heat conductive housing in an arrangement such that the heat generated by the electrical energy is communicated to the heat conductive housing, the rotor being interconnected to a valve pin having a drive axis in an arrangement such that the valve pin (17) is drivable along the axis (A) between an upstream fully gate open position and a downstream gate closed position, the actuator housing being mounted on a surface of the heated manifold and spaced a selectable distance forming a gap between the actuator housing and the heated manifold, the apparatus including one or more heat convectors each heat convector comprised of:

a heat conductive leg disposed within the gap and mounted in heat conductive communication with the heated manifold, and a heat conductive arm extending distally away from the gap such that heat is conducted from the leg to the arm and away from the actuator housing.

In such an apparatus the actuator housing is preferably mounted relative to the heat conductive arm and leg in an arrangement wherein the heat generated by the electrical energy is communicated via the conductive housing to the conductive arm and leg.

The heat conductive leg of at least one of the one or more heat convectors is typically mounted in metal-to-metal heat conductive communication with the heated manifold.

The heat conductive arm of at least one of the one or more of the heat convectors is preferably spaced radially apart from the actuator housing relative to the drive axis.

An upstream end of the heat conductive arm of at least one of the one or more heat convectors is typically disposed in metal-to-metal heat conductive communication with a plate that is mounted in heat conductive isolation from the heated manifold.

The heat conductive arm of the at least one of the one or more heat convectors preferably includes a metal finger that is disposed in metal-to-metal contact under spring force with the top clamp plate.

The metal finger is typically slidably mounted on the arm in engagement with a spring, the metal finger being engagable in metal-to-metal contact with the plate under spring force exerted by the spring when compressed.

Such an apparatus can further comprise a valve pin bushing mounted in metal-to-metal heat conductive contact with the heated manifold, the valve pin being slidably received within a guide channel of the bushing for reciprocally driven upstream-downstream movement along the drive axis of the valve pin, wherein at least one of the one or more heat convectors has a leg that is mounted in metal-to-metal heat conductive contact with the valve pin bushing.

The leg of at least one of the one or more heat convectors is preferably mounted in metal-to-metal heat conductive contact with the heated manifold.

The one or more heat convectors can comprise at least first and second heat convectors, each leg of each heat convector being mounted in metal-to-metal heat conductive communication with the heated manifold.

The heat conductive arm of at least one of the first and second heat convectors is preferably spaced radially apart from the actuator housing relative to the drive axis.

An upstream end of the heat conductive arm of at least one of the first and second heat convectors is preferably disposed in metal-to-metal heat conductive communication with a plate that is mounted in heat conductive isolation from the heated manifold.

Such an apparatus can further comprise a bushing mounted in metal-to-metal heat conductive contact with the heated manifold, the valve pin being slidably received within a guide channel of the bushing for reciprocally driven upstream-downstream movement along the drive axis of the valve pin, wherein the leg of at least one of first and second heat convectors is mounted in metal-to-metal heat conductive contact with the bushing.

Such an apparatus can further comprise an actuator mount that is mounted in metal-to-metal heat conductive contact with the heated manifold, wherein the leg of at least one of the one or more heat convectors is mounted in metal-to-metal heat conductive contact with the actuator mount.

Such an apparatus can further comprise an actuator mount that is mounted in metal-to-metal heat conductive contact with the heated manifold, wherein the leg of at least one of the first and second heat convectors is mounted in metal-to-metal heat conductive contact with the actuator mount.

The leg of at least one or more heat convectors can be mounted in metal to metal heat conductive contact with the actuator housing.

The leg of at least one or more heat convectors can be mounted in metal to metal heat conductive contact with an insulator or standoff that is mounted in heat conductive contact with the actuator housing.

The heat conductive arm of at least one of the one or more heat convectors can be spaced apart from the actuator housing extending along an axis or direction that is generally perpendicular to the drive axis.

The heat conductive arm of at least one of the one or more heat convectors can be spaced apart from the actuator housing extending along an axis or direction that is generally parallel to the drive axis.

In another aspect of the invention there is provided a method of performing an injection molding cycle comprising operating an apparatus as described immediately above to form an injection molded part.

In another aspect of the invention there is provided an injection molding apparatus 5 comprising a clamp plate 80, a heated manifold 20, an actuator 10 interconnected to a valve pin 17 having an axis A, a mold 300 and a cooling device 500 that cools the actuator 10 wherein, when assembled, the clamp plate 80 mounted upstream of the mold 300, the manifold 20 being disposed between the clamp plate and the mold, wherein the actuator (10) comprises a rotor driven by a drive device that consumes electrical energy that generates heat, the rotor and drive device being housed within a heat conductive housing 12 in an arrangement such that the heat generated by the electrical energy is communicated to the heat conductive housing 12, the rotor being interconnected to the valve pin 17 in an arrangement such that the valve pin 17 is drivable along the axis A between an upstream fully gate open position and a downstream gate closed position, the heat conductive housing 12 being mounted in thermally conductive contact along the axis A to one or more actuator mounts 50, 60, 803 that are mounted downstream in heat conductive communication with or contact with or on the manifold along the axis A, wherein the cooling device 500 comprises:

a heat transmitter comprising a proximal arm or member 504 comprised of a heat conductive material and a distal arm or member 502 comprised of a thermally conductive material, the distal arm or member or member 502 being mounted by a spring loadable interconnection or engagement 506 on or to the proximal base or member 504, the distal arm or member 502 having a distal end surface 502a for engaging the clamp plate 80, 80a under a spring load and a proximal exterior surface 502b for transmitting heat from the proximal surface to the distal end surface 502a, the housing body 12 having a surface 12ls that is spaced laterally 12ld from the axis A, the distal arm or member 502 being mounted such that the proximal exterior surface 502b of the distal arm or member 502 is disposed in thermal communication with the laterally spaced surface 12ls enabling conduction of heat generated by the electrical energy from the heat conductive housing to the distal arm or member 502, the proximal base or member 504 being mounted in heat conductive contact with and to the lateral surface 12ls such that the proximal base or member 504 is spaced laterally apart from contact with the one or more actuator mounts 50, 60, 803 in an arrangement wherein the distal end surface 502a of the distal arm or member 502 is movable through the spring loadable interconnection 506 toward and away from the actuator 10, the clamp plate, the mold 300, the manifold, the actuator and the heat transmitter being assemblable together in an arrangement wherein the spring loadable interconnection 506 is loaded urging the distal end surface 502a of the distal arm or member 502 into compressed engagement with the clamp plate 80, 80a at least when the manifold is heated to an elevated operating temperature.

Such an apparatus can further comprise one or more heat conductive tubes 517a, 517b, 517c, 517d containing a heat conductive liquid embedded within one or the other or both of the proximal 504 and distal 502 members.

The distal 502 and proximal 504 members can be heat transmissively interconnected or engaged with each other by heat transmissive rods 507 or tubes.

The apparatus can further comprise one or more hollow heat conductive tubes 517ah having a cavity containing heat conductive fluid, the one or more tubes 517ah being embedded within the body of the housing of the actuator 10, 12.

The proximal exterior surface 502b can be adapted to be engaged and slidable against a complementary surface 12ls, 12as of the housing body 12, 12a of the actuator 10 such that heat thermally conducts between the housing body 12, 12a and the distal arm or member 502, the distal end surface 502a of the distal arm or member being movable toward and away from the actuator 10 by sliding movement of the proximal exterior surface 502b of the distal arm or member 502 on the complementary surface 12ls, 12as of the actuator.

The spring loaded interconnection 506 can be adapted to urge the distal end surface 502a of the distal arm or member into a compression of at least 1 pound per square inch (psi) with the clamp plate.

The lateral surface 12ls and the base member 504aa can be laterally spaced apart 12ld from direct heat conductive communication with the heat manifold 20.

The clamp plate is preferably cooled.

The cooling device 500 preferably includes a resilient spring 506a disposed between a body surface 504a of the proximal base or member 504 and the distal arm or member 502, wherein the clamp plate, the mold, the manifold, the actuator and the cooling device are assembled together in an arrangement wherein the spring 506a is resiliently compressed up to a maximum of about 3 mm urging the distal end surface 502a of the distal arm or member into compressed engagement with the clamp plate 80a.

The apparatus can include two or more separate cooling devices each comprised of a distal arm or member mounted in spring loadable interconnection to a proximal base or member, each separate cooling device being separately mounted to the housing body 12, 12a of the actuator and separately assemblable together with the clamp plate, the mold, the actuator and the manifold such that the distal end surface of the distal arm or member of each separate cooling device is in compressed engagement with the clamp plate under the spring loadable interconnection 506 between each separate distal end arm 502 and proximal base or member 504.

Such an apparatus can further comprise a mount 803 separating the actuator housing from direct contact with the manifold, the mount being cooled and having an upstream mounting surface in thermally conductive communication with a complementary mounting surface 12d of the actuator 10 and a downstream mounting surface in thermally conductive communication with the manifold 20.

The mount is preferably comprised of a thermally conductive metal that is cooled to a temperature of less than about 150 degrees F.

The actuator 10 is typically interconnected to a valve pin 17 that is mounted to the manifold and extends through a fluid material feed bore 22 in the manifold 20.

The proximal base or member 504 is typically rigidly attached in thermally conductive contact to the laterally spaced surface 12ls the housing body 12, 12a.

The distal arm or member 502 and proximal member 504 can comprise a unitary thermally conductive body 503 with at least the distal arm or member 502 being resiliently deformable to form the spring loadable interconnection 506 on assembly of the clamp plate, the mold, the manifold, the actuator and the heat transmitter being assembled in an arrangement wherein the spring loadable interconnection 506 is loaded when the manifold is heated to operating temperature urging the distal end surface 502a of the distal arm or member into compressed engagement with the clamp plate.

The distal arm or member and the proximal base or member can comprise a unitary body 503 rigidly attached in thermally conductive contact 504s to the laterally spaced surface 12ls, a portion of the unitary body being resiliently deformable to form the spring loadable interconnection 506, the mold, the manifold, the actuator and the heat transmitter being assembled in an arrangement wherein the resiliently deformable portion of the unitary body 503 compresses up to a maximum of about 0.5 mm when the manifold is heated to operating temperature urging the distal end surface 502a of the distal arm or member into compressed engagement with the clamp plate.

The distal arm or member 502, 502b can be attached to the actuator such that the arm 502, 502b is disposed in slidable thermally conductive contact with the lateral surface 12ls, 12as of the housing body.

The distal arm or member can comprise a rod 502r slidably disposed within a complementary bore 12bo disposed within the housing body 12, 12a of the actuator 10, the complementary bore 12bo and the rod 502r being configured such that an exterior surface 502b of the rod 502r is slidably engaged in thermally conductive contact against an interior surface 12si, 12asi of the complementary bore 12bo.

In another aspect of the invention there is provided a method of cooling the actuator of an apparatus as described immediately above comprising assembling the clamp plate, the mold, the manifold, the actuator and the cooling device of the apparatus such that the spring loadable interconnection is loaded urging the distal end surface of the distal arm or member into compressed engagement with the clamp plate.

In another aspect of the invention there is provided an injection molding apparatus (5) comprising a clamp plate (80), a heated manifold (20), an actuator (10) interconnected to a valve pin (17) having an axis (A), a mold (300) and a cooling device (500) that cools the actuator (10) wherein, when assembled, the clamp plate (80) is mounted upstream of the mold (300), the manifold (20) being disposed between the clamp plate and the mold (300), wherein the actuator (10) comprises a rotor driven by a drive device that consumes electrical energy that generates heat, the rotor and drive device being housed within a heat conductive housing (12) in an arrangement such that the heat generated by the electrical energy is communicated to the heat conductive housing (12), the rotor being interconnected to the valve pin (17) in an arrangement such that the valve pin (17) is drivable along the axis (A) between an upstream fully gate open position and a downstream gate closed position, wherein the cooling device (500) comprises:

a heat transmitter comprising a proximal base or member (504) comprised of a heat conductive material and a distal arm or member (502) comprised of a thermally conductive material, the distal arm or member or member (502) being mounted by one or more spring loadable interconnections (506) on or to the proximal base or member (504), the distal arm or member (502) having a distal end surface (502a) for engaging the clamp plate (80, 80a) under a spring load and a proximal surface (502b) for transmitting heat from the proximal surface to the distal end surface (502a), the spring or spring loadable interconnection (506) has an amount or degree of mass that renders the spring (506) substantially non-heat conductive between the proximal (504) and distal (502) members, the distal member (502) has a proximal exterior surface (502b) that is adapted to be engaged and slidable against a complementary surface (12ls,12as) of the housing body (12, 12a) of the actuator (10) such that heat generated by the electrical energy thermally conducts from the housing body 12, 12a to the distal arm or member (502), the clamp plate, the mold (300), the manifold, the actuator and the heat transmitter being assemblable together in an arrangement wherein the spring loadable interconnection (506) is loaded urging the distal end surface (502a) of the distal arm or member (502) into compressed engagement with the clamp plate (80, 80a) at least when the manifold is heated to an elevated operating temperature.

In such an apparatus, the mass of the spring loadable interconnection is typically selected to minimize, enable or impart a minimal amount of, heat conduction between the proximal and distal arms or members via or through the spring or spring loadable interconnection (506).

The mass of the spring loadable interconnection (506) is typically less than about 5 grams.

The spring or spring loadable interconnection (506) typically has engagement surfaces (506es) that engage against complementary opposing engagement surfaces (504us, 502us) of proximal (504 and distal 502) members having a selected area of engagement that renders spring 506) substantially non-heat conductive between the proximal and distal arms or members.

The area of engagement or contact between engagement surfaces (506es) and one or both of complementary opposing engagement surfaces (504us or 502us) preferably minimizes, enables or imparts a minimal amount of, heat conduction between the proximal and distal members (504 and 502) via or through spring or spring loadable interconnection (506).

The area of engagement or contact between the engagement surfaces (506es) and one or both of complementary opposing engagement surfaces (504us or 502us) is preferably less than about 10 square mm.

The actuator (10) preferably comprises a housing body (12) that is mounted in thermally conductive contact along the axis A to one or more actuator mounts (50, 60, 803) that are mounted downstream in heat conductive communication with or contact with or on the manifold along the axis (A).

Such an apparatus can further comprise one or more heat conductive tubes (517a, 517b, 517c, 517d) containing a heat conductive liquid embedded within one or the other or both of the proximal (504) and distal (502) members.

In such an apparatus the distal 502 and proximal (504) members can be heat transmissively interconnected or engaged with each other by heat transmissive rods (507) or tubes (517r) that are intimately engaged with the members (502, 504).

Such an apparatus can further comprise one or more hollow heat conductive tubes (517ah) having a cavity containing heat conductive fluid, the one or more tubes (517ah) being embedded within the body of the housing of the actuator (10, 12).

The distal member (502) can have a proximal exterior surface (502b) that is adapted to be engaged and slidable against a complementary surface (12ls,12as) of the housing body (12, 12a) of the actuator (10) such that heat thermally conducts between the housing body 12, 12a and the distal arm or member (502), the distal end surface (502a) of the distal arm or member being movable toward and away from the actuator 10) by sliding movement of the proximal exterior surface (502b) of the distal arm or member 502 on the complementary surface 12ls, 12as of the actuator.

The spring loaded interconnection (506) can be adapted to urge the distal end surface (502a) of the distal arm or member into a compression of at least 1 pound per square inch (psi) with the clamp plate.

The lateral surface (12ls) and the proximal base or member (504) are typically laterally spaced apart (12ld) from direct heat conductive communication with the heated manifold (20).

The clamp plate is preferably cooled.

The clamp plate, the mold, the manifold, the actuator and the cooling device are preferably assembled together in an arrangement wherein the spring (506a) is resiliently compressed up to a maximum of about 3 mm urging the distal end surface (502a) of the distal arm or member into compressed engagement with the clamp plate (80a).

The apparatus can include two or more separate cooling devices each comprised of a distal arm or member (502) mounted via spring loadable interconnection to a proximal base or member (504), each separate cooling device being separately mounted to the housing body (12, 12a) of the actuator and separately assemblable together with the clamp plate, the mold, the actuator and the manifold such that the distal end surface of the distal arm or member of each separate cooling device is in compressed engagement with the clamp plate under the spring loadable interconnection 506) between each separate distal end arm (502) and proximal base or member 504).

The apparatus can further comprise a mount (803) separating the actuator housing (19) from direct contact with the manifold, the mount being cooled and having an upstream mounting surface in thermally conductive communication with a complementary mounting surface (12d) of the actuator (10) and a downstream mounting surface in thermally conductive communication with the manifold (20).

The mount is typically comprised of a thermally conductive metal that is cooled to a temperature of less than about 150 degrees F.

Thee actuator (10) can be interconnected to a valve pin (17) that is mounted to the manifold and extends through a fluid material feed bore (22) in the manifold (20).

The proximal base or member (504) is preferably rigidly attached in thermally conductive contact to the laterally spaced surface (12ls) the housing body (12, 12a).

The distal arm or member (502, 502b) can be attached to the actuator such that the arm (502, 502b) is disposed in slidable thermally conductive contact with the lateral surface (12*ls*, 12*as*) of the housing body.

The distal arm or member can comprise a rod (502*r*) slidably disposed within a complementary bore (12*bo*) disposed within the housing body (12, 12*a*) of the actuator (10), the complementary bore (12*bo*) and the rod (502*r*) being configured such that an exterior surface (502*b*) of the rod (502*r* is slidably engaged in thermally conductive contact against an interior surface (12*si*, 12*asi*) of the complementary bore (12*bo*).

In another aspect of the invention there is provided a method of cooling the actuator of an apparatus as described immediately above comprising assembling the clamp plate, the mold, the manifold, the actuator and the cooling device of the apparatus such that the spring loadable interconnection is loaded urging the distal end surface of the distal arm or member into compressed engagement with the clamp plate.

In another aspect of the invention there is provided an injection molding apparatus (5) comprising a clamp plate (80), a heated manifold (20), an actuator (10), a mold (300) and a cooling device (500 that cools the actuator (10), wherein when assembled the clamp plate (80) and the mold (300) are interconnected and spaced apart from each other, the manifold (20) is disposed between the clamp plate and the mold and the actuator (10) is mounted in thermally conductive communication with the manifold (20), wherein the actuator (10) comprises a rotor driven by a drive device that consumes electrical energy that generates heat, the rotor and drive device being housed within a heat conductive housing (12) in an arrangement such that the heat generated by the electrical energy is communicated to the heat conductive housing (12), the rotor being interconnected to the valve pin (17) in an arrangement such that the valve pin (17) is drivable along the axis (A) between an upstream fully gate open position and a downstream gate closed position, the housing (12, 12*a*) being mounted in thermal communication with the manifold (20), wherein the cooling device (500) comprises:

a heat transmitter comprising a distal arm or member (502) and a proximal base or member (504), the distal arm or member (502) being mounted by a spring loadable interconnection or engagement (506) to or with the proximal base or member (504), the distal arm or member (502) being comprised of a thermally conductive material having a distal end surface (502*a*) for engaging the clamp plate (80, 80*a*) under a spring load, the proximal base or member (504) being mounted to the housing body (12) of the actuator (10) in an arrangement wherein the distal end surface (502*a*) of the distal arm or member (502) is movable through the spring loadable interconnection (506) toward and away from the actuator (10), wherein the spring or spring loadable interconnection (506) has engagement surfaces (506*es*) that engage against complementary opposing engagement surfaces (504*us*, 502*us*) of proximal (504 and distal (502) members having a selected area of engagement that renders spring (506) substantially non-heat conductive between the proximal and distal arms or members, the distal member (502) has a proximal exterior surface (502*b*) that is adapted to be engaged and slidable against a complementary surface (12*ls*,12*as*) of the housing body (12, 12*a*) of the actuator (10) such that heat generated by the electrical energy thermally conducts from the housing body (12, 12*a*) to the distal arm or member (502), the clamp plate, the mold (300), the manifold, the actuator and the heat transmitter being assemblable together in an arrangement wherein the proximal surface (502*b* slides along the complementary surface (12*ls*, 12*as*) and the spring loadable interconnection (506) is loaded urging the distal end surface (502*a*) of the movable rod or arm (502) into compressed engagement with the clamp plate (80, 80*a*) at least when the manifold is heated to an elevated operating temperature.

The spring or spring loadable interconnection (506) typically has an amount or degree of mass that renders the spring (506) substantially non-heat conductive between the proximal (504) and distal (502) members.

The actuator (10) is preferably interconnected to a valve pin (17) that is drivable along an axis (A), the housing body (12) being mounted in thermally conductive contact with one or more actuator mounts (50,)60, 800) that are mounted on the manifold (20) downstream of the housing body (12) along the axis (A), the proximal base (504) of the cooling device (500) being mounted to a surface (12*ls*) of the housing body (12) that is spaced laterally (12*ld*) from the axis (A) such that the proximal base or member (504) is spaced laterally apart from contact with the one or more actuator mounts (50, 60, 800).

The spring loadable interconnection can comprise one or more rods or tubes (507, 517*r*) slidably mounted to or within one of the proximal base or member (504) and the distal arm or member (502) and rigidly interconnected to the other of the proximal base or member (504) and the distal arm or member (502), the one or more rods or tubes (507, 517*r*) transmitting heat between the proximal base or member (504) and the distal arm or member (502).

The distal arm or member can be movable in an axial direction toward and away from the actuator housing (12).

The distal arm or member can be movable in a lateral or radial direction toward and away from the actuator housing (12).

The spring loaded interconnection (506) is preferably adapted to urge the distal end surface (502*a*) of the distal arm or member into a compression of at least 0.45 kilograms per square inch with the clamp plate.

The clamp plate is preferably mounted in a position in spaced thermal isolation from the manifold.

The clamp plate is preferably cooled.

The spring loadable interconnection can comprise a resilient spring (506*a*) disposed between a body surface (504*a*) of the proximal base or member (504) and the distal arm or member (502), wherein the clamp plate, the mold, the manifold, the actuator and the cooling device are assembled together in an arrangement wherein the spring (506*a*) is resiliently compressed up to a maximum of about 3 mm urging the distal end surface (502*a*) of the distal arm or member into compressed engagement with the clamp plate (80*a*).

The apparatus typically includes two or more separate cooling devices each comprised of a distal arm or member mounted in spring loadable interconnection to a proximal base or member, each separate cooling device being separately mounted to the housing body (12, 12*a*) of the actuator and separately assemblable together with the clamp plate, the mold, the actuator and the manifold such that the distal end surface of the distal arm or member of each separate cooling device is in compressed engagement with the clamp plate under the spring loadable interconnection 506 between each separate distal end arm (502) and proximal base or member (504).

Such an apparatus can further comprise a mount (800) separating the actuator housing from direct contact with the manifold, the mount being cooled and having an upstream mounting surface in thermally conductive communication with a complementary mounting surface (12d) of the actuator (10) and a downstream mounting surface in thermally conductive communication with the manifold (20).

The mount is preferably comprised of a thermally conductive metal that is cooled to a temperature of less than about 65 degrees centigrade.

The valve pin (17) can be mounted to the manifold and extend through a fluid material feed bore (22) in the manifold (20).

The proximal base or member (504) is preferably rigidly attached in thermally conductive contact to the laterally spaced surface (12ls) the housing body (12, 12a).

The one or more rods or tubes 507 typically comprise hollow heat conductive tubes (517ah) having a cavity containing a heat conductive fluid and a wick.

The mass of the spring loadable interconnection (506) is typically less than about 5 grams and the area of engagement or contact between the engagement surfaces (506es) and one or both of complementary surfaces (504us or 502us) is less than about 10 square mm.

In another aspect of the invention there is provided a method of cooling the actuator of the apparatus described immediately above comprising assembling the clamp plate, the mold, the manifold, the actuator and the cooling device such that the spring loadable interconnection is loaded urging the distal end surface of the distal arm or member into compressed engagement with the clamp plate.

In another aspect of the invention there is provided an injection molding apparatus comprising a clamp plate (80) mounted to a mold (75) in spaced relationship, a heated manifold (20), an actuator (10) comprising a housing body (12), and a cooling device (500) that cools the actuator (10), wherein the manifold (20) is disposed between the clamp plate (80) and the mold (75) and the housing body (12) of the actuator is mounted in thermally conductive communication with the manifold (20), wherein the actuator (10) comprises a rotor driven by a drive device that consumes electrical energy that generates heat, the rotor and drive device being housed within a heat conductive housing (12) in an arrangement such that the heat generated by the electrical energy is communicated to the heat conductive housing (12), the rotor being interconnected to the valve pin (17) in an arrangement such that the valve pin (17) is drivable along the axis (A) between an upstream fully gate open position and a downstream gate closed position, the housing (12, 12a) being mounted in thermal communication with the manifold (20), the cooling device (500) comprising:

a heat transmitter comprising a distal arm or member (502) and a proximal base or member (504aa) mounted in heat conductive contact to the housing body (12) of the actuator, the distal arm or member (507m) comprises a rod or tube (507u, 507d) slidably disposed within a complementary bore (504pb, 504pba) disposed within the proximal base or member (504aa), the complementary bore and the rod or tube being configured such that an exterior surface of the rod (507us, 507ds) is slidably engaged in thermally conductive contact with and against an interior surface (504pbsa, 504pbs) of the complementary bore (504pb, 504pba), the rod or tube (507u, 507d) being comprised of a thermally conductive material having a distal end surface (507a), the rod transmitting heat from the proximal arm or member (504aa) to the distal end surface (507a) via engagement of the exterior surface (507us, 507ds) of the rod with the interior surface (504pbsa, 504pbs) of the complementary bore, the proximal base or member (504aa) receiving the heat generated by the electric energy from the housing 12 and transmitting the heat generated by the electric energy to the clamp plate 80 via the distal arm or member (507m), the rod or tube (507u, 507d) being mounted within the complementary bore (504pb, 504pba) via a spring loadable interconnection (506) disposed between the proximal base or member (504aa) and the rod (507u, 507d) such that the spring loadable interconnection can exert a spring load between the proximal base or member and the rod, the clamp plate, the mold, the manifold, the actuator and the heat transmitter being assemblable together in an arrangement wherein the spring loadable interconnection (506) is loaded urging the distal end surface (507a) of the rod into compressed engagement with the clamp plate at least when the clamp plate, the mold, the manifold, the actuator and heat transmitter are assembled and the manifold is heated to an elevated operating temperature.

In such an apparatus the spring loadable interconnection 506 typically comprises a spring that has an amount or degree of mass that renders the spring 506 substantially non-heat conductive between the proximal member 504 and the rod 507u, 507d.

The spring or spring loadable interconnection 506 typically has engagement surfaces 506es that engage against complementary opposing engagement surfaces 504us, 507es of proximal 504 member and rod 507u, 507d having a selected area of engagement that renders spring 506 substantially non-heat conductive between the proximal member and the rod 507u, 507d.

In such an apparatus, the housing body (12) is typically mounted in thermally conductive contact along the axis A to one or more actuator mounts (50, 60, 800) that are mounted downstream on the manifold along the axis A, and the housing body (12) has a surface (12ls) that is spaced laterally (12ld) from the axis A, the proximal base or member (504aa) being mounted in heat conductive contact with and to the lateral surface (12ls) such that the proximal base or member (504aa) is spaced laterally apart from contact with the one or more actuator mounts 50, 60, 800.

The clamp plate 80 preferably includes an actuator receiving aperture 80ra and an upstream end plate 80p that is readily attachable to and detachable from the clamp plate 80 in a predetermined mating position disposed upstream of the actuator receiving aperture 80ra, and, the clamp plate 80, the upstream end plate 80p, the manifold 20, the actuator and the heat transmitter are assemblable together in an arrangement wherein the actuator 10 and cooling device 500 are mounted within the actuator receiving aperture 80ra and the spring loadable interconnection 506 is loaded urging the distal end surface 502a of the rod or arm 502, 507m into compressed engagement with the upstream end plate 80*p* when the manifold 20 is heated to an elevated operating temperature.

The clamp plate 80 can include a recess 80*r* formed within the clamp plate 80 that is complementary to the upstream end plate 80*p* such that the upstream end plate is readily receivable within the recess 80*r* and attachable to the clamp plate 80 in the predetermined mating position.

The apparatus can further include a second cooling device (500) comprising:

- a heat transmitter comprising a second distal arm or member (502) and a second proximal base or member (504*aa*) mounted in heat conductive contact to the housing body (12) of the actuator,
- the second distal arm or member (507*m*) being mounted to the second proximal base or member 504 via a spring loadable interconnection (506*a*) disposed between the second proximal base or member (504*aa*) and the second distal arm or member (502) such that the spring loadable interconnection can exert a spring load between the second proximal base or member and the second distal arm or member,
- the second proximal base or member (504*aa*) having an engagement surface (504*is*) and the second distal arm or member (502) having one or more complementary engagement surfaces (502*s*), the engagement surface (504*is*) and the complementary engagement surface (502*s*) being adapted to be disposed in sliding contact with each other for transmitting heat from the second proximal base or member (504*aa*) to the second distal arm or member (502).

In another aspect of the invention there is provided an injection molding apparatus comprising a clamp plate (80) mounted to a mold (75) in spaced relationship, a heated manifold (20), an actuator (10) comprising a housing body (12), and a cooling device (500) that cools the actuator (10), wherein the manifold (20) is disposed between the clamp plate (80) and the mold (75) and the housing body (12) of the actuator is mounted in thermally conductive communication with the manifold (20), the cooling device (500) comprising:

- a heat transmitter comprising a distal arm or member (502) and a proximal base or member (504*aa*) mounted in heat conductive contact to the housing body (12) of the actuator,
- the distal arm or member (507*m*) being mounted to the proximal base or member 504 via a spring loadable interconnection (506*a*) disposed between the proximal base or member (504*aa*) and the distal arm or member (502) such that the spring loadable interconnection can exert a spring load between the proximal base or member and the distal arm or member,
- the proximal base or member (504*aa*) has an engagement surface (504*is*) and the distal arm or member (502) having one or more complementary engagement surfaces (502*s*), the engagement surface (504*is*) and the complementary engagement surface (502*s*) being adapted to be disposed in sliding contact with each other for transmitting heat from the proximal base or member (504*aa*) to the distal arm or member (502),
- the clamp plate, the mold, the manifold, the actuator and the heat transmitter being assemblable together in an arrangement wherein the spring loadable interconnection (506) is loaded urging the distal end surface (502*a*) of the distal arm or member (502) into compressed engagement with the clamp plate at least when the clamp plate, the mold, the manifold, the actuator and the heat transmitter are assembled and the manifold is heated to an elevated operating temperature.

In such an apparatus the spring loadable interconnection 506 preferably comprises a spring that has an amount or degree of mass that renders the spring 506 substantially non-heat conductive between the proximal member 504 and the rod 507*u*, 507*d*.

The spring or spring loadable interconnection (506) typically has engagement surfaces (506*es*) that engage against complementary opposing engagement surfaces (504*us*, 507*es*) of proximal (504) member and rod (507*u*, 507*d*) having a selected area of engagement that renders spring (506) substantially non-heat conductive between the proximal member and the rod (507*u*, 507*d*).

The housing body (12) is preferably mounted in thermally conductive contact along the axis A to one or more actuator mounts (50, 60, 800) that are mounted downstream on the manifold along the axis A, and

- the housing body (12) having a surface (12*ls*) that is spaced laterally (12*ld*) from the axis A, the proximal base or member (504*aa*) being mounted in heat conductive contact with and to the lateral surface (12*ls*) such that the proximal base or member (504*aa*) is spaced laterally apart from contact with the one or more actuator mounts 50, 60, 800.

The clamp plate (80) preferably includes an actuator receiving aperture (80*ra*) and an upstream end plate 80*p* that is readily attachable to and detachable from the clamp plate 80 in a predetermined mating position disposed upstream of the actuator receiving aperture 80*ra*, and, the clamp plate 80, the upstream end plate 80*p*, the manifold 20, the actuator and the heat transmitter are assemblable together in an arrangement wherein the actuator 10 and cooling device 500 are mounted within the actuator receiving aperture 80*ra* and the spring loadable interconnection 506 is loaded urging the distal end surface 502*a* of the rod or arm 502, 507*m* into compressed engagement with the upstream end plate 80*p* when the manifold 20 is heated to an elevated operating temperature.

The clamp plate 80 typically includes a recess 80*r* formed within the clamp plate 80 that is complementary to the upstream end plate 80*p* such that the upstream end plate is readily receivable within the recess 80*r* and attachable to the clamp plate 80 in the predetermined mating position.

In another aspect of the invention there is provide a method of cooling the actuator of the apparatus described immediately above comprising assembling the clamp plate, the mold, the manifold, the actuator and the cooling device of the apparatus such that the spring loadable interconnection is loaded urging the distal end surface of the rod into compressed engagement with the clamp plate.

In another aspect of the invention there is provide an injection molding apparatus (5) comprising a clamp plate (80), a heated manifold (20), an actuator (10), a mold (300) and a cooling device (500) that cools the actuator (10), wherein when assembled the clamp plate (80) and the mold (300) are interconnected and spaced apart from each other, the manifold (20) is disposed between the clamp plate and the mold and the actuator (10) is mounted in thermally conductive communication with the manifold (20), wherein the actuator (10) comprises a rotor driven by a drive device that consumes electrical energy that generates heat, the rotor and drive device being housed within a heat conductive housing (12) in an arrangement such that the heat generated by the electrical energy is communicated to the heat conductive housing (12), the rotor being interconnected to the valve pin

(17) in an arrangement such that the valve pin (17) is drivable along the axis (A) between an upstream fully gate open position and a downstream gate closed position, the housing (12, 12a) being mounted in thermal communication with the manifold (20), wherein the cooling device (500) comprises:

a heat transmitter comprising a distal arm or member (502) comprised of a rod or tube (502r) and a proximal base or member (504) comprising an integral portion of the housing body (12) that is laterally spaced from the axis (A) along which the valve pin is driven, the rod or tube (502) being slidably disposed within a complementary bore (12bo) disposed within the laterally spaced integral portion (504) of the housing body (12), the complementary bore (12bo) and the rod or tube (502r) being configured such that the exterior surface (502b) of the rod or tube (502r) is slidable and engaged in thermally conductive contact against an interior surface (12si, 12asi) of the complementary bore (12bo) such that the heat generated by the electrical energy is transmitted from the housing body (12) to the rod or tube (502r), the rod or tube (502r) being comprised of a thermally conductive material having a distal end surface (502a) for engaging the clamp plate (80, 80a) under a spring load exerted by a spring loadable interconnection (506) disposed between the rod or tube (502r) and the laterally spaced portion (504) of the housing body (12) such that the spring loadable interconnection (506) can exert a spring load (UF) between the laterally spaced portion (504) of the housing body and the rod or tube (502r), the clamp plate, the mold (300), the manifold, the actuator and the heat transmitter being assemblable together in an arrangement wherein the spring loadable interconnection (506) is loaded urging the distal end surface (502a) of the movable rod or tube (502r) into compressed engagement with the clamp plate (80, 80a) at least when the manifold is heated to an elevated operating temperature.

In such an apparatus the housing body (12) can be mounted in thermally conductive contact along the axis A to one or more actuator mounts 50, 60, 800 that are mounted downstream along the axis A in heat conductive communication with the heated manifold 20, wherein the interior surface (12si, 12asi) of the complementary bore (12bo) is spaced laterally (12ld) from the axis (A), such that the interior surface (12si, 12asi) of the complementary bore (12bo) is disposed apart from contact with the one or more actuator mounts (50, 60, 800).

The spring loadable interconnection (506) typically comprises a spring that has an amount or degree of mass that renders the spring (506) substantially non-heat conductive between the proximal member (504) and the rod or tube (502r).

The spring or spring loadable interconnection (506) preferably has engagement surfaces 506es that engage against complementary opposing engagement surfaces 504us, 502us of proximal 504 member and rod or tube 502r having a selected area of engagement that renders spring 506 substantially non-heat conductive between the laterally spaced portion 504 of the housing 12 and the rod or tube 502r.

In another aspect of the invention there is provided an injection molding apparatus (5) comprising a clamp plate (80), a heated manifold 20, an actuator 10, a mold 300 and a cooling device 800 that cools the actuator 10, wherein when assembled the clamp plate 80 and the mold 300 are interconnected and spaced apart from each other, the manifold 20 is disposed between the clamp plate and the mold and the actuator 10 is mounted in thermally conductive communication with the manifold 20, wherein the actuator (10) comprises a rotor driven by a drive device that consumes electrical energy that generates heat, the rotor and drive device being housed within a heat conductive housing (12) in an arrangement such that the heat generated by the electrical energy is communicated to the heat conductive housing (12), the rotor being interconnected to the valve pin (17) in an arrangement such that the valve pin (17) is drivable along the axis (A) between an upstream fully gate open position and a downstream gate closed position, the housing (12, 12a) being mounted in thermal communication with the manifold (20), wherein the cooling device 800 comprises:

a highly heat conductive proximal base (803) and at least one highly heat conductive leg 800l extending a selected upstream longitudinal length UL from the proximal base 800m and forming a reception aperture or recess (800ra) in which the actuator 10 is mountable in close proximity to the leg 800l such that heat generated by the electrical energy is transmitted to the one or more legs 800l, the one or more legs 800l being formed to include one or more spring joints 800s along the longitudinal length UL that are resiliently deformable under compression to exert a spring force UF along the longitudinal length UL of the one or more legs 800l, the proximal base (803) being mounted between the actuator 10 and the manifold 20 in an arrangement wherein an upstream distal end surface 800a of the one or more legs 800l is movable through the spring joints 800s toward and away from the actuator 10, the clamp plate, the mold 300, the manifold, the actuator and the heat transmitter being assemblable together in an arrangement wherein the one or more spring joints 800s are deformed by engagement between the distal end surface 800a and a surface 80a of the clamp plate 80, the one or more deformed spring joints 800s urging the distal end surface 800a of the cooling device 800 into compressed engagement with the clamp plate 80, 80a at least when the manifold is heated to an elevated operating temperature.

In another aspect of the invention there is provided an injection molding apparatus (5) comprising a clamp plate (80), a heated manifold (20), an actuator (10), a mold (300) and a cooling device (500) that cools the actuator (10), wherein when assembled the clamp plate (80) and the mold (300) are interconnected and spaced apart from each other, the manifold (20) is disposed between the clamp plate and the mold and the actuator (10) is mounted in thermally conductive communication with the manifold (20), wherein the actuator (10) comprises a rotor driven by a drive device that consumes electrical energy that generates heat, the rotor and drive device being housed within a heat conductive housing (12) in an arrangement such that the heat generated by the electrical energy is communicated to the heat conductive housing (12), the rotor being interconnected to the valve pin (17) in an arrangement such that the valve pin (17) is drivable along the axis (A) between an upstream fully gate open position and a downstream gate closed position, the housing (12, 12a) being mounted in thermal communication with the manifold (20), wherein the cooling device (500) comprises:
a heat transmitter comprising a highly heat conductive distal arm or member (502) and a highly heat conductive proximal base or member (504) attached to the housing body such that heat generated by the electrical energy that is communicated to the housing body is communicated to the proximal base or member,
the distal arm or member (502) being mounted by a spring loadable interconnection or engagement (506) to or with the proximal base or member (504) that conducts heat generated by the electrical energy from the proximal base or member (504) to the distal arm or member (502), the distal arm or member (502) being comprised of a thermally conductive material having a distal end surface (502a) for engaging the clamp plate (80, 80a) under a spring load,
the proximal base or member (504) being mounted to the housing body (12) of the actuator (10) in an arrangement wherein the distal end surface (502a) of the distal arm or member (502) is movable through the spring loadable interconnection (506) toward and away from the actuator (10),
the distal arm or member (502) being mounted to the proximal member (504) in an arrangement wherein the spring loadable interconnection (506) is movable in a direction laterally toward and away from the axis (A) of the actuator housing (12), the spring loadable interconnection (506) being disposed between the distal arm or member and the proximal base or member (504) such that the spring loadable interconnection can exert a spring load (UF) between the proximal base or member (504) and the distal arm or member (502) that urges the distal arm or member in a radial or lateral direction relative to the axis (A),
the clamp plate, the mold (300), the manifold, the actuator and the heat transmitter being assemblable together in an arrangement wherein the spring loadable interconnection (506) is loaded urging the distal end surface (502a) of the movable arm or member (502) into compressed engagement with the clamp plate (80, 80a) at least when the manifold is heated to an elevated operating temperature.

In such an apparatus the spring or spring loadable interconnection (506) preferably has an amount or degree of mass that renders the spring (506) substantially non-heat conductive between the proximal (504) and distal (502) members.

The spring or spring loadable interconnection (506) can have engagement surfaces 506es that engage against complementary opposing engagement surfaces (504us, 502us) of proximal (504) and distal (502) members having a selected area of engagement that renders spring (506) substantially non-heat conductive between the proximal and distal arms or members.

The actuator (10) is preferably interconnected to a valve pin (17) that is drivable along an axis A, the housing body (12) being mounted in thermally conductive contact with one or more actuator mounts (50, 60, 800) that are mounted on the manifold (20) downstream of the housing body (12) along the axis (A),
the proximal base (504) of the cooling device (500) being mounted to a surface (12ls) of the housing body (12) that is spaced laterally (12ld) from the axis (A) such that the proximal base or member (504) is spaced laterally apart from contact with the one or more actuator mounts (50, 60, 800).

In another aspect of the invention there is provided a method of cooling the actuator of the apparatus according to an apparatus described immediately above comprising assembling the clamp plate, the mold, the manifold, the actuator and the cooling device of the apparatus such that the spring loadable interconnection is loaded urging the distal end surface of the rod into compressed engagement with the clamp plate.

In another aspect of the invention there is provided an injection molding apparatus (5) comprising a clamp plate (80), a heated manifold (20), an actuator (10) interconnected to a valve pin (17) having an axis (A), a mold (300) wherein, when assembled, the clamp plate (80) is mounted upstream of the mold (300), the manifold (20) being disposed between the clamp plate and the mold,
an actuator (10) comprising a rotor (60) driven by a drive device (174) that consumes electrical energy (187) that generates heat (197), the rotor and drive device being housed within a heat conductive housing (12) in an arrangement such that the heat (197) generated by the electrical energy (187) is communicated to the heat conductive housing (12), the rotor (60) being interconnected to the valve pin (17) in an arrangement such that the valve pin (17) is drivable along the axis (A) between an upstream fully gate open position and a downstream gate closed position,
a thermal conductor (500) comprised of a thermally conductive material having first (500f) and second (500s) heat conductive surfaces disposed between the clamp plate (80) and the heat conductive housing (12) of the actuator, the heat conductive housing (12) being mounted in thermal communication with the first conductive surface (500f),
the heat conductive housing (12) and the thermal conductor (500) being mounted within a complementary recess (80ra) in clamp plate (80) having an access aperture (80ac) that enables manual access to the heat conductive housing (12) with the clamp plate (80) remaining in an assembled operating condition together with the mold (300) and manifold (20),
the second conductive surface (500s) of the thermal conductor being urged into contact with the clamp plate (80) under a spring force (SF) exerted between the actuator (10) and the thermal conductor (500),
the heat (197) generated by the electrical energy (187) being conducted from the actuator housing (12) to the clamp plate (80) via conduction of the heat (197) from the first conductive surface (500F) to the second conductive surface (500s) and contact of the second conductive surface (500s) with the clamp plate (80).

Such an apparatus can further comprise a spring (SPR) comprised of a heat conductive material, the spring being disposed in intimate or compressed contact with a heat conductive surface (12hcs) of the actuator housing (12) and a heat conductive surface (500f) of the thermal conductor (500), the spring (SPR) exerting the spring force (SF) between the actuator (10) and the thermal conductor (500) and conducting heat (197) generated by the electrical energy (187) to the thermal conductor (500).

In such an apparatus, the first conductive surface (500f) is preferably adapted to be slidably engaged (SE) under compression with an outside surface (120s) of the actuator housing (12) such that heat (197) generated by the electrical energy (187) is conducted between the actuator housing (12) and the thermal conductor (500) via the slidable engagement (SE), the second conductive surface (500s) being adjustable in distance toward and away from the actuator housing by sliding movement (SE) of the first conductive surface (500f) on the outside surface (12os) of the actuator housing.

The thermal conductor, spring, actuator, manifold and clamp plate are typically assembled together in an arrangement wherein the spring is loaded urging the second conductive surface of the thermal conductor into compressed engagement with the clamp plate.

Such an apparatus can further comprise a thermally conductive mount (600) to which the actuator (10) is mounted on an upstream side (USM) of the mount (600),
the mount being mounted on a downstream side (DSM) in an arrangement in thermal communication with the manifold (20), the mount being mounted in relation to the manifold such that heat (607) generated by the manifold (20) is conducted from the manifold to the mount,
the mount including a wing mechanism (610) extending laterally or radially (RADI) away from the mount and having a wing engagement surface (620) that engages a complementary surface (80cs) of the clamp plate such that heat (607) conducted from the manifold (20) to the mount (600) is further conducted via the wing mechanism (610) to the clamp plate (80) upon assembly of the mount (600) together with the clamp plate, manifold, mold and actuator into an operating condition where the manifold is brought to elevated operating temperature.

The wing (610) can be adapted to dispose the wing engagement surface (620) in compressed contact with the complementary surface (80cs) of the clamp plate when the clamp plate, manifold and mold are assembled together with the actuator and mount into an operating arrangement and the manifold is brought to elevated operating temperature.

The wing (610) is typically adapted to exert a spring force (SF) that disposes the wing engagement surface (620) in constant compressed contact with the complementary surface (80cs) of the clamp plate.

The spring force exerted by the wing is preferably created by deformation of a resiliently bendable or deformable portion (WP) of the wing,
the mount (600) comprising a highly thermally conductive base (630) to or on which the actuator housing (12) is mounted, the base (630) being disposed between the manifold (20) and the actuator housing (12) receiving heat (607) from the manifold (20) and conducting said heat (607) to the wing (610),
the wing (610) being attached to, formed together with or extending from a lateral surface (635) of the base such that heat (607) generated by the manifold (20) and received by the base (630) is transmitted to the wing (610).

In another aspect of the invention there is provided an injection molding apparatus comprising a clamp plate 80, a heated manifold 20, an actuator 10 interconnected to a valve pin 17 having an axis A, a mold 300 wherein, when assembled, the clamp plate 80 is mounted upstream of the mold 300, the manifold 20 being disposed between the clamp plate and the mold,
an actuator 10 comprising a rotor driven by a drive device that consumes electrical energy that generates heat, the rotor and drive device being housed within a heat conductive housing (12) in an arrangement such that the heat (197) generated by the electrical energy (187) is communicated to the heat conductive housing (12), the rotor (60) being interconnected to the valve pin (17) in an arrangement such that the valve pin (17) is drivable along the axis (A) between an upstream fully gate open position and a downstream gate closed position,
a clamp plate (80), a heated manifold (20) and a mold (300) having a mold cavity,
a thermally conductive mount (600) to which the actuator (10) is mounted on an upstream side (USM) of the mount,
the thermally conductive mount (600) being mounted on a downstream side (DSM) in an arrangement in thermal communication with the manifold (20), the mount being mounted in relation to the manifold such that heat (607) generated by the manifold is conducted from the manifold to the mount,
the mount including a wing mechanism (610) extending laterally or radially away (RADI) from the mount and having a wing engagement surface (620) that engages a complementary surface (80cs) of the clamp plate (80) such that heat (607) conducted from the manifold to the mount is further conducted via the wing mechanism to the clamp plate upon assembly of the mount together with the clamp plate, manifold, mold and actuator into an operating condition where the manifold is brought to elevated operating temperature,
the heat conductive housing (12) being mounted to mount (600) within a complementary recess (80ra) in clamp plate (80) and having an access aperture (80ac) that enables manual access to the heat conductive housing (12) with the clamp plate (80) remaining in an assembled operating condition together with the mold (300) and manifold (20).

In such an apparatus the wing is typically adapted to dispose the wing engagement surface in compressed contact with the complementary surface of the clamp plate when the clamp plate, manifold and mold are assembled together with the actuator and mount into an operating arrangement and the manifold is brought to elevated operating temperature.

The wing is preferably adapted to exert a spring force that disposes the wing engagement surface in constant compressed contact with the complementary surface of the clamp plate.

The spring force exerted by the wing is typically created by deformation of a portion of the wing.

Such an apparatus can further comprise a thermal conductor comprised of a thermally conductive material having first and second heat conductive surfaces disposed between the clamp plate and the heat conductive housing of the actuator, the heat conductive housing being mounted in thermal communication with the first conductive surface,
the clamp plate being mounted in thermal communication with the second conductive surface,
the second conductive surface of the thermal conductor being urged into contact with the clamp plate under a spring force exerted between the actuator and the thermal conductor,
the heat generated by the electrical energy being conducted from the actuator housing to the clamp plate via conduction of the heat from the first conductive surface to the second conductive surface and contact of the second conductive surface with the clamp plate.

Such an apparatus can further comprise a spring comprised of a heat conductive material, the spring being disposed in intimate or compressed contact with a heat conductive surface of the actuator housing and a heat conductive surface of the thermal conductor, the spring exerting the spring force between the actuator and the thermal conductor and conducting heat generated by the electrical energy to the thermal conductor.

The first conductive surface can be adapted to be slidably engaged with an outside surface of the actuator housing such that heat is conducted between the actuator housing and the thermal conductor via the slidable engagement, the second conductive surface being adjustable in distance toward and away from the actuator housing by sliding movement of the first conductive surface on the outside surface of the actuator housing.

The thermal conductor, spring, actuator, manifold and clamp plate are typically assembled together in an arrangement wherein the spring is loaded urging the second conductive surface of the thermal conductor into compressed engagement with the clamp plate In another aspect of the invention there is provide a method of performing an injection molding cycle comprising operating an apparatus described herein to form an injection molded part.

In another aspect of the invention there is provided a method of cooling the actuator of the apparatus described immediately above comprising assembling the clamp plate, the mold, the manifold, the actuator and the cooling device of the apparatus such that the spring loadable interconnection is loaded urging the distal end surface of the rod into compressed engagement with the clamp plate.

BRIEF DESCRIPTION OF THE DRAWINGS

The above and further advantages of the invention may be better understood by referring to the following description in conjunction with the accompanying drawings in which:

FIG. 1D is a bottom persepective view of the thermally conductive mount and the wings of the FIG. 1C apparatus.

FIG. 5D is a front view similar to FIG. 5B but showing heat pipes alternatively and additionally mounted vertically in the heat transmitter elements and actuator body.

FIG. 5E is a cross-sectional side view taken along lines 5E-5E of FIG. 5D.

FIG. 5F is a front view similar to FIG. 5D but with additional heat pipes mounted horizontally to the heat transmitter elements.

FIG. 5G is a cross-sectional side view taken along lines 5G-5G of FIG. 5F.

DETAILED DESCRIPTION

Figure 1:
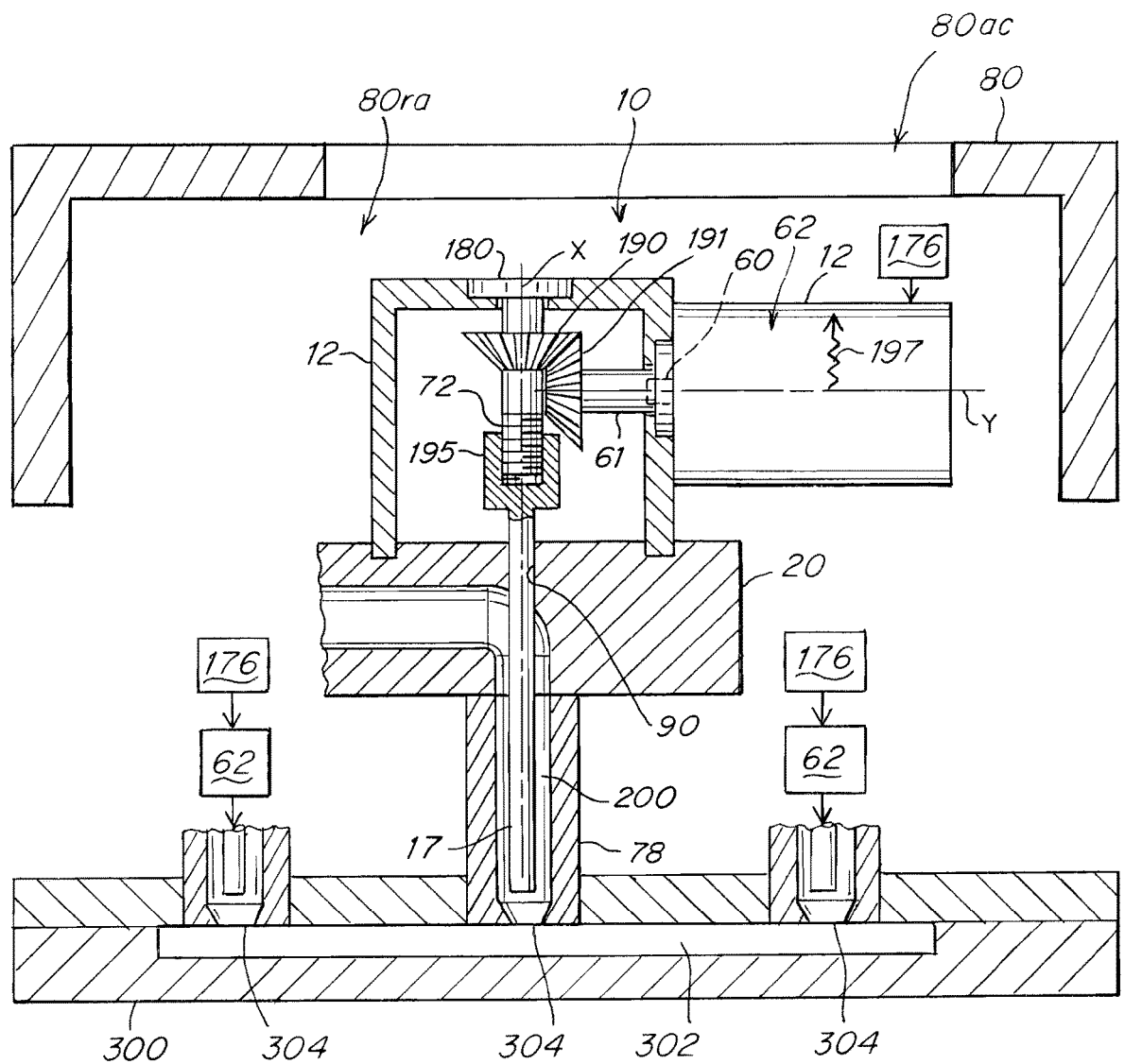
FIG. 1 is a front partial sectional view of a first embodiment of an electrical energy powered actuator mounted to a heated manifold.
Figure 1A:
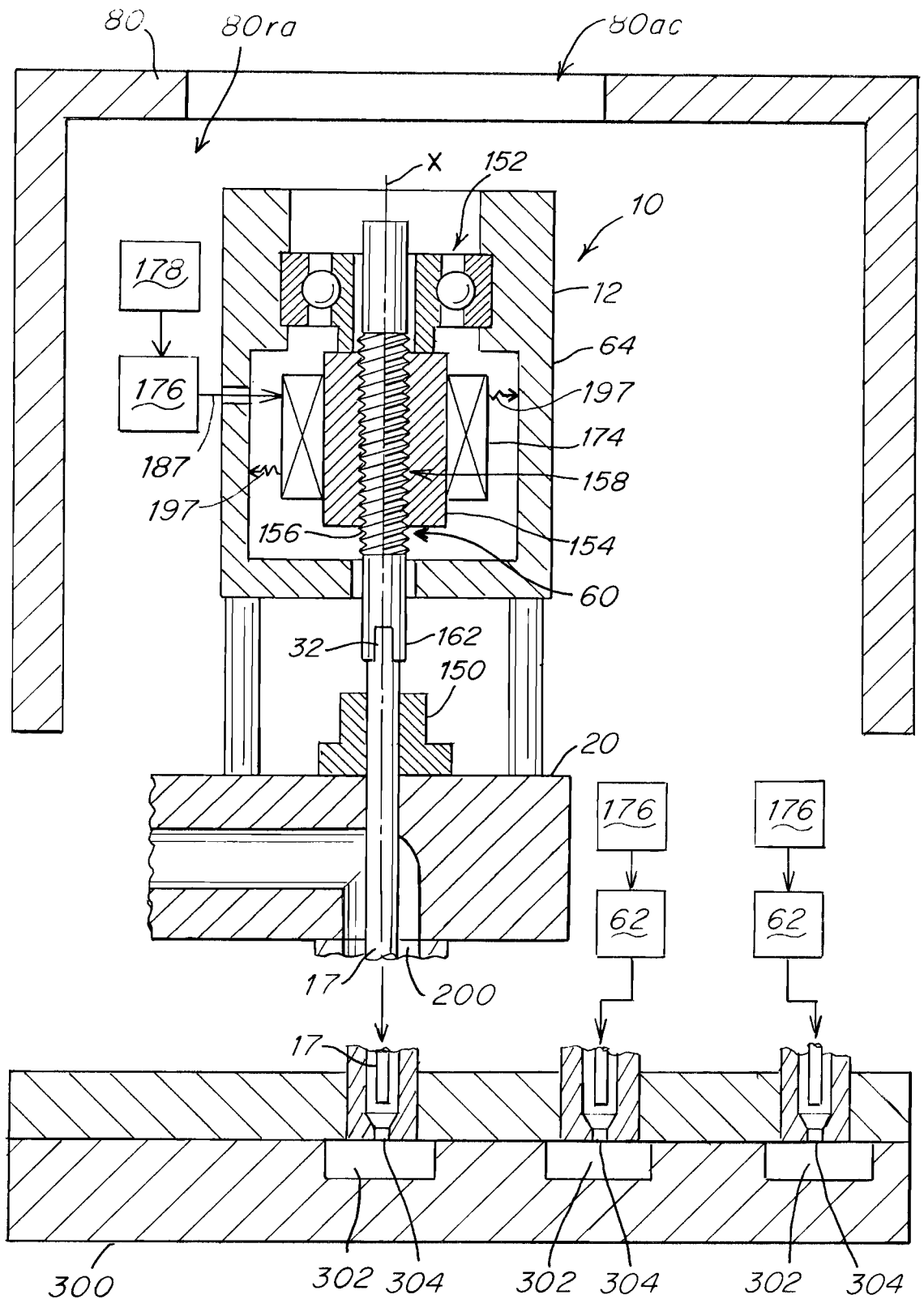
FIG. 1A is a front partial sectional view of another embodiment of an electrical energy powered actuator mounted to a heated manifold.
Figure 1B:
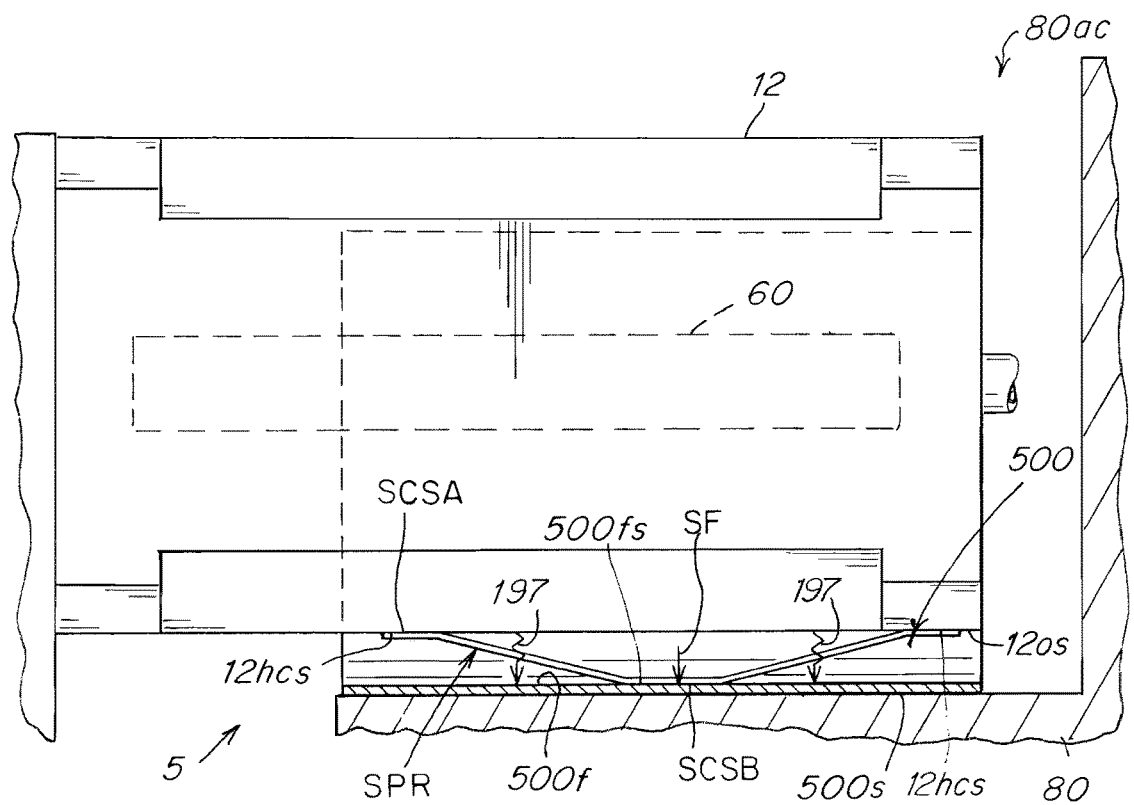
FIG. 1B is a perspective partial sectional view of an electric actuator similar to the FIG. 1 embodiment mounted within a recess in a top clamp plate with the housing of the electric actuator having a thermal conductor arranged in sliding contact with the outside surface of the actuator housing and being urged by a spring adapted to apply a spring force between the actuator housing and the thermal conductor so as to maintain the thermal conductor in heat conductive contact with the top clamp plate with the spring also being in thermal contact with both the actuator housing and the thermal conductor.
Figure 1E:
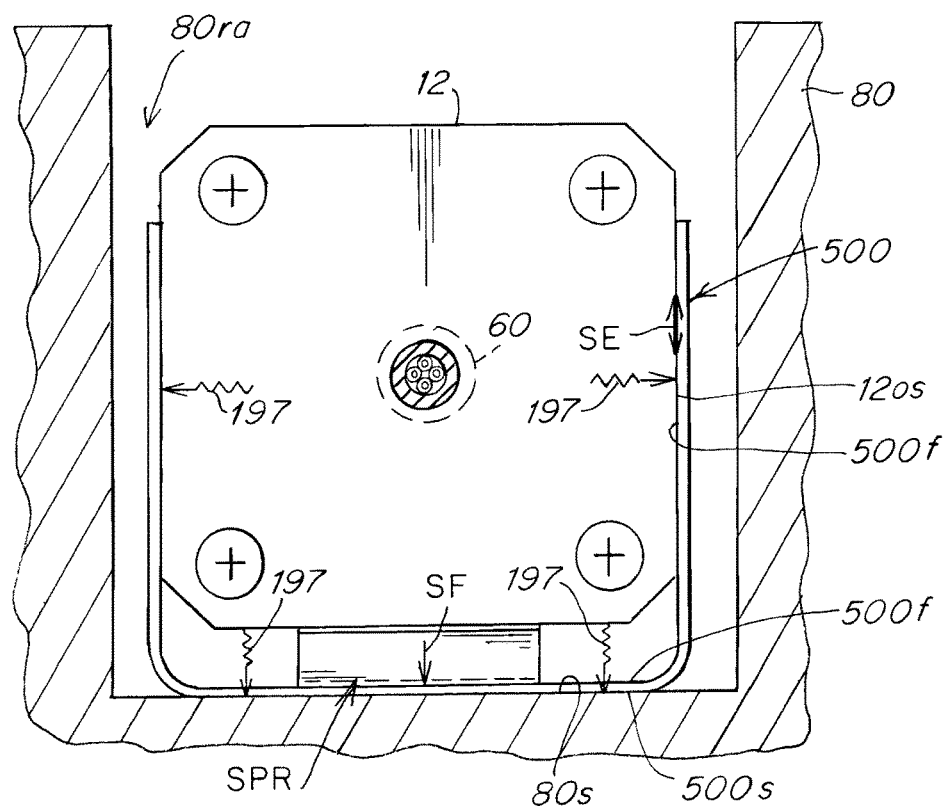
FIG. 1E is an end view of the actuator housing of the FIG. 1 apparatus showing certain details of the relationship between the thermal conductor and the actuator housing and the top clamp plate.
Figure 1C:
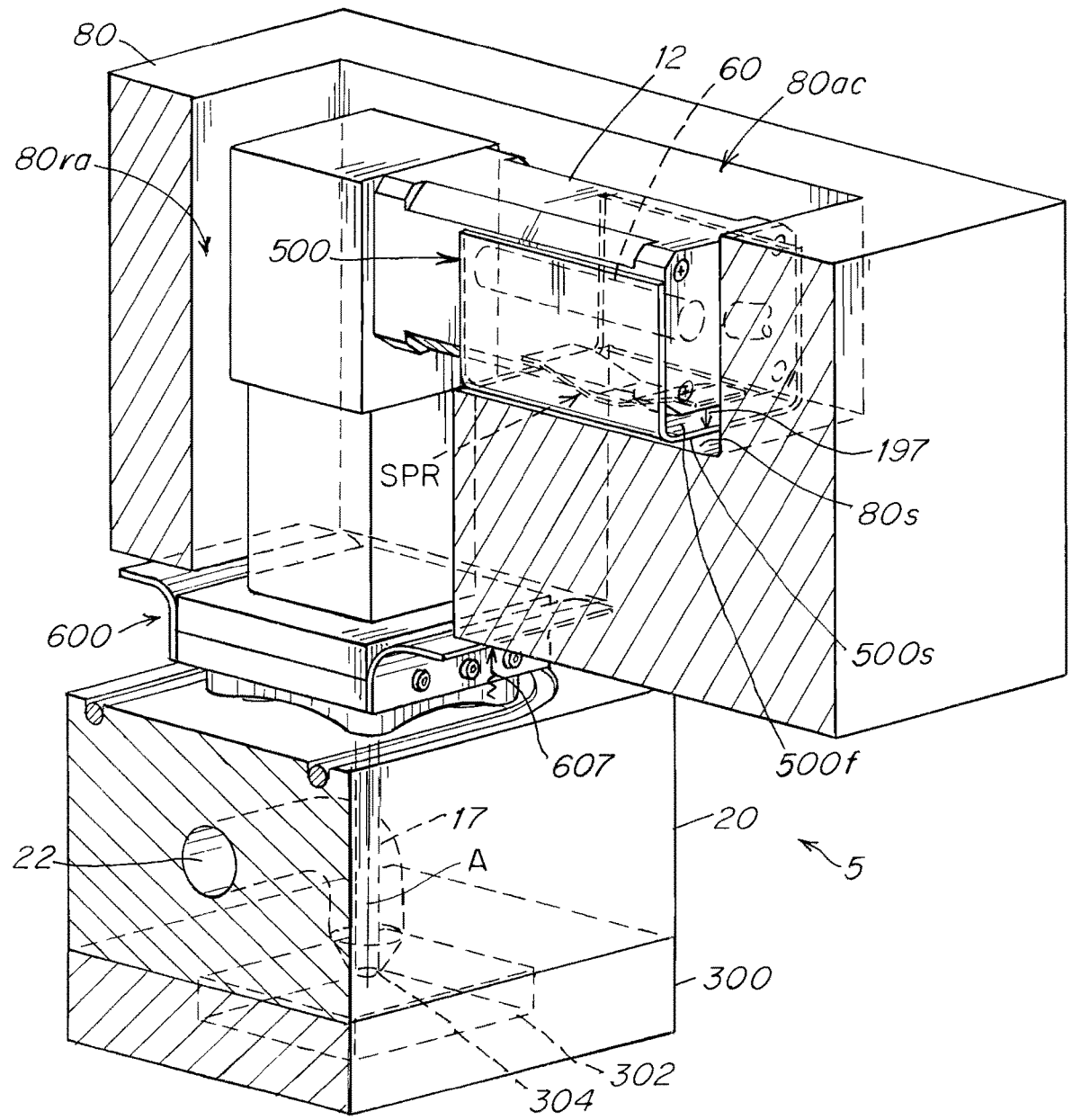
FIG. 1C is a perspective view similar to FIG. 1B showing further details of the mounting of the actuator on or to a heated manifold and further showing a second thermally conductive mount having wings for enabling conduction of heat from the manifold to the clamp plate away from the actuator housing.

FIGS. 1-1E show an electric motor actuator 10 comprised of a rotor or shaft 60 driven by electricity or electrical energy 187 that is fed or input by controller 176 into coils 174 attached to a nut 154 to rotatably drive the nut 154. The electrically driven motor 62 drives a pin 17 along its axis without rotation as follows. In the FIG. 1 embodiment, the pin 17 has a pin head 195 interconnected via threads to a screw 72 which is screwably engaged within a complementary nut aperture within the nut coupling component 195. As shown, the pin head 195 is interconnected to screw 72 inside the heat conductive housing 12, the pin 17 is slidably mounted in a complementary receiving aperture 90 within the manifold housing 75 such that the pin 50 is disposed within manifold melt channel for slidable movement along pin axis X which in the embodiment shown is coaxial with motor shaft 60.

Figure 10:
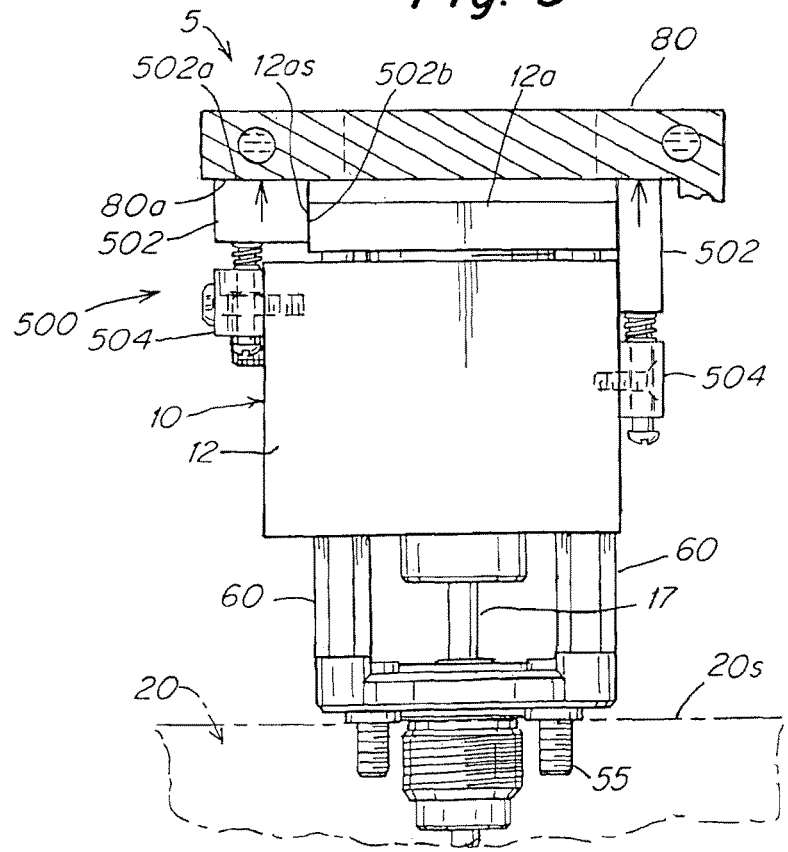
FIG. 10 is a side view of FIG. 9 additionally showing a top clamp plate with the distal plate members 502 of the heat transmissive members in spring loaded engagement therewith.
Figure 11:
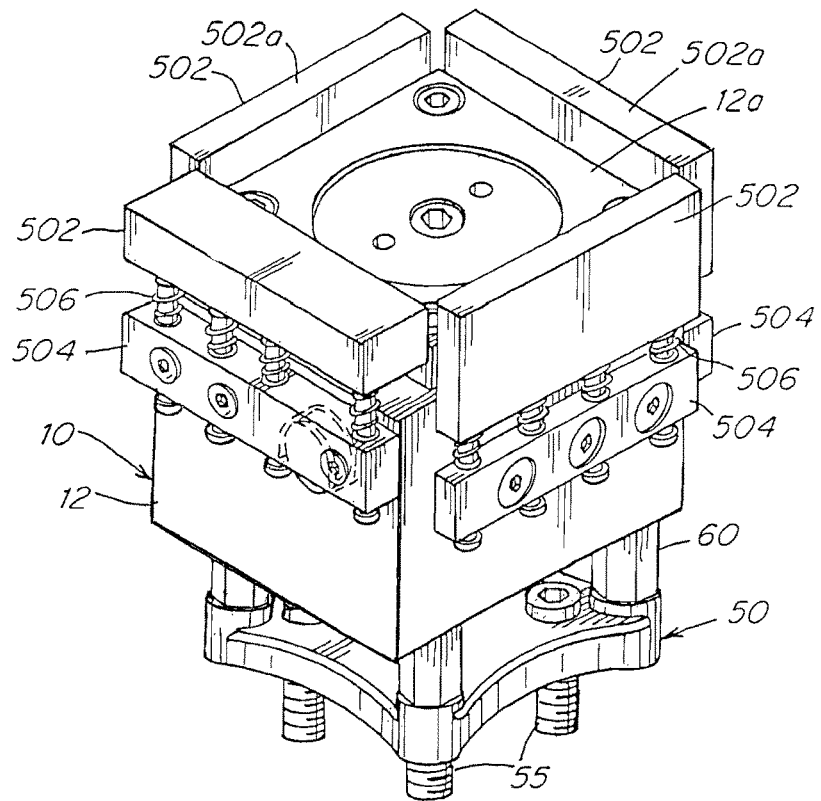
FIG. 11 is a top perspective view of an actuator having four separate cooling devices mounted to four separate side walls of the actuator where the cooling devices each comprise a proximal base 504 and a distal plate member 502 that is spring loadably mounted on the base 504 with the distal plates being 502 in slidable engagement contact with a surface of the housing of the actuator.
Figure 12:
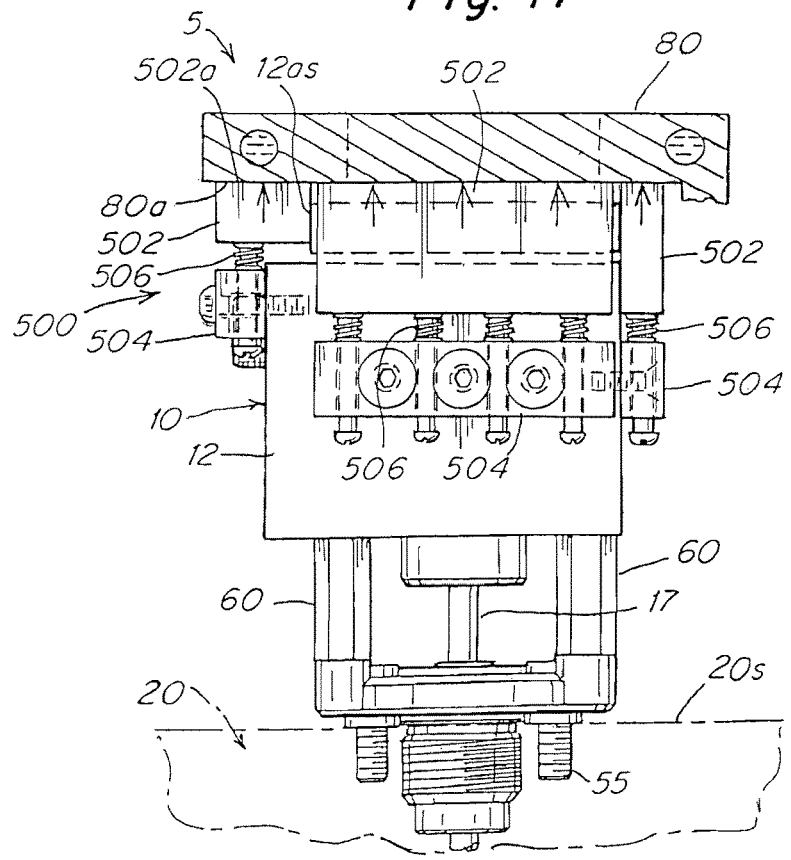
FIG. 12 is a side view of FIG. 11 additionally showing a top clamp plate with the distal plate members 502 of the heat transmissive members in spring loaded engagement therewith.

With reference to FIGS. 1-1E, 4, 23 the electric energy or electricity 187 consumed by the motor 62 generates heat 197 as a byproduct of the rotational drive of the rotor 60. The heat 197 is first absorbed by or transmitted to the actuator housing 12. As shown in FIGS. 1B, 10, 1E the electric motor heat 197 absorbed by the housing 12 is transmitted to a heat or thermal conductor 500 by intimate slidable contact (SF) between an interior surface 500f of the thermal conductor (500) and an outer surface 12cs of the actuator housing 12. Manifold heat 197 is also transmitted from actuator housing 12 to conductor 500 by spring SPR via compressed contact between a conducting surface SCSA of the spring SPR and a complementary surface 12hcs of the actuator housing and further by compressed contact by a second conductive surface SCSB of the spring SPR and a complementary surface 500fs of the thermal conductor 500.

As shown in FIGS. 1, 1A, 1C, 1D, 1E, 25A, 25B, 25C, the heat conductive housing (12) and the thermal conductor (500) are readily mountable by hand or manually within and readily removable from a complementary receiving recess 80ra provided in clamp plate (80). The clamp plate is provided with an access aperture (80ac) that enables ready manual access to the heat conductive housing (12) for insertion of the housing (12) into and removal from the receiving aperture (80ra) provided within the clamp plate (80) while the clamp plate (80) remains in an assembled operating condition together with the mold (300) and manifold (20). Thus, the clamp plate 80 and system 5 are adapted to enable the actuator housing 12 to be readily manually installed within and removed from the recess 80ra and replaced without disassembly of the clamp plate 80 from the mold 300 or heated manifold 20.

An outside surface 500s of the thermal conductor 500 is urged into compressed contact with a complementary surface 82 of the clamp plate 80 which contact causes the electrical energy generated heat to transmit or conduct from the thermal conductor 500 to the clamp plate 80 thus cooling the actuator 10. The clamp plate 80 is typically cooled via water or other coolant.

A downstream end of the actuator housing (12) is mounted in thermally conductive contact on an upstream side (USM) of a mount (600). The mount 600 is comprised of an upstream thermally conductive mounting plate 634 on which the downstream end of the actuator housing is mounted in thermally conductive contact. A downstream mount plate 632 is attached in thermally conductive contact to the the upstream plate 634. Heat contained in the actuator housing 12 is thus conducted to the downstream mount plate 632 and further along to the wing 610, an inside surface 612 of which is attached in thermally conductive contact to an outside surface 635 of the downstream mount plate 632. Heat (607) generated by the manifold (20) is conducted from the manifold to the mount mount plate 632 which is in turn conducted to the wing 610.

The wing mechanism (610) extends laterally or radially (RADI) away from the mount and having a wing engagement surface (620) that engages a complementary surface (80cs) of the clamp plate such that heat (607) conducted from the manifold (20) to the mount plate 632 is further conducted via the wing mechanism (610) to the clamp plate (80) upon assembly of the mount (600) together with the clamp plate, manifold, mold and actuator into an operating condition where the manifold 20 is brought to elevated operating temperature. The wing (610) has an upstream engagement surface (620) that is disposed in compressed contact with a complementary surface (80cs) of the clamp plate 80 when the clamp plate, manifold and mold are assembled together with the actuator and mount into an operating arrangement and the manifold is brought to elevated operating temperature. The wing (610) is adapted to exert a spring force (SF) that disposes the wing engagement surface (620) in constant compressed contact with the complementary surface (80cs) of the clamp plate. The spring force SF exerted by the wing is typically created by deformation of a resiliently bendable portion (WP) of the wing.

The wing (610) can be attached to, formed together integrally with or otherwise adapted to extending from a lateral surface (635) of the base such that heat (607) generated by the manifold (20) and received by the base (630) is transmitted to the wing (610).

In the FIGS. 1, 1B, 1C, 1D, 1E embodiments, the rotatably driven shaft or rotor 60 of the motor (not shown) is non-coaxially aligned with axes A or X, the axes of movement of the valve pin 17. As shown the shaft or rotor 60 of an electrically driven motor 10 is drivably interconnected to a slidably mounted pin 17 through a bevel gear engagement between the head 190 of a screw 72 and the head 191 of an extension member 61 of the motor shaft 60. As can be readily imagined, the screw component could alternatively have threads along its length (in place of the beveled head 190) which mesh with a worm at the end of extension 61(in place of the beveled member 191). As shown, the axis Y of the shaft 60 is not coaxial with (perpendicular to) the axis X of the pin 17 and the actuating screw mechanism 72 such that axial forces which may occur along axis X are not transmitted along axis Y to the shaft 60.

In the FIGS. 1, 1B, 1C, 1D, 1E embodiments, the pin 17 has a nut 195 integrally forming the end of the pin 17 which is drivably interconnected to, i.e. screwably engaged with, the actuating screw 72. The pin 17 is slidably mounted in a complementary aperture 90 within manifold 20 for movement along its axis X within melt flow channel 20a. The actuating screw 72 is mounted via bearing 180 to housing 12 which is, in turn, fixedly mounted to manifold 20 such that screw 72 is drivably rotatable around axis X and axially stationary along axis X. Screw 72 is drivably rotatable around axis X via the screwable engagement between bevel gears 190,191. Shaft extension member 61 is coaxially connected to the motor shaft 60 such that as the shaft 60 is rotatably driven around axis Y the extension member 61 and its associated bevel gear 191 are simultaneously rotatably driven around axis Y. As can be readily imagined, as screw 72 is rotatably driven around axis X via the meshed bevel gears 190,191, pin 17 is translationally driven along axis X via the screwable engagement between nut end 195 and screw 72. Thus the screw 72 acts as an actuating member to and through which axial forces are transmitted to and from pin 17. The electrically driven motor 10 can be interconnected to a controller 176 which receives data/signals representative of melt flow or machine component conditions and has a predetermined algorithm for directing the degree of electrical energy input 187 and thus drive of the motor according to the received data/signals and the predetermined algorithm, program or protocol.

In an alternative embodiment shown in FIG. 1A, the end 162 of a screw 158 of an electrically driven rotor 60 is directly connected to the end 32 of a pin 17. In such an embodiment, the screw 158 and associated nut 154 act as an actuating mechanism. As shown, a portion of the length of the screw 158 is threaded with screw threads 156 which are screwably engaged within nut component 154. As schematically shown, nut component 154 is mounted against axial movement (along axis X) on or to bearing 152 which is in turn mounted against axial movement on or to motor housing 12 which is in turn mounted against axial movement to manifold 20. As schematically shown, nut 154 is mounted on or to the inner rotatable race of bearing 152 and is drivably rotated by electrical power 187 input to coils 174 around axis X. As nut 154 is controllably rotated, screw 158 is controllably driven and travels along axis X and pin 17 is simultaneously driven and travels axially together with screw 158. As shown, pin 17 is slidably mounted in a complementary aperture in manifold 20 and a bushing 150 which seals against leakage of molten plastic. The pin 17 extends within melt channel 20a and is movable along its axis X without rotation. By virtue of the direct coaxial connection between screw 158 and pin 50, and the rigid mounting of nut 154 against axial movement to housing 12 and the rigid mounting against axial movement of housing 12 to manifold 20 via mounts 170, axial force to which the pin 17 is subject is transmitted axially to the rotor 60 of the motor 10. As shown, a controller 176 which receives signals representative of the output of a sensor 178 is provided having a program for executing an algorithm which controls the input of electrical energy 187 or power to servomotor coils 174.

In the FIGS. 1F-3 embodiment, the apparatus 5 includes a cooling device 800 that is formed having a proximal mount 803 that is mounted between the downstream end of the actuator housing 12 and the heated manifold 20. A pair of upstream extending legs 800l extend upstream from the mount 803. The cooling device 800 is formed and adapted to form a reception aperture or recess 800ra that is complementary to and receives the actuator housing 12 such that the legs 800l are disposed in close proximity to the lateral outer surfaces 12los of the actuator housing 12. The legs 800l are formed to have an upstream extending longitudinal length UL that disposes the distal-most edge surface 800a of the legs 800l upstream beyond the upstream-most extending surface 12u of the actuator 10 when the actuator 10 is mounted in operating format within the reception aperture 800ra. The legs 800l are configured to have one or spring joints 800s along the longitudinal length UL of the legs 800l. Spring joints 800s are resiliently deformable such that when the legs 800l are subject to a compressive force along the longitudinal length UL of the legs 800l, the spring joints exert a spring force UF. The longitudinal length UL of the legs 800l, the clamp plate 80, manifold 20, actuator housing 12 and their mounting and interconnection components are selected, arranged and formed such that when the clamp plate 80, manifold 20, actuator 10 and cooling device 800 are assembled into operating format, the undersurface 80a of the clamp plate intimately engages with the distal end surface 800a under compression to cause the spring joints 800s to exert the UF force by surface 800a against surface 80a. Similarly, the same components are formed and arranged together with the formation and arrangement of cooling device 500 such that the distal end most surface 502a of distal member 502 engages the undersurface 80a of plate 80 under compression from spring load force UF, FIG. 3, exerted by springs 506 of cooling device 500 when all such components are assembled into operating format.

The term spring or spring loadable interconnection 506 as used herein means a device that is disposed and engaged between or with the distal 502 and proximal 504 members and imparts a spring force UF therebetween at least when the apparatus is assembled and the manifold 20 is brought up to elevated operating temperature. As shown in all embodiments described herein where independent springs 506 such as shown in FIGS. 1-14, 21-25G are employed, such springs typically comprise one or more conventional coil, leaf, flat wire wave, Belleville or conical spring(s) having an upper end 506u and a lower end 506l that respectively engage via engagement surfaces 506es against and between a complementary engagement surfaces 502us, 504us of the distal member 502, 507, 507m and the proximal member 504, 504aa such that the spring 506 is compressed and the distal member 502 is forcibly urged under the force UF of the spring when compressed in an upstream direction to compress the distal end surface 502a or 507a under such force UF into engagement with the undersurface 80a of the clamping plate 80 at least when the apparatus is assembled and the manifold brought up to an elevated operating temperature. Such coil or leaf or flat wire wave or Belleville or conical spring(s) typically have a degree of resilient compression that is six or more times the degree of resilient compression of the plate springs of U.S. Pat. Nos. 8,349,244 and 8,562,336, typically having a degree of resilient or elastic compression of at least about 3 mm meaning that said coil et al. springs can be repeatedly compressed by at least about 3 mm and resiliently or elastically expand or revert back to their original uncompressed condition, length or state.

Figure 5:
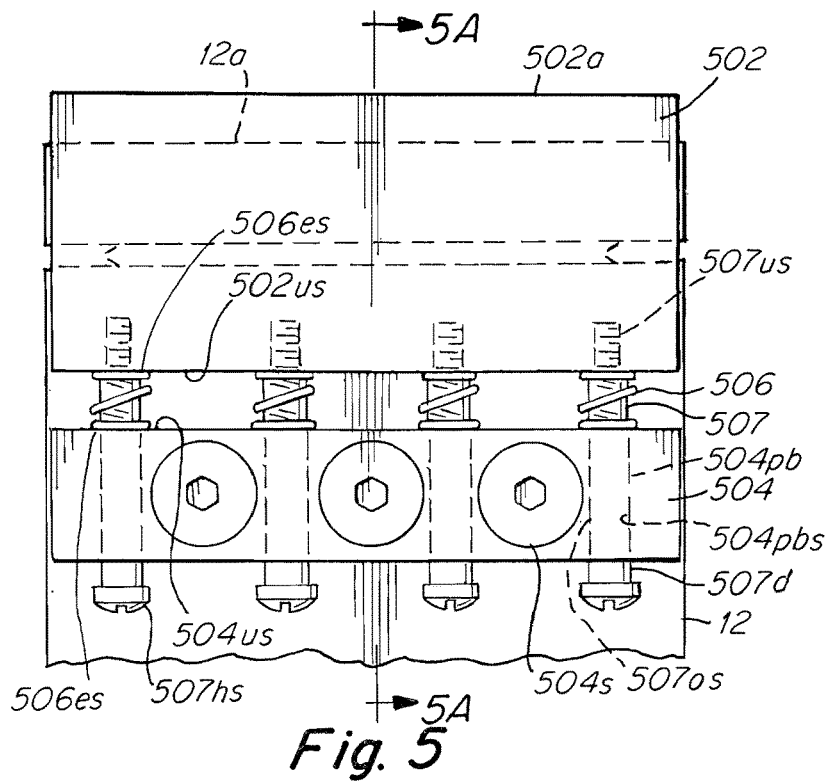
FIG. 5 is a fragmentary front view as seen along lines 5-5 of FIG. 2
Figure 5A:
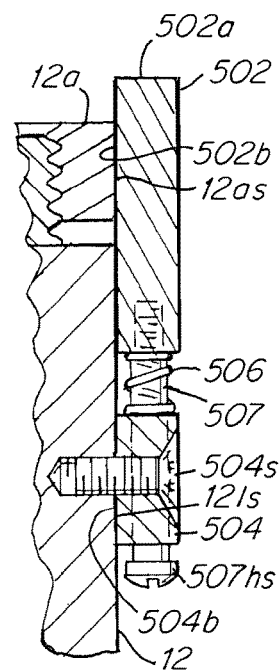
FIG. 5A is a cross-sectional side view taken along lines 5A-5A of FIG. 5.
Figure 5B:
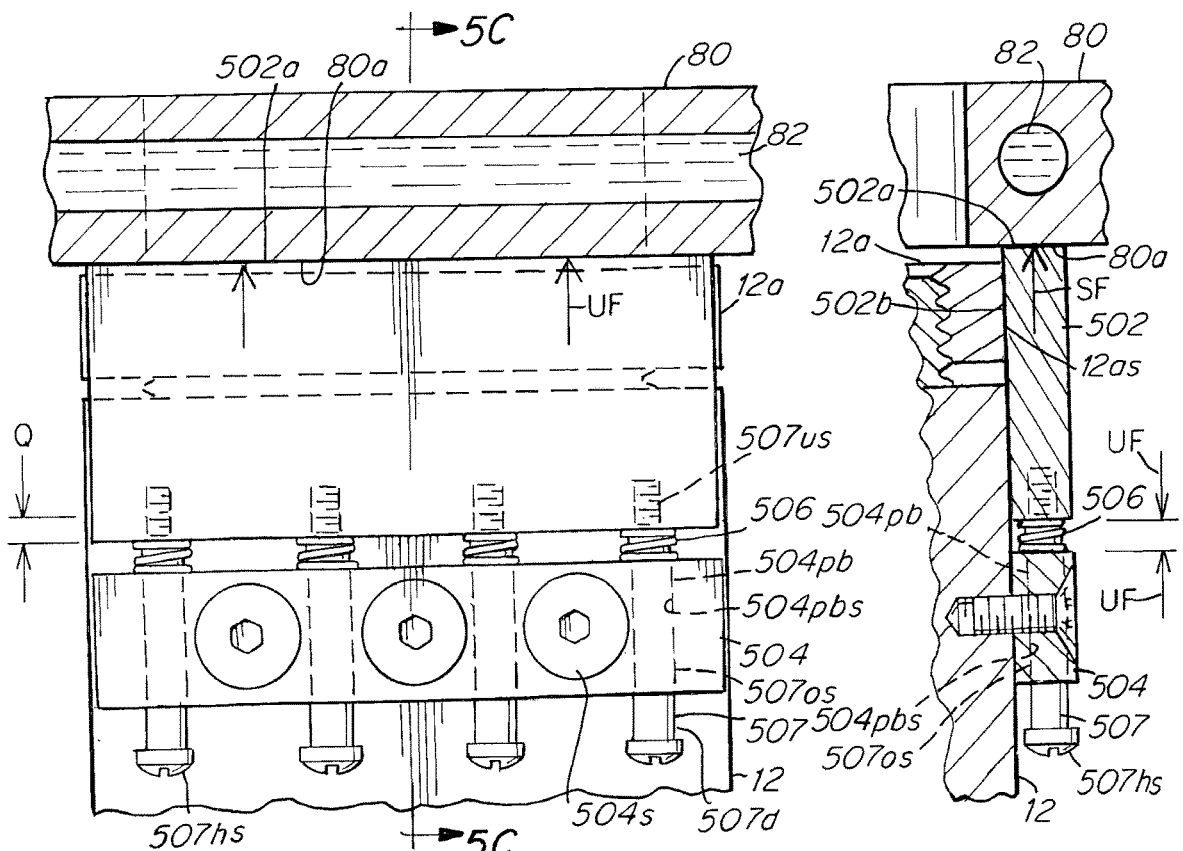
FIG. 5B is a front view similar to FIG. 5 but showing the heat convector and actuator in use with clamping plate installed.
Figure 5C:
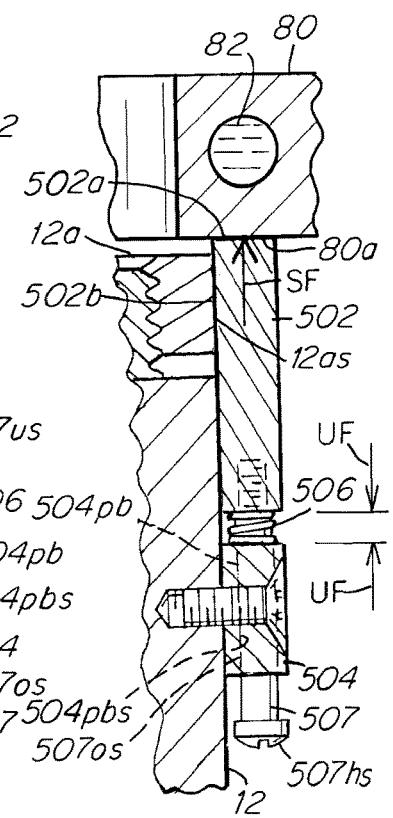
FIG. 5C is a cross-sectional side view taken along lines 5C-5C of FIG. 5B.
Figure 5H:
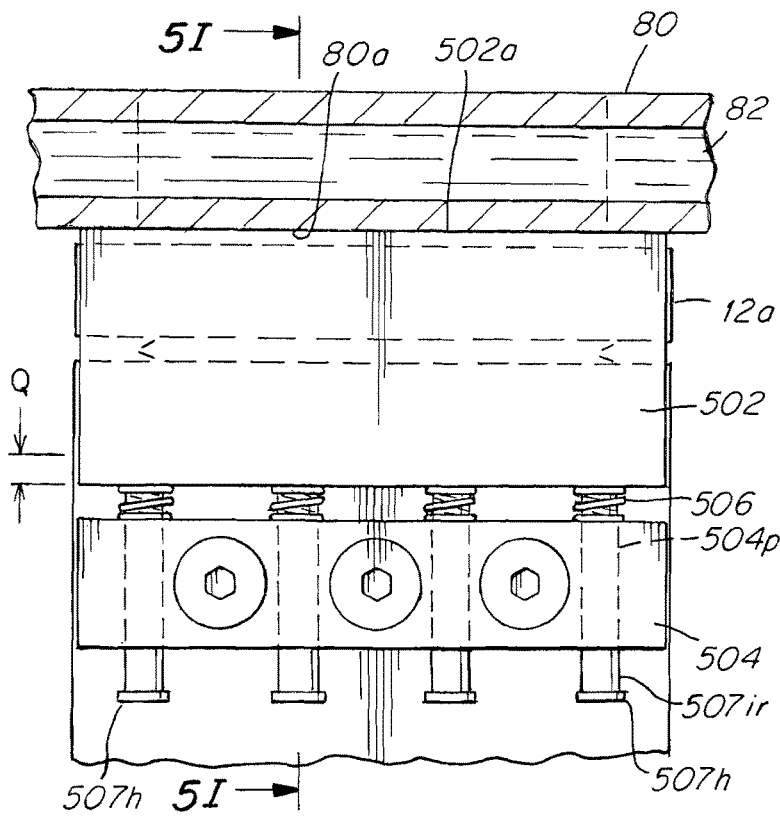
FIG. 5H is a front view similar to FIG. 5 but showing rods formed integrally with the upper heat transmitter element.
Figure 5I:
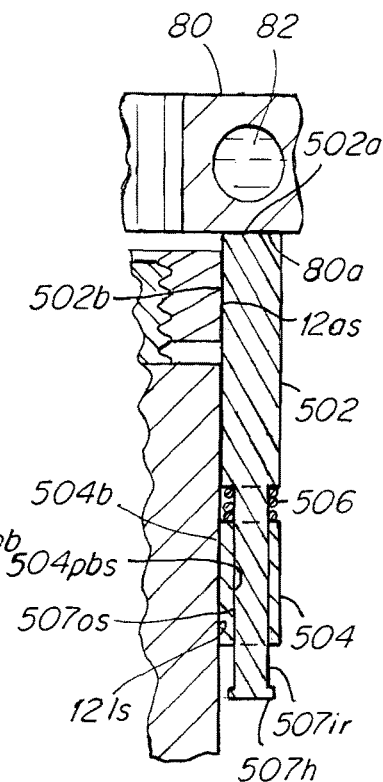
FIG. 5I is a cross-sectional side view taken along lines 5I-5I of FIG. 5H.
Figure 5J:
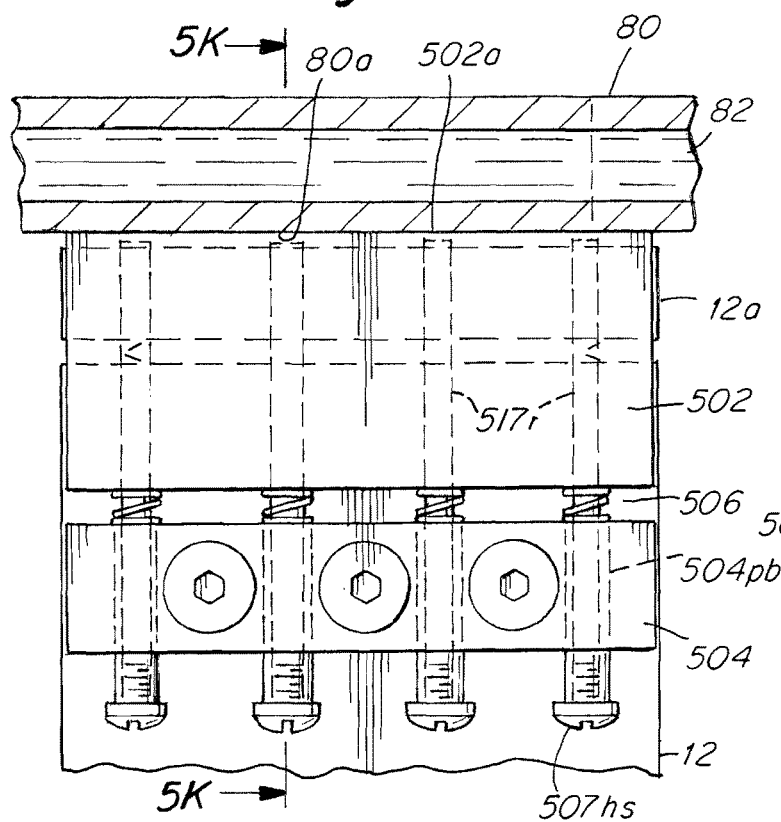
FIG. 5J is a front view similar to FIG. 5H but showing heat pipes embedded within the rods and upper heat transmitter element.
Figure 5K:
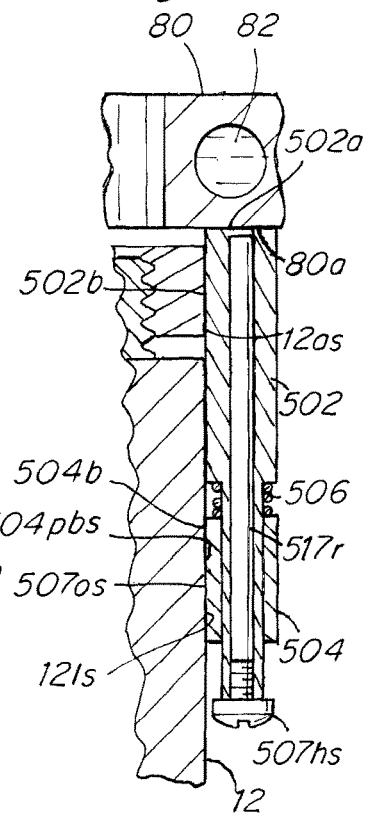
FIG. 5K is a cross-sectional side view taken along line 5K-5K of FIG. 5J.
Figure 5L:
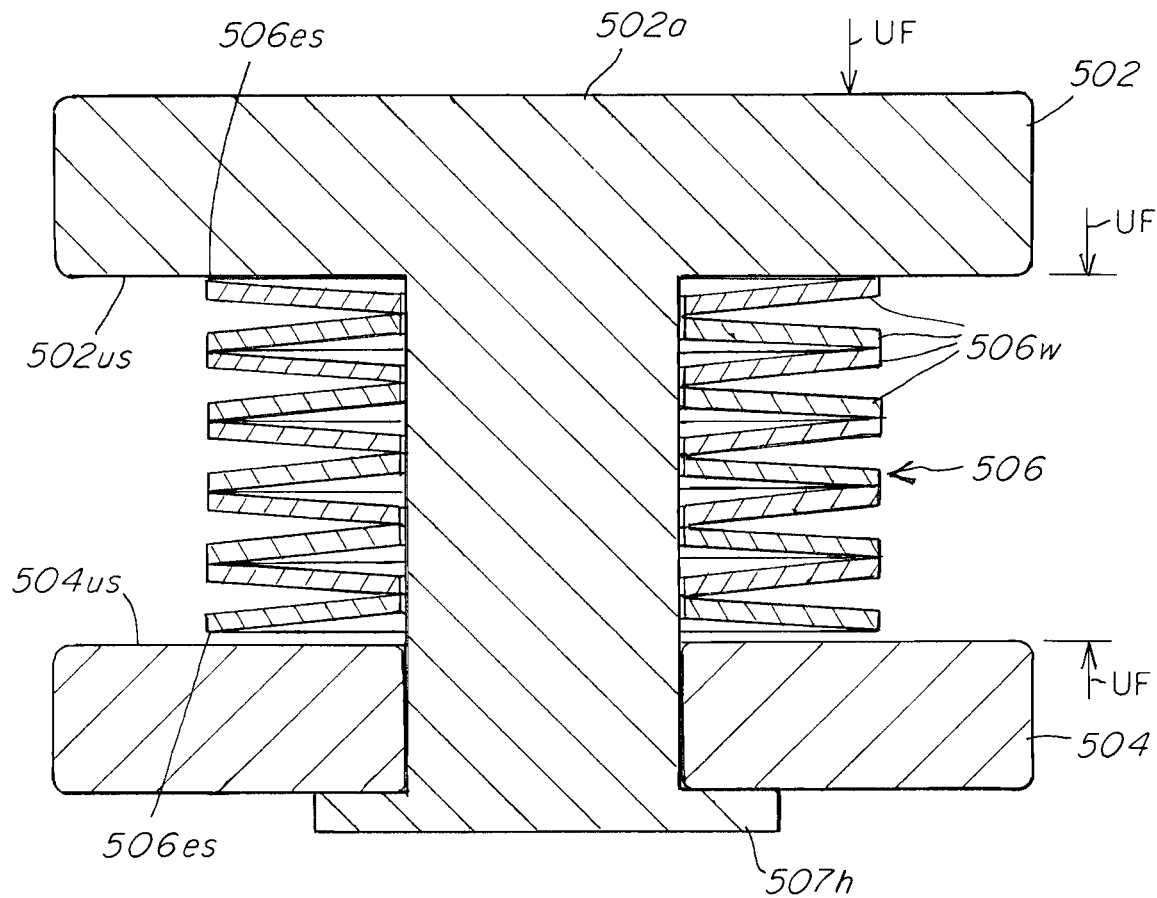
FIG. 5L is a schematic cross-sectional side view of the distal and proximal heat conductive component members of a cooling device according to the invention having a spring loadable interconnection comprised of one or series of stacked leaf, belleville, flat wire wave, conical or disc washer springs that serve as a spring between the distal and proximal members.

The proximal 504 and distal 502 arms or members typically comprise mechanically independent heat conductive bodies or members 502, 504 that are interconnected via a pin or rod or slot and engaged with each other via a spring or spring loadable interconnection 506 that is typically comprised of a non-heat conductive spring, such as a coil spring as shown in FIGS. 3, 5-5K, 23, 25-25E or one or more stacked leaf, belleville, conical or disc washers 506w or springs such as shown in FIG. 5L that act as a spring 506 between the distal and proximal members.

The spring or spring loadable interconnection 506 exerts a spring force UF, FIGS. 3, 5C, 5L, 23, 25D, between the proximal arm or member 504 and the distal arm or member 502 at least when the apparatus 5 is assembled and the manifold is brought to an elevated operating temperature. The spring or spring loadable interconnection 506 typically has engagement surfaces 506es that engage against complementary opposing engagement surfaces 504us and 502us of proximal 504 and distal 502 members such that heat conduction between members 504 and 502 is minimized and such that the spring 506 is substantially non-heat conductive. The spring or spring loadable interconnection 506 is preferably selected to have an amount or degree of mass (typically less than about 10 grams and more typically less than about 5 grams) that renders the spring 506 substantially non-heat conductive and minimizes, enables or imparts a minimal amount of, heat conduction between members 504 and 502 via or through spring or spring loadable interconnection 506. The mass of spring loadable interconnection 506 is preferably less than about 10 and most preferably less than about 5 grams. The area of engagement or contact between engagement surfaces 506es and one or both of surfaces 504us or 502us is preferably selected to be an amount or degree (typically less than about 10 square mm, typically less than about 7.5 square mm and more typically less than about 5 square mm) that renders the spring 506 substantially non-heat conductive and minimizes, enables or imparts a minimal amount of, heat conduction between members 504 and 502 via or through spring or spring loadable interconnection 506.

FIGS. 1F-25G show an injection molding apparatus 5 comprised of an actuator 10 having a housing body 12, 12a that is thermally conductive and mounted in thermal communication with a heated manifold 20 into which fluid injection material 102 is injected from an injection machine 100 into and through one or more manifold distribution channels 22 that deliver fluid downstream to a downstream fluid delivery channel 200 such as the bore of a nozzle that terminates at its downstream end in a gate 304 that communicates with the cavity 302 of a mold 300. The actuator 10 includes a piston 14 that is controllably drivable along a drive axis A in a reciprocal upstream and downstream direction together with a valve pin 17 that is interconnected to the piston 14. The valve pin 17 is mounted within a complementary receiving aperture 91a of a bushing 91, the outside surface of the pin 17 mating with an interior surface of the aperture 91a and being slidable in an upstream and downstream direction axial A direction within the aperture 91a of the bushing 91 such that injection fluid that flows through channels 22, 200 is substantially prevented from flowing upstream through mounting aperture 91a. The bushing 91 is fixedly mounted within the body of the heated manifold 20 via bushing screw 92 that is screwably engaged within a complementary threaded receiving aperture bored within the heated manifold 20. The bushing 91, screw 92, actuator 10 and valve pin 17 are all adapted and arranged such that the valve pin 17 is controllably drivable upstream and downstream through both the manifold distribution channel 22 and the downstream nozzle channel 200 between a downstream-most gate closed position and one or more upstream gate open positions.

Figure 1F:
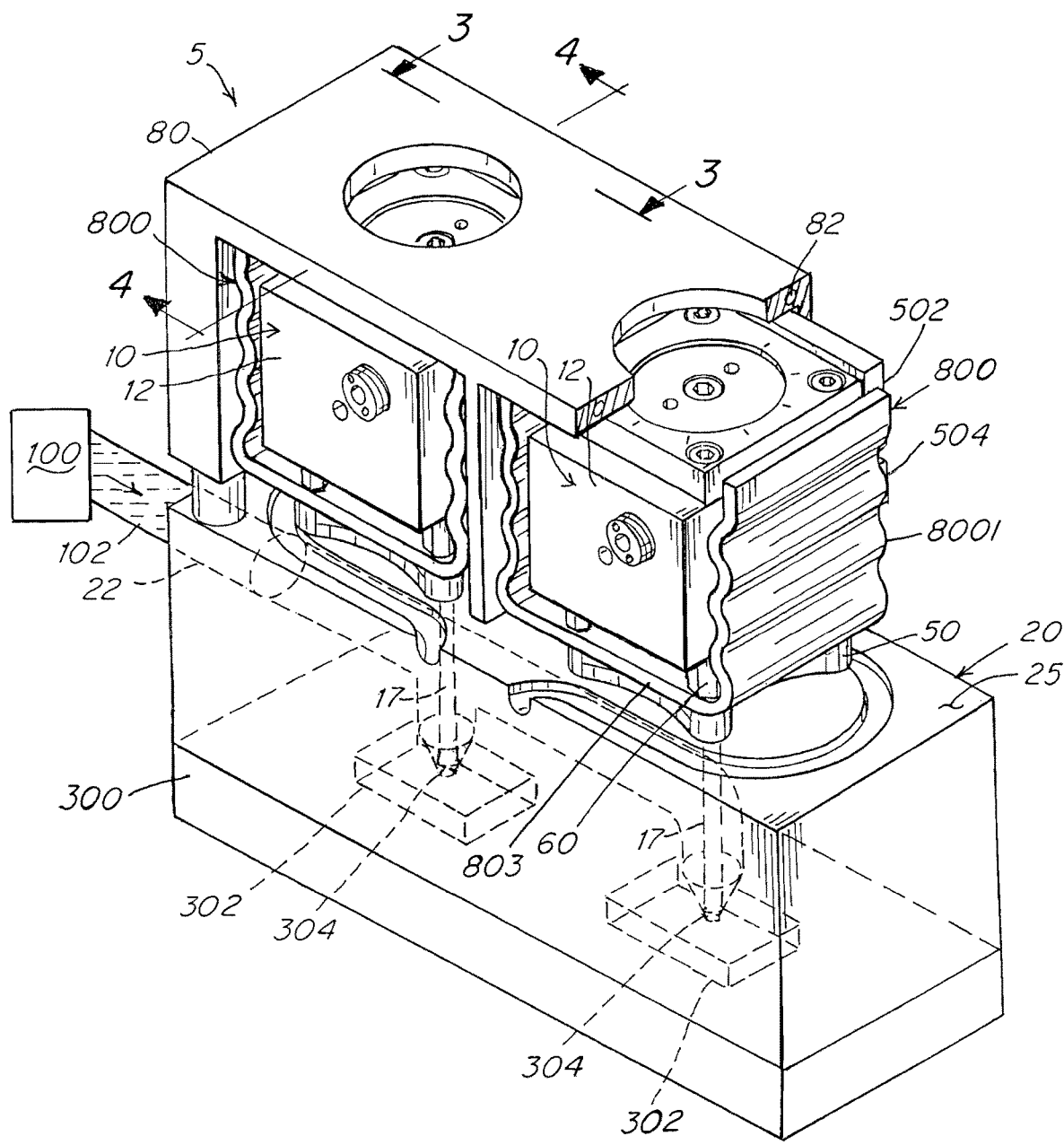
FIG. 1F is a top perspective view of an assembly of a top clamp plate, a heated manifold and a pair of actuators mounted on the heated manifold, each actuator having a housing and heat convectors mounted in an arrangement according to one embodiment of the invention.
Figure 2:
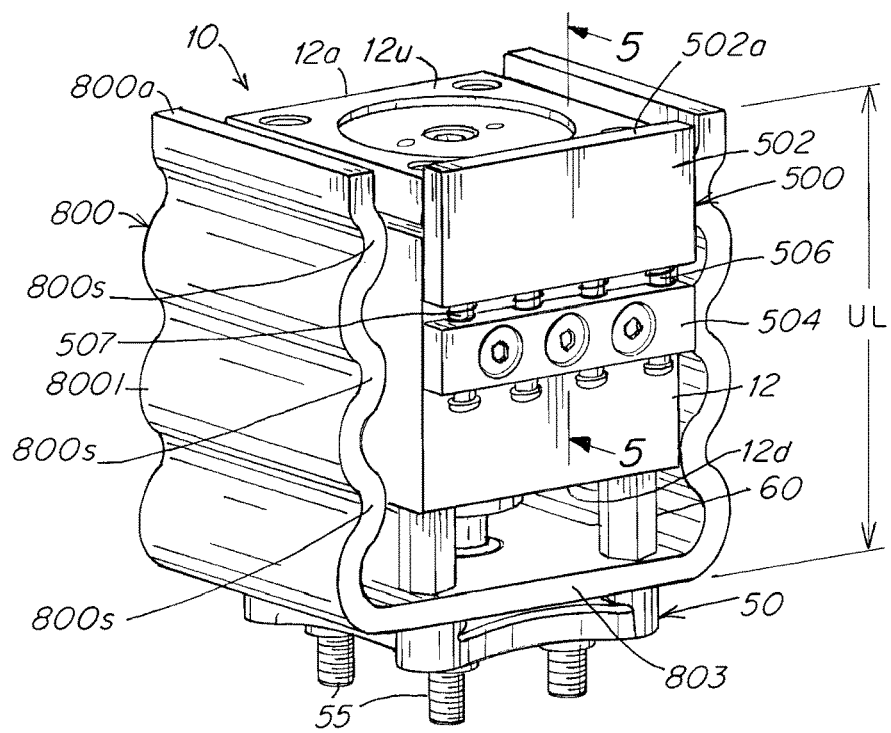
FIG. 2 is a front perspective view of one of the actuators of the FIG. 1 assembly.
Figure 3:
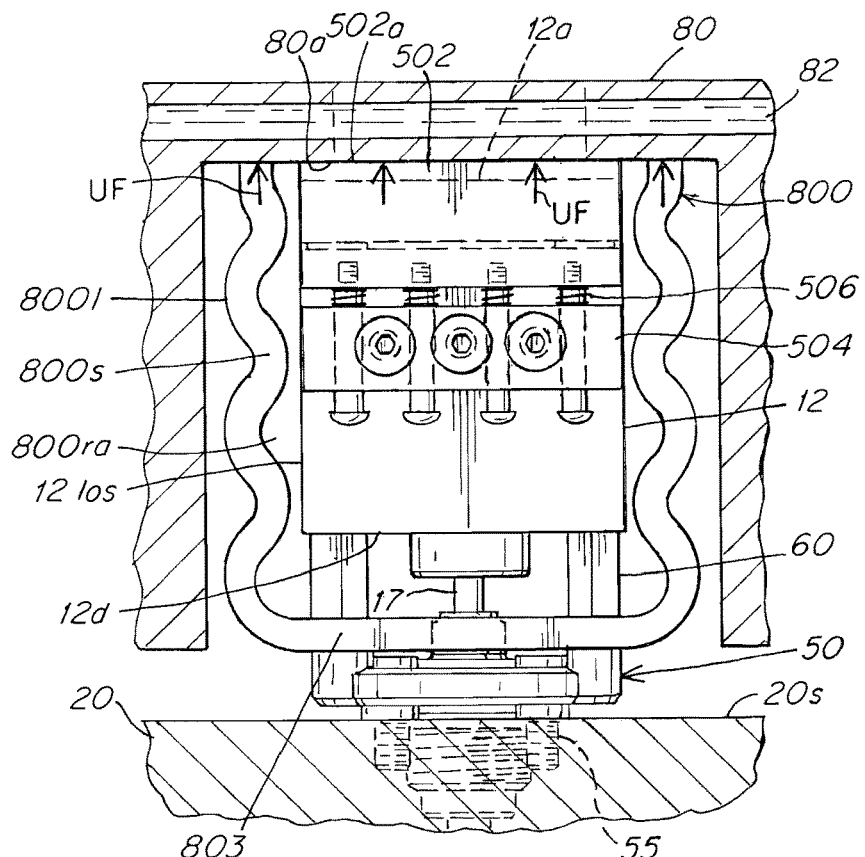
FIG. 3 is a sectional view taken along lines 3-3 of FIG. 1F.
Figure 4:
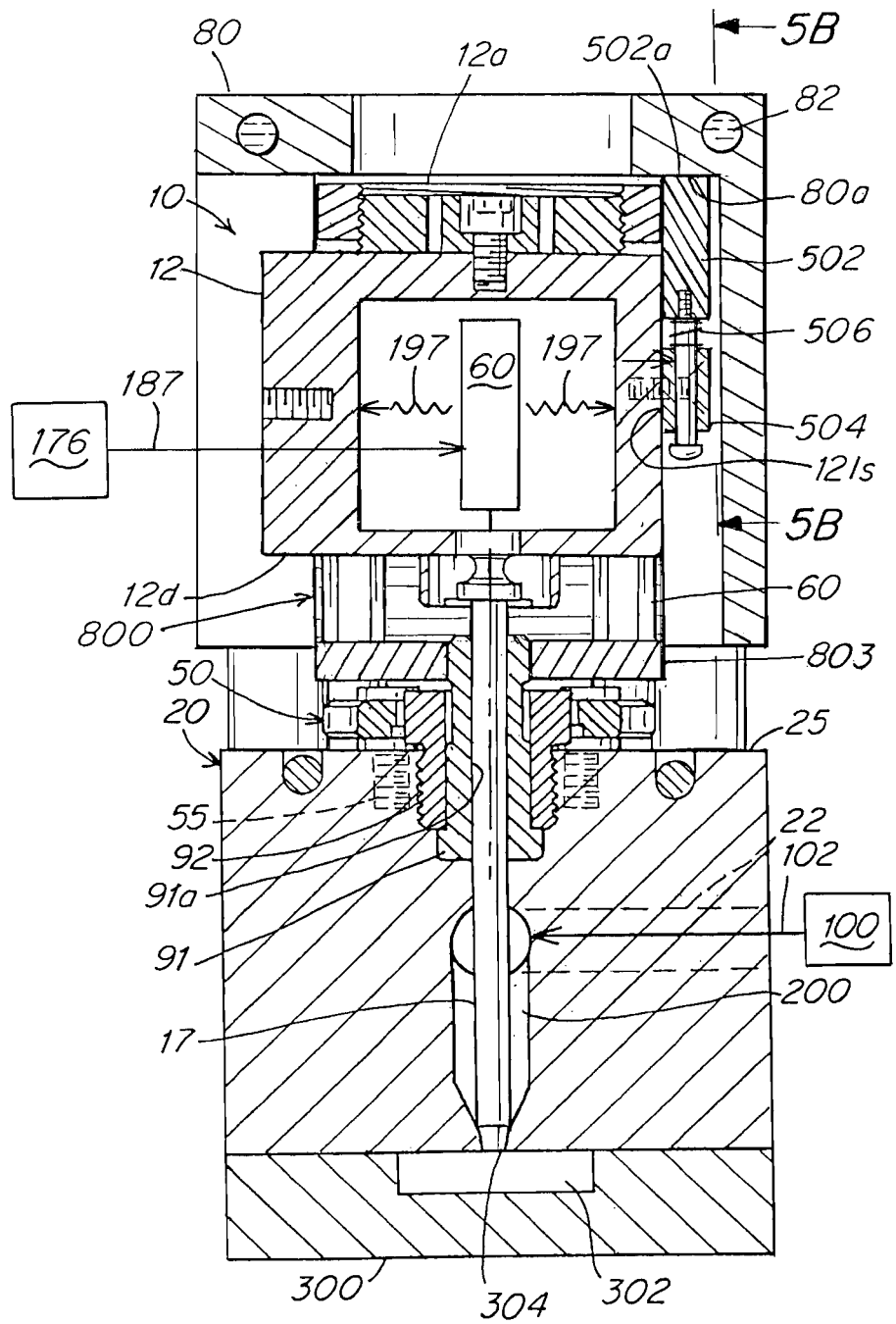
FIG. 4 is a sectional view taken along lines 4-4 of FIG. 1F.

As shown in the FIGS. 1F, 4 embodiment, the actuator housing 12 is typically mounted axially A upstream of and on or to the heated manifold 20. The actuator 10 can be mounted on or to the manifold via either or both mounts or spacers 60 and a water cooled cooling device or mount 803 as disclosed in U.S. Pat. No. 8,349,244, the disclosure of which is incorporated herein in its entirety as if fully set forth herein. The downstream axially facing surface 12d of the actuator housing 12 is also typically mounted on or to the stabilization mount 50. As shown, the cooling mount 803 and spacers 60 are mounted on or to an upstream surface of the stabilization mount 50. The downstream axially facing surface 12d of the actuator housing 12 is mounted in direct heat or thermally conductive contact with one or more of the mounts 60, 50, 803 that are in turn mounted in direct heat conductive contact or direct heat conductive communication with the heated manifold in axial alignment with axis A of the actuator housing and valve pin 17.

One or more of the mounts 50, 60, 803 act as insulators that prevent or retard the communication or conduction of heat from the heated manifold 20 through the mounts 50, 60, 803 to the lateral surface 12ls of the actuator body 12 that is spaced laterally 12ld from the drive axis A of the actuator 10 and valve pin 17 a distance 12ld sufficient to prevent or substantially retard conduction of heat through ambient air or through the housing body 12, valve pin 17 or mounts 50, 60, 803. To the extent that heat is conducted or communicated from the heated manifold 20 to the housing body 12 such heat is conducted from the housing body 12 to the proximal member 504, 504aa further to the distal member 502, 502u and finally to the cool clamp plate 80 as described herein.

In all of the FIGS. 4-25G embodiments, the cooling device 500 comprises a heat transmitter that is comprised of a distal arm or member or assembly 502, 502r, 509, 509a, 509b, 507, 506, 506bi and a proximal base or member 504, the distal arm or member 502 or assembly being mounted by a spring loadable interconnection or engagement 506 to or with a proximal base or member 504, 504a, 504aa. The proximal base or member 504, 504a, 504aa is preferably mounted such that a complementary surface of the member 504, 504a, 504aa is disposed or mounted in intimate or compressed thermally conductive contact on, to or against a surface 12ls, 12si of the housing body 12 that is spaced laterally 12ld away from the axis A of the actuator 10 and valve pin 17. The location of the mounting of the proximal member 504, 504a, 504aa is arranged such that the proximal base or member 504 is spaced laterally apart from contact with the axially mounted actuator mounts 50, 60, 803 that are directly mounted in close adjacency to and in thermal communication with the heated manifold 20 and on which the proximal end 12d of the actuator housing 12 is directly axially A mounted.

The distal arm or member 502 is preferably comprised of a highly thermally conductive material and has a distal end surface 502a that is adapted to compressibly engage against an undersurface 80a of the clamp plate 80 under a spring load from the spring loadable interconnection 506 between the distally extending arm 502 and the proximal base or member 504 when all components of the system 5 are fully assembled and the heated manifold is brought up to an elevated operating temperature. The system 5 can be adapted and arranged such that the distal end surface 502a is not engaged under a compressive force when the system is in a cold non operating condition when the system 5 is initially assembled before the manifold 20 is heated to operating temperature or when the system 5 is shut down and allowed to return to room temperature after the manifold 20 has been heated up to operating temperature.

Thus the system 5 is preferably adapted and arranged such that compressive force between distal end surface 502a and the surface 80a of the clamp plate 80 occurs only when the system 5 including manifold 20 is brought up to normal elevated operating temperature. In the FIGS. 4-14 and 21-25G embodiments where the distal arm 502 or rod or tube 502r comprises a heat conductive independent body that is independent of and mounted on an independent compressible spring body 506, the degree of upstream and downstream movement Q along or substantially parallel to the axis A, ranges from 0 mm when the system 5 is in a cold or room temperature condition up to a maximum of about 3 mm when the system 5 is brought up to normal elevated operating temperature (such as between about 150 and 450 degrees F.). Similarly, in the embodiment shown in FIGS. 13, 14 where the arm 502 is arranged and adapted for lateral L movement relative to the axial direction A of the actuator 10, the degree of lateral movement Q', FIG. 14, ranges from 0 mm when the system 5 is in a cold or room temperature condition up to a maximum of about 3 mm when the system 5 is brought up to normal elevated operating temperature. The independent spring body 506 in the FIGS. 1-14, 21-24 embodiments is resilient such that after being compressed Q by up to about 3 mm when the system is at operating temperature, the independent spring body 506 will return back to its original uncompressed or non-compressed axial spring length or state when the system returns to room temperature.

In the FIGS. 15-20 embodiments where the heat transmitting device 500 comprises a unitary or integral body 502, 504, 506 of compressible metal or other material, the degree of upstream and downstream movement Q" of the distal arm 502 along or substantially parallel to the axis A, ranges from 0 mm when the system 5 is in a cold or room temperature condition up to a maximum of about 0.5 mm when the system 5 is brought up to normal elevated operating temperature (such as between about 150 and 450 degrees F.). The spring 506 in the FIGS. 15-20 embodiments that is integral with the bodies of arm 502 and base 504, is resilient such that after being compressed Q" by up to about 0.5 mm when the system is at operating temperature, the integral spring body 506 will return back to its original uncompressed or non-deformed axial length or state when the system returns to room temperature.

The arm 502 has an exterior or proximally disposed surface 502b for making contact with and receiving heat from the actuator housing body components 12, 12a via engagement between an exterior arm surface 502b and a laterally disposed complementary mating surface 12ls, 12as of the housing body 12. The arm 502 transmits heat received via the proximal surface 502b to the distal end surface 502a and in turn to the relatively cool clamp plate 80 via compressed engagement between surface 502a and a complementary undersurface 80s of the clamp plate 80.

In the FIGS. 5-14, 24-25G embodiments, the arm 502, 509a also receives heat from the actuator housing 12 by transmission of heat through rods or tubes 507 which in turn receive heat from the base member 504 which itself receives heat from the actuator housing 12 by intimate compressed engagement with an exterior laterally disposed surface 12l of the housing 12. The laterally disposed actuator surface 12l of the housing 12 is spaced a lateral distance 12ld away from the drive axis A of the valve pin 17 because the valve pin 17 comes into direct thermal contact with the heated injection fluid 102. Thus the heat transmission device 500 is disposed in a laterally spaced position away from the valve pin 17 and the valve pin axis A such that the base 504 is removed from direct thermal contact or thermal communication with the axis or the valve pin 17. In such embodiments, the proximal base member 504 is rigidly attached to the lateral actuator surface 12l such as via a bolt or screw 504s such that a complementary surface 504b of the base member 504 is engaged in intimate heat conductive contact with the lateral disposed surface 12l that is spaced laterally 12 ld from the axis.

Figure 21:
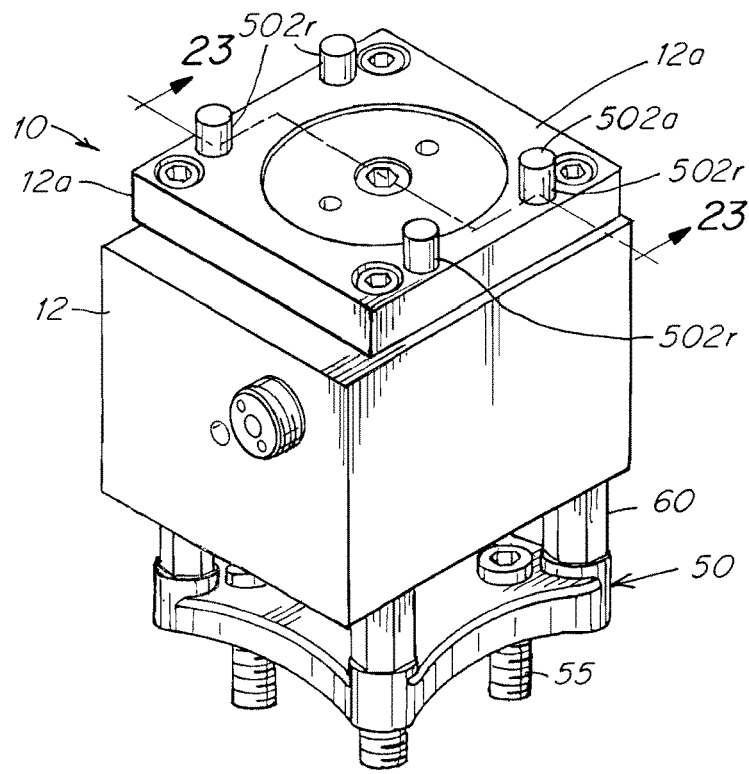
FIG. 21 is a top perspective view of another embodiment of the invention showing an actuator in thermal communication with a heated manifold of an injection molding system with four separate cooling devices that each comprise a rod or tube spring loadably mounted within a complementary precision formed receiving bore drilled in body of the housing of the actuator, the rods or tubes being adapted for slidable engagement contact against an internal surface of the precision formed receiving bores.
Figure 22:
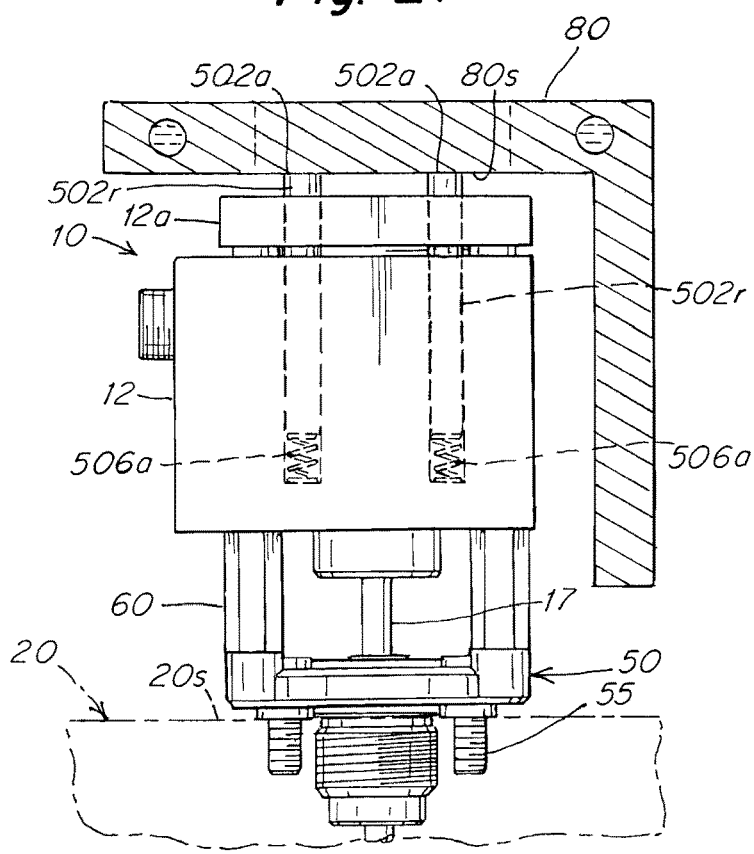
FIG. 22 is a side view of the FIG. 21 embodiment showing the actuator assembled together with a top clamp plate and the rods or tubes being in spring loaded compressed engagement with the top clamp plate.
Figure 23:
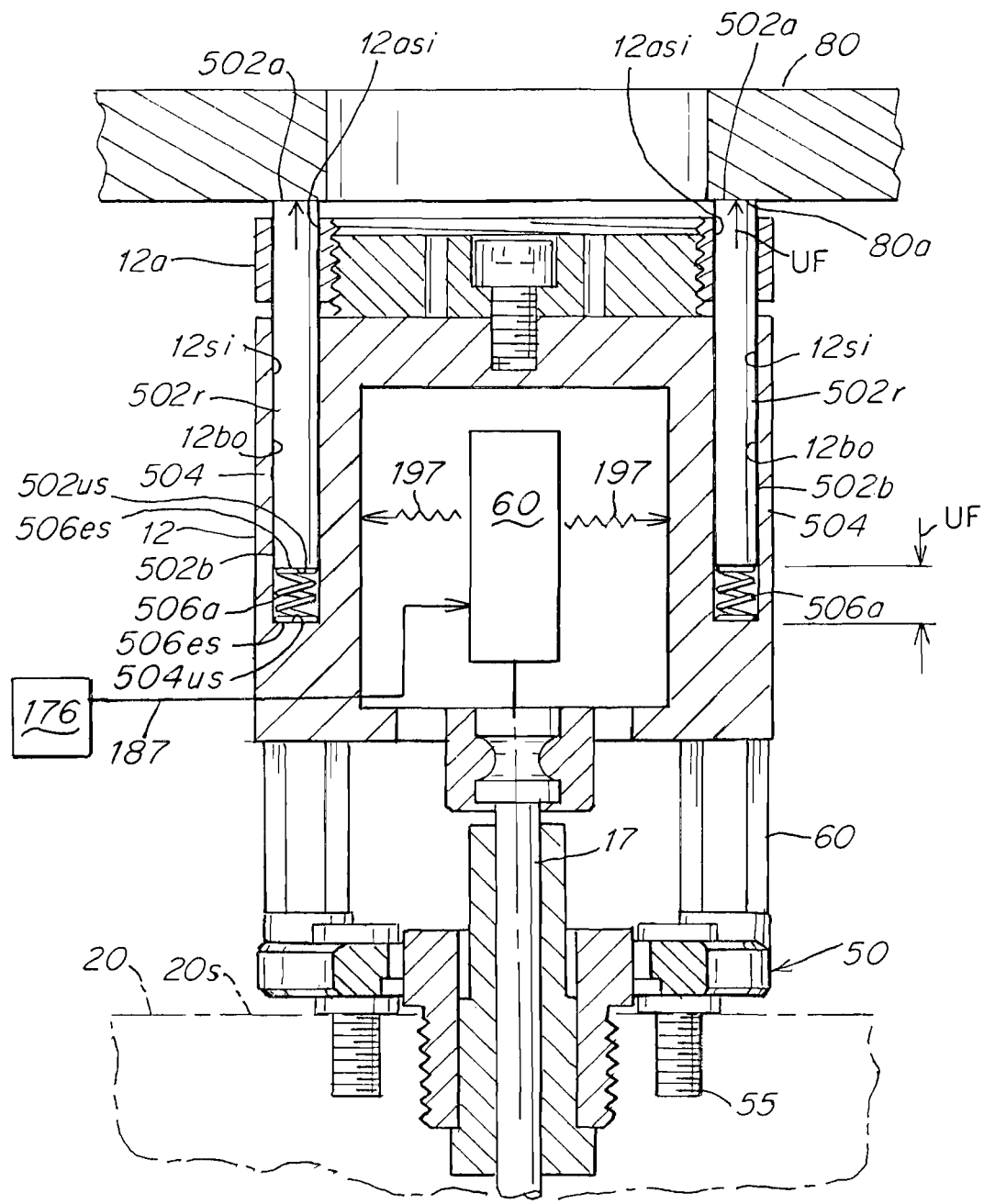
FIG. 23 is a front view of the FIG. 21 embodiment showing the actuator assembled together with a top clamp plate and the rods or tubes being in spring loaded compressed engagement with the top clamp plate.
Figure 24:
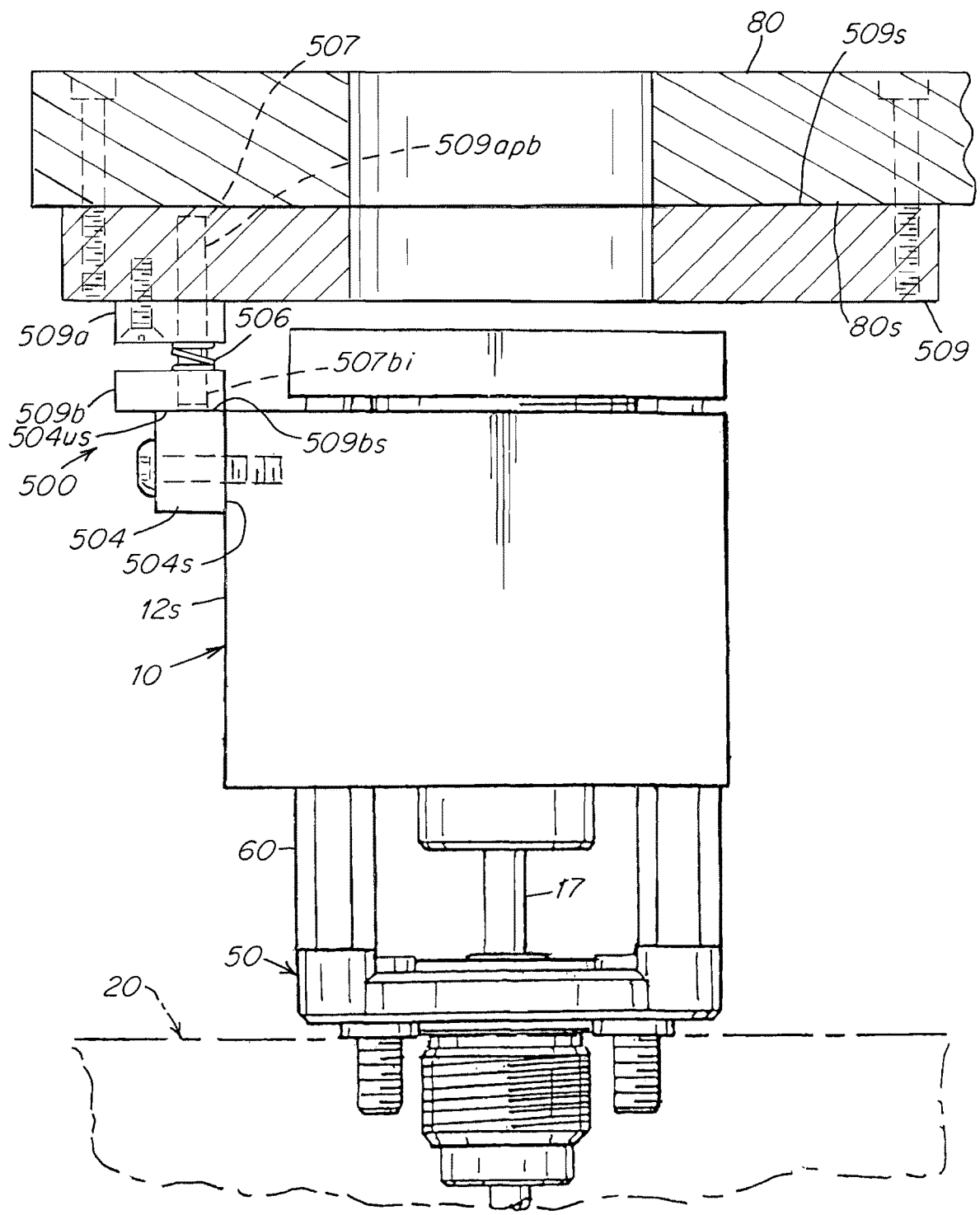
FIG. 24 is a side view of another embodiment of the invention showing a cooling device comprised of an assembly of a distal heat transmissive plate member assembled together with a spring loading mechanism, the assembly being that is readily mountable to or between the actuator and a top clamp plate such that when the top clamp plate and the actuator and the assembly are assembled together into operating configuration, the distal heat transmissive plate member is spring loadably engaged against the top clamp plate and heat transmissively engaged with a proximal heat transmissive base member that is mounted to the actuator housing.

Similarly in the FIGS. 21-23 embodiments, the base 504 of the rods 502r are engaged with a laterally disposed actuator surface 12si that is spaced a lateral distance 12ld away from the drive axis A of the valve pin 17. Thus the heat transmission rods 502r are disposed in a laterally spaced position away from the mounts 50, 60, 803, valve pin 17 and axis A such that the base 504 of the rods 502r is removed from direct or closely adjacent thermal contact or communication with the axis A or the valve pin 17.

In the FIGS. 21-23 embodiments, the actuator 10 comprises a housing body 12, 12a that is thermally conductive and mounted in thermal communication with the manifold 20 as described above. In the FIGS. 1-20, 24 embodiments, the proximal base or member 504 of the cooling device 500 is mounted to the housing body 12 of the actuator 10 in an arrangement where the distal end surface 502a of the distal arm or member 502 makes compressed contact with the clamp plate surface 80a such that the end surface 502a moves or travels some distance relative to the actuator housing 12, 12a to which the arm 502 is mounted. The arm 502 and distal engagement surface 502a is movable via the compressible spring 506a toward and away from the actuator 10.

Similarly in the FIGS. 21-23 embodiment, the distally extending arm or rod or tube 502r is movable toward and away from the actuator housing 12 via a compressible spring 506a. The distal member 502 can comprise a solid rod or a hollow tube containing a heat conductive fluid as described in greater detail herein regarding member 507. The thermally conductive rods or tubes 502r are mounted to proximal guides 504 which are in turn mounted to the actuator housing body 12. As shown, the rods or tubes 502r are slidably disposed within complementary receiving apertures or bores 12bo bored into the housing body 12. The rods 502r have an exterior surface 502b that are slidably engaged with an interior surface 12si, 12asi of the housing bodies 12, 12a which cause heat to be thermally transmitted from the housing bodies 12, 12a to the rods 502r which in turn transmit heat to the clamp plate 80 via compressed contact between surface 502a and surface 80a. Up and down movement of the rods 502r within the apertures 12bo occurs with the surfaces 502b and 12si and 12asi sliding against each other in engaged contact.

Similarly in the FIGS. 1-20 embodiments, the cooling devices 500 are mounted and arranged such that the proximally disposed arm surfaces 502b are maintained in slidable engaged contact with the complementary housing body surfaces 12ls, 12as, the surfaces 502b receiving heat from the housing bodies 12, 12a and in turn transmitting such received heat to the clamp plate 80 via compressed contact between surfaces 502a and 80a.

In the FIGS. 15-20 embodiments, the distal arm or member 502 and proximal base or member 504 are formed as a single unitary body 503 of highly conductive metal. The spring load in such unitary bodies 503 is created via deformation of the unitary bodies 503 such that when the clamp plate 80, mold 300, manifold 20, actuator 10 and cooling device 503 are all assembled together, the unitary body 503 resiliently deforms under compression to travel to a different position 502d relative to the actuator housing 12 to which the body 503 is mounted and relative to the original position 502o that the unitary body was disposed in prior to surface 502a making contact with surface 80a. The unitary body 503 has an inherent resilience or inherent spring up to a degree of resilient compression distance of about 0.5 mm such that when the body is moved to the deformed position 502d the inherent spring or resilience within the body 503 causes the distal end surface 502a to remain under forcible compressed contact with the undersurface 80a of the clamp plate 80. By contrast the non-heat conductive coil or leaf spring embodiments 506 discussed herein have a degree of resilient compression distance of up to about 5 mm, typically up to about 3 mm.

Figure 13:
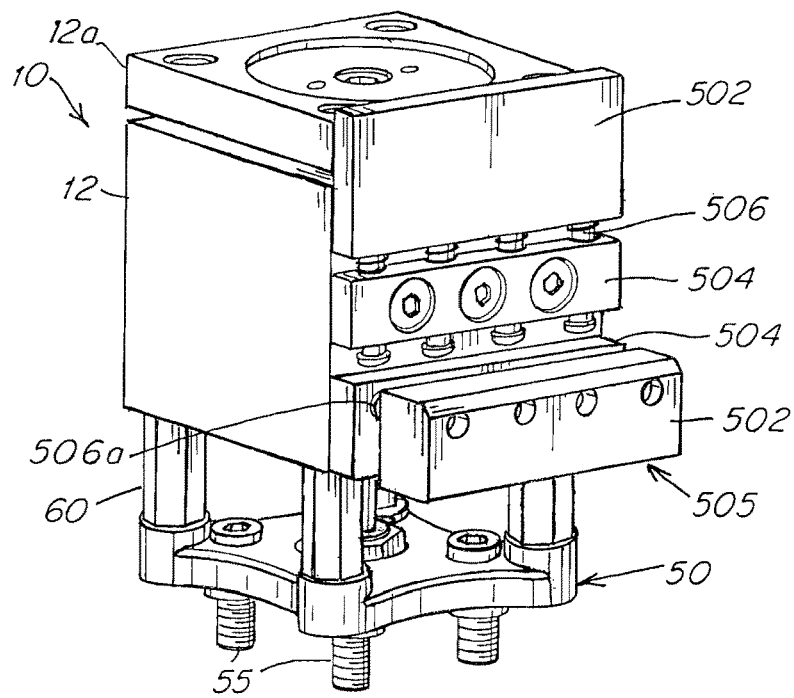
FIG. 13 is is a top perspective view an actuator in thermal communication with a heated manifold of an injection molding system with two separate cooling devices mounted to sides of the actuator where each cooling device comprises a proximal base and a distal plate spring loadably mounted on the base with the plates in slidable engagement contact with a surface of the actuator and further with a third cooling device mounted to a side wall of the actuator where the third cooling device comprises a proximal base and a distal plate spring loadably mounted on the base with the distal plate in spring loaded arrangement to move side-to-side as opposed to upstream downstream.
Figure 14:
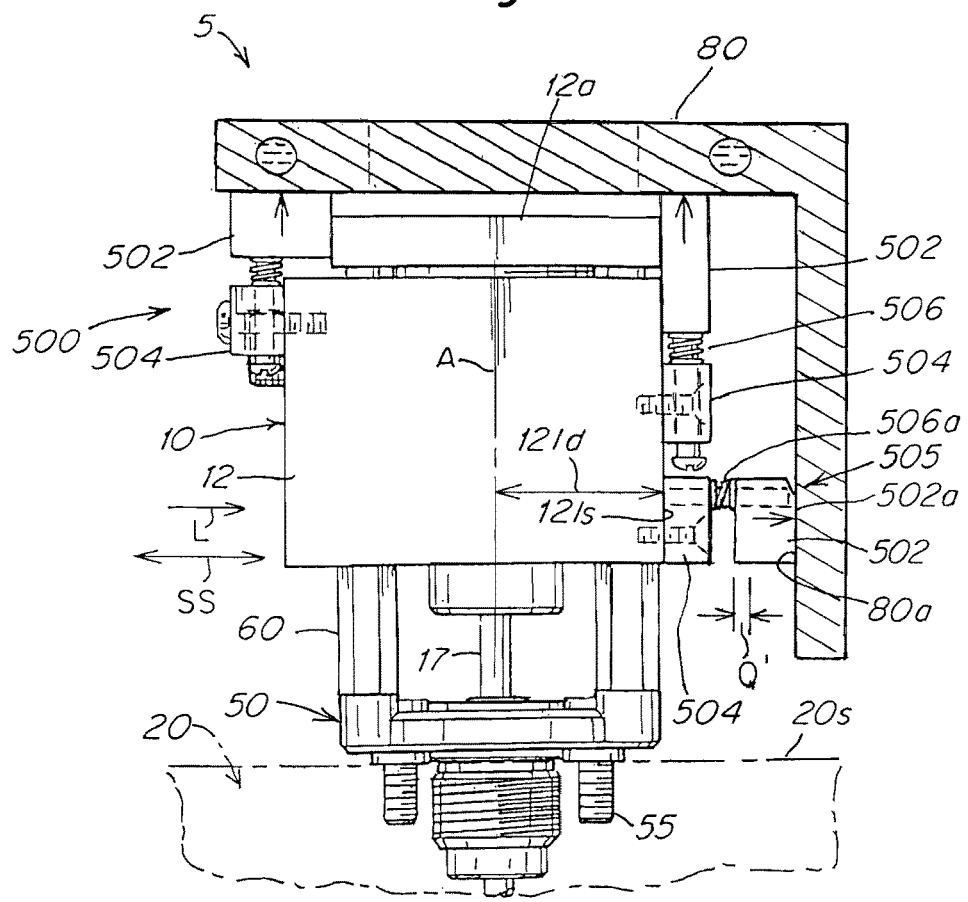
FIG. 14 is a side view of FIG. 13 additionally showing a top clamp plate assembled together with the actuator and cooling devices with the distal plate members 502 of the heat transmissive members of the cooling devices in spring loaded engagement with the top clamp plate.
Figure 15:
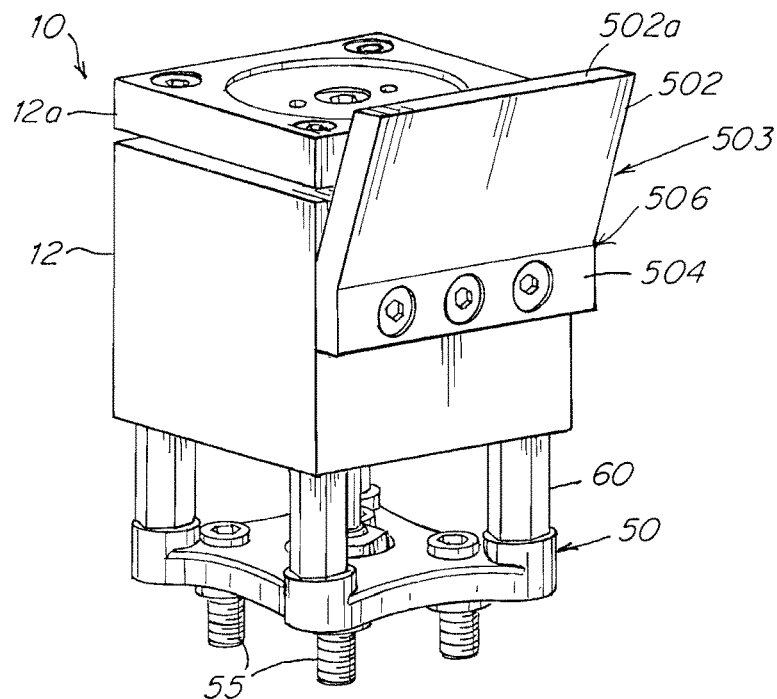
FIG. 15 is a top perspective view of an actuator in thermal communication with a heated manifold of an injection molding system with a single cooling device attached to the actuator where the cooling device comprises one exemplary configuration of a unitary body of metal material attached at a proximal base or member end 504 to the actuator having a distally extending arm 502 of one configuration, the distally extending arm of the unitary body being engageable at a distal end surface with a top clamp plate when the system is assembled such that a distal end surface of the distally extending arm deforms under spring force to maintain the distal end surface of the arm in compressed contact with the top clamp plate.
Figure 16:
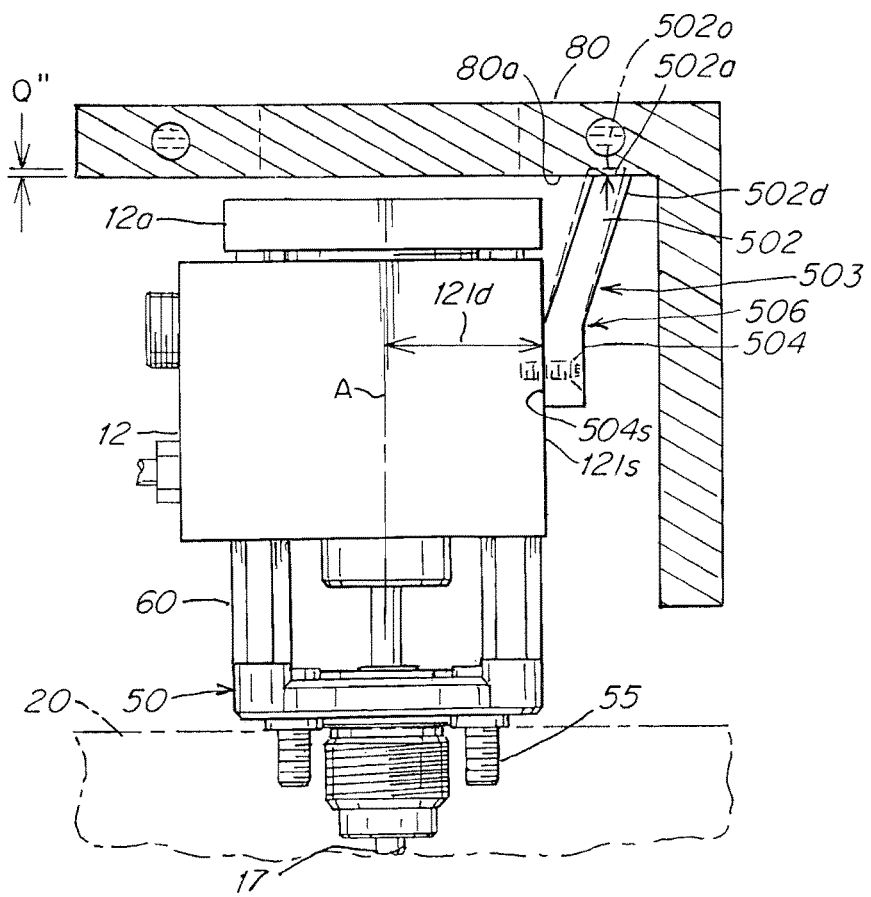
FIG. 16 is a side view of the FIG. 15 embodiment showing the actuator assembled together with a top clamp plate and the distal arm member in spring loaded compressed engagement with the top clamp plate.
Figure 17:
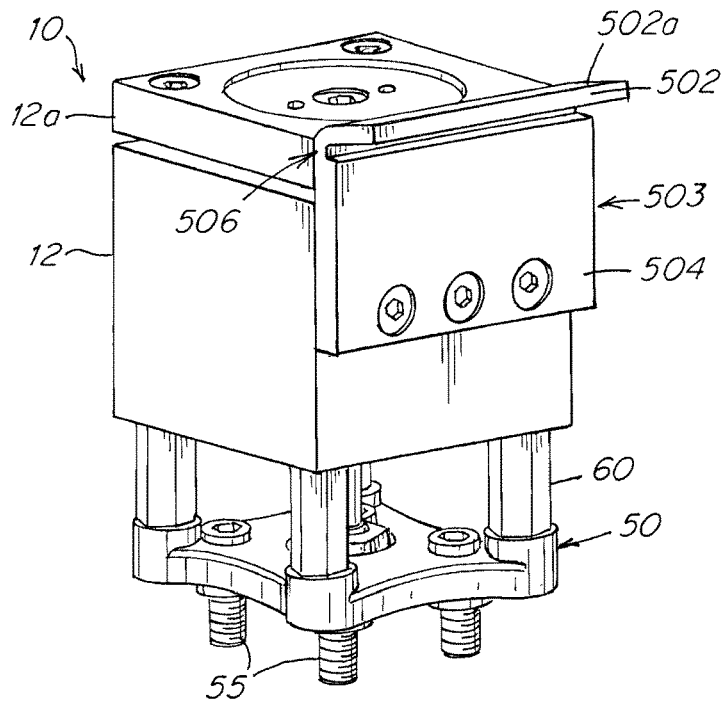
FIG. 17 is a top perspective view of an actuator in thermal communication with a heated manifold of an injection molding system with a single cooling device attached to the actuator where the cooling device comprises another exemplary configuration of a unitary body of metal material attached at a proximal base or member end 504 to the actuator having a distally extending arm 502 of another configuration, the distally extending arm of the unitary body being engageable at a distal end surface with a top clamp plate when the system is assembled such that a distal end surface of the distally extending arm deforms under spring force to maintain the distal end surface of the arm in compressed contact with the top clamp plate.
Figure 18:
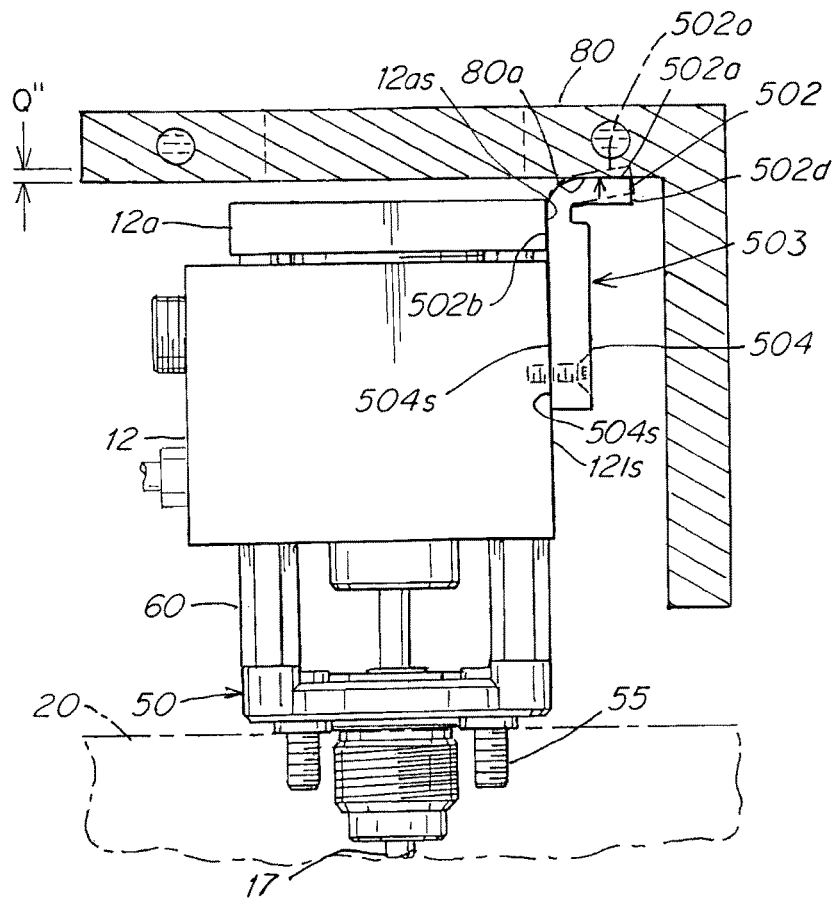
FIG. 18 is a side view of the FIG. 17 embodiment showing the actuator assembled together with a top clamp plate and the distal arm member in spring loaded compressed engagement with the top clamp plate.
Figure 19:
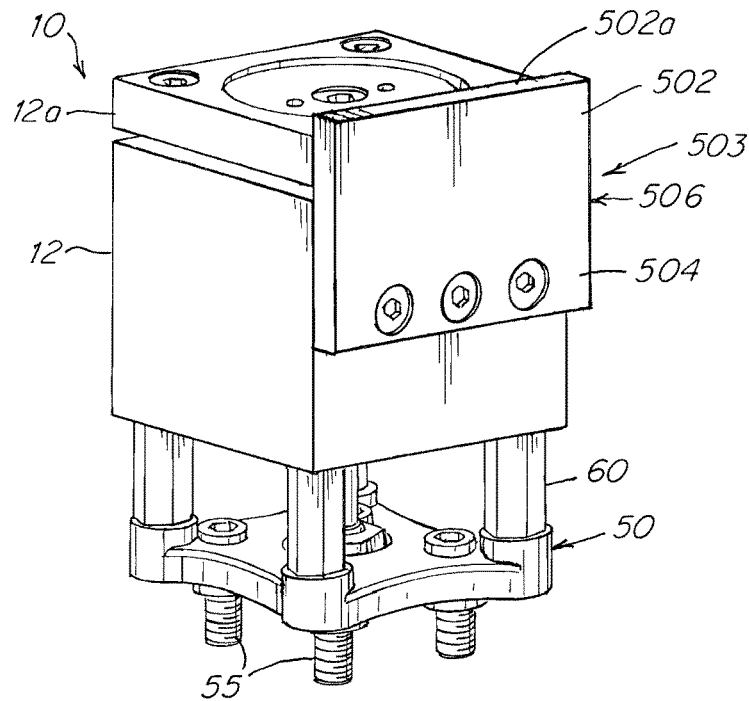
FIG. 19 is a top perspective view of an actuator in thermal communication with a heated manifold of an injection molding system with a single cooling device attached to the actuator where the cooling device comprises another exemplary configuration of a unitary body of metal material attached at a proximal base or member end 504 to the actuator having a distally extending arm 502 of another configuration, the distally extending arm of the unitary body being engageable at a distal end surface with a top clamp plate when the system is assembled such that a distal end surface of the distally extending arm deforms under spring force to maintain the distal end surface of the arm in compressed contact with the top clamp plate.
Figure 20:
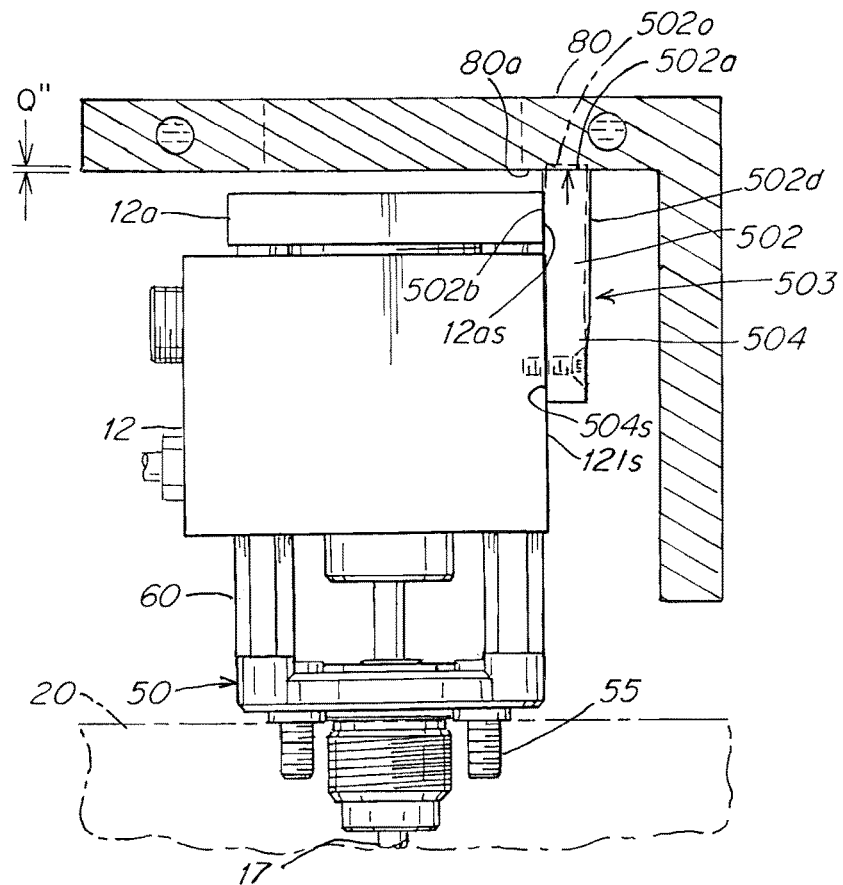
FIG. 20 is a side view of the FIG. 19 embodiment showing the actuator assembled together with a top clamp plate and the distal arm member in spring loaded compressed engagement with the top clamp plate.

In the FIGS. 13-14 embodiment, another cooling device 505 according to the invention is shown where the distally extending arm 502 moves radially toward and away from the actuator housing bodies 12, 12a and axis A. Such a cooling device 505 arrangement can be provided for exploiting the side-to-side or radial movement SS that the actuator 10 travels relative to the clamp plate 80 when the system is assembled in a cooled state and then subsequently the manifold 20 is heated to an elevated temperature. The heating of the manifold 20 subsequent to assembly of all of the clamp plate 80, mold 300, manifold 20, actuator 10 and cooling devices 500, 505, results in the actuator moving side to side relative to the clamp plate 80. Such side-to-side or radial movement SS in the left or lateral direction L relative to the drive axis A of the actuator can be accounted for prior to assembly such that the distal end surface 502a can be brought into compressed contact with the complementary mating surface 80a of the clamp plate with resilient compression being maintained by the spring 506a disposed between the proximal base or member 504 and the heat transmission plate or element 502. As with the above-described embodiments, the surface 502a travels toward and away from the housing bodies 12, 12a when compressed and when compression is released.

The FIGS. 1-12 embodiments show cooling device 500 arrangements where the distal arm 502 is adapted to move back and forth along a path of travel that is generally upstream and downstream or generally parallel to the drive axis A of the actuator or valve pin 17

Figure 6:
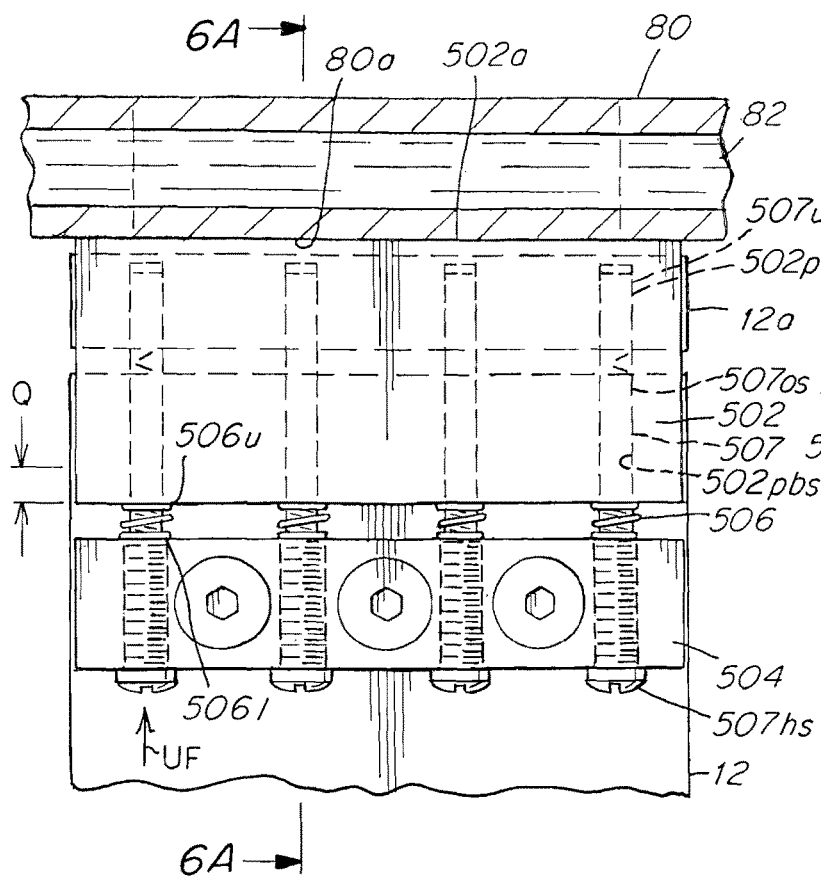
FIG. 6 is a front view similar to FIG. 5 but showing the slidable rods affixed to the lower heat transmitting element.
Figure 6A:
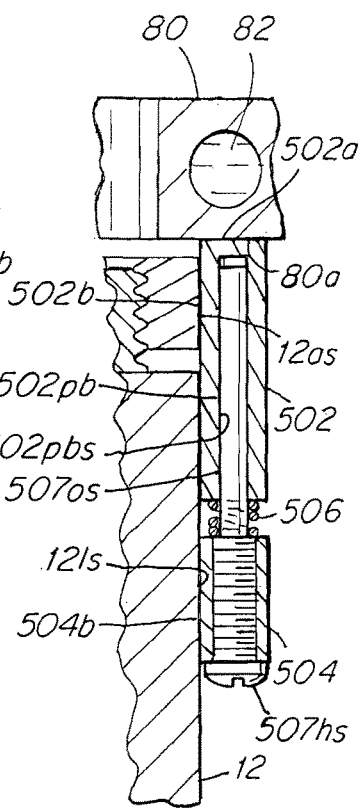
FIG. 6A is a cross-sectional side view taken along lines 6A-6A of FIG. 6.
Figure 7:
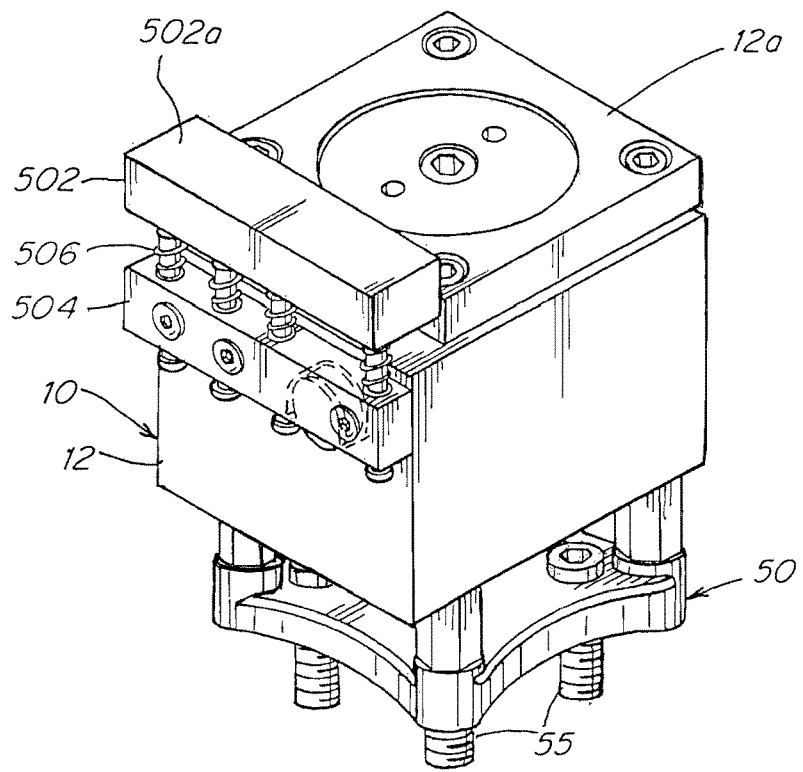
FIG. 7 is a top perspective view of an actuator having a single cooling device mounted to a side wall of the actuator where the cooling device comprises a proximal base 504 and a distal plate member that is spring loadably mounted on the base with the distal plate 502 in slidable engagement contact with a surface of the housing of the actuator.
Figure 8:
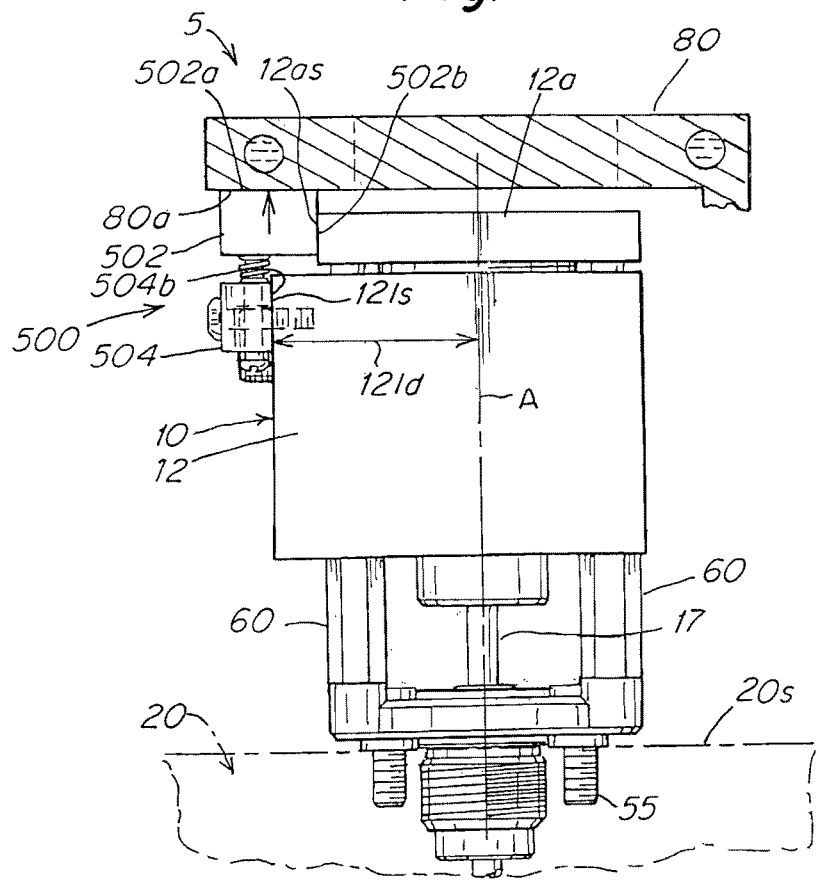
FIG. 8 is a side view of FIG. 7 additionally showing a top clamp plate with the distal plate member in spring loaded engagement therewith.
Figure 9:
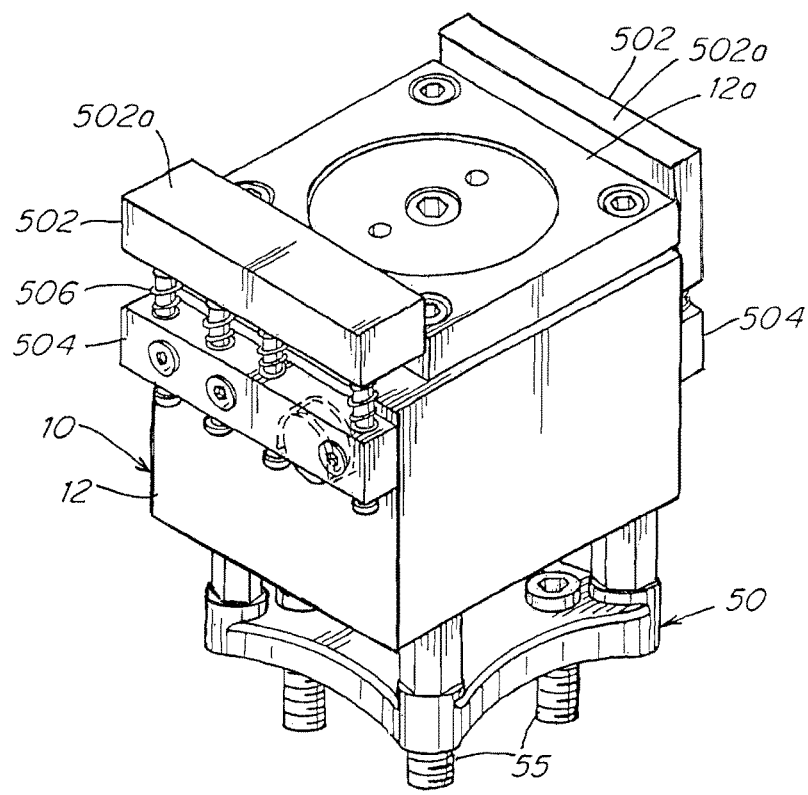
FIG. 9 is a top perspective view of an actuator having two cooling devices mounted to two separate side walls of the actuator where the cooling devices comprise a proximal base 504 and a distal plate member 502 that is spring loadably mounted on the base 504 with the distal plates being 502 in slidable engagement contact with a surface of the housing of the actuator.

With reference to FIGS. 5-6A, the proximal base member 504 is heat transmissively interconnected to or engaged with the distal member 502 via a heat transmissive rod 507, the downstream end of which 507d is slidably mounted within a complementary precision bore 504pb that is drilled within the distal mount member 502 such that the downstream end 507d of the rod 507 is engaged in heat transmissive intimate contact with an interior surface 504pbs of the bore 504pb. In such an embodiment, the upstream end 507us of the rod 507 is screwably connected to the distal member 502 into a complementary aperture within distal member 502 such that when the member 502 travels through Q the downstream end 507d is slidably moved along the path of travel Q together with movement of distal member 502.

In an alternative embodiment as shown in FIGS. 6, 6A, the upstream ends 507u of the heat transmissive rods 507 can conversely be slidably mounted within complementary bores 502pb provided in distal member 502 such that the exterior surface of the upstream end 507u of the rod 507 is slidably and heat transmissively engaged against the interior surface 502pbs of the bore 502pb. In such an embodiment the downstream end 507d of the rod 507 is screwably connected to proximal mount member 504 such that when the member 502 travels through Q the upstream end 507u is slides along the interior surface 502pbs of the bore 502pb as member 502 travels through the path of travel Q.

Thus, the rods or tubes 507, 517r are preferably slidably mounted to or within one of the proximal base or member 504 and the distal arm or member 502 and rigidly interconnected to the other of the proximal base or member 504 and the distal arm or member 502.

In the embodiment shown in FIGS. 5H, 5I, the rods 507ir are formed integrally together with and as a part of the body of the distal member 502, the outside surface 507os of the rods 507ir being engaged and slidable against the interior surface 504pbs of the receiving bores 504pb within the proximal mounts 504. As shown, the distal member 502 is spring loaded by spring 506 that disposed between the distal 502 and proximal 504 heat transmissive members.

In another embodiment of the invention, FIGS. 5D, 5E, 5F, 5G one or the other of the distal 502 and proximal 504 members can have one or more highly heat conductive tube members that contain a heat conductive fluid 517a, 517b, 517c, 517d embedded or mounted within a complementary receiving bore drilled into the members 502 or 504. Similarly, one or more of the rods or tubes 507 can comprise and be adapted to contain a heat conductive fluid such as tube 517r shown in FIGS. 5D, 5E, 5F, 5G, 5J, 5K. Such heat conductive tubes 517a, 517b, 517c, 517d are comprised of a tubular member or wall that itself is comprised of a material that is highly heat conductive such as copper, aluminum, gold, platinum or the like. The tubular member or wall forms a hollow interior tube cavity that contains a highly heat conductive fluid such as water, methanol or the like and also preferably further typically contains a wick that facilitates flow of the heat conductive fluid within and through the length of the cavity of the tube. Such heat conductive tubes facilitate the transmission of heat between the actuator housing 12, the proximal member 504 and the distal member. An example of the structure and configuration of such heat conductive tubes is disclosed in U.S. Pat. No. 4,500,279, the disclosure of which is incorporated by reference as if fully set forth herein.

Similarly, such heat conductive tubes 517ah can be embedded within the body of the actuator housing 12 as shown in FIG. 5F, 5G in the same manner as described above where the tubes 517a, 517b, 517c, 517d are embedded within members 502 or 504.

Figure 25A:
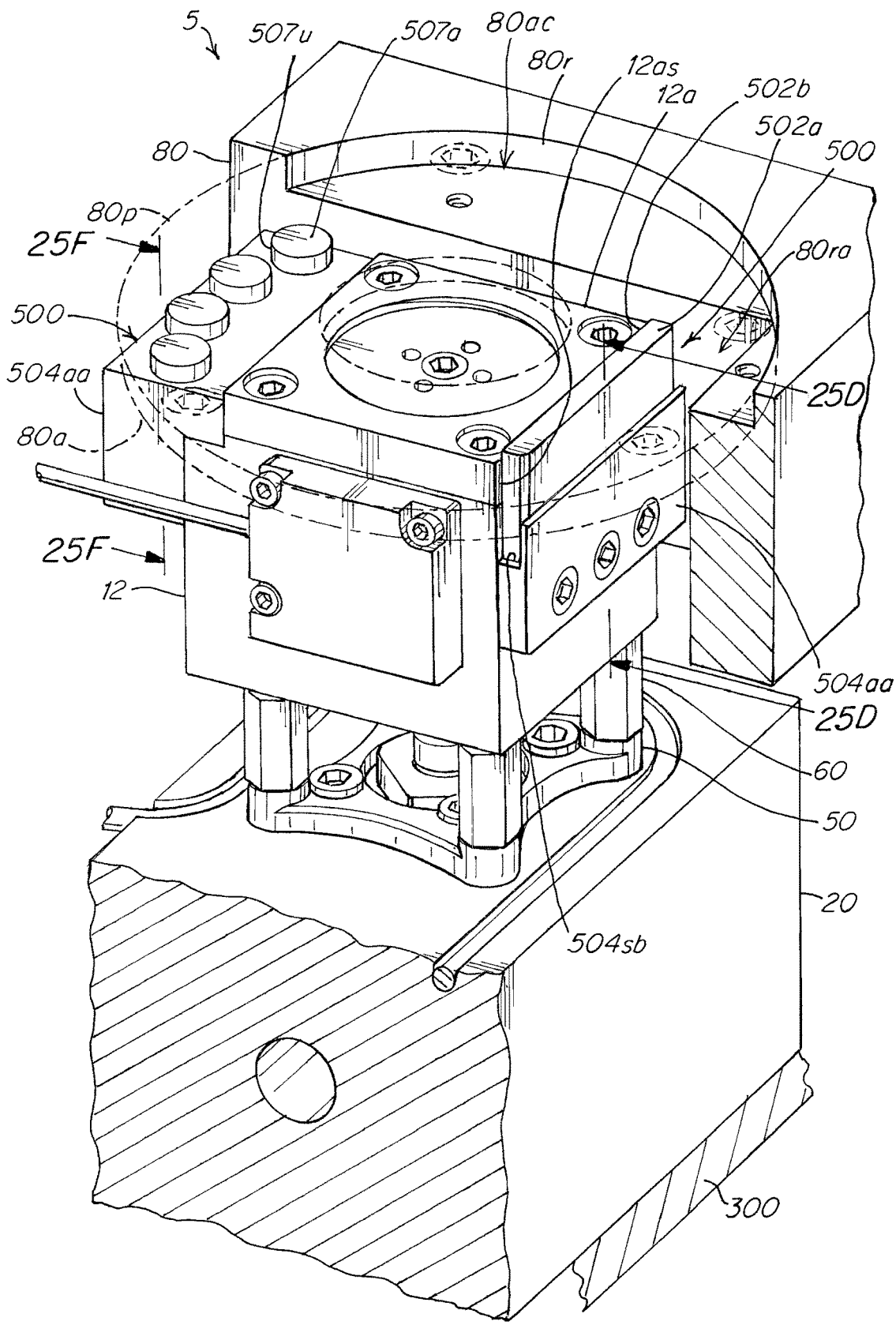
FIG. 25A is a top perspective view of an actuator assembled together with another embodiment of a pair of cooling devices comprised of sliding rods and a sliding block mounted within a base attached to the actuator.
Figure 25B:
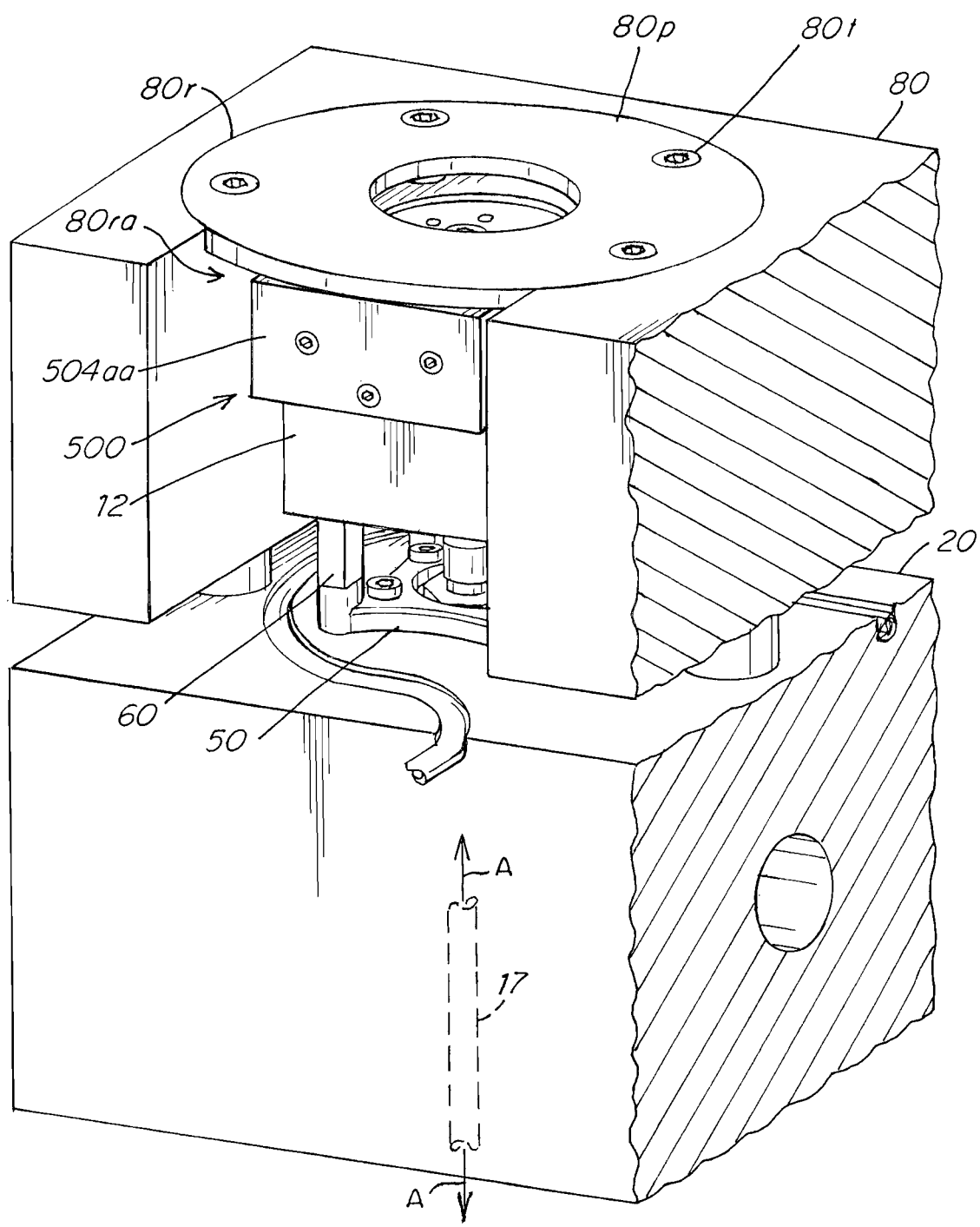
FIG. 25B is a front right side perspective view of an assembly of a manifold, an actuator with cooling devices as in FIGS. 25A-25E and a top clamp plate configured to assemble together quickly that the actuator and cooling devices so that spring loaded rods and block of the cooling devices 500 attached to the actuator will engage with the underside of a quickly assemblable plate component of the top clamp plate.
Figure 25C:
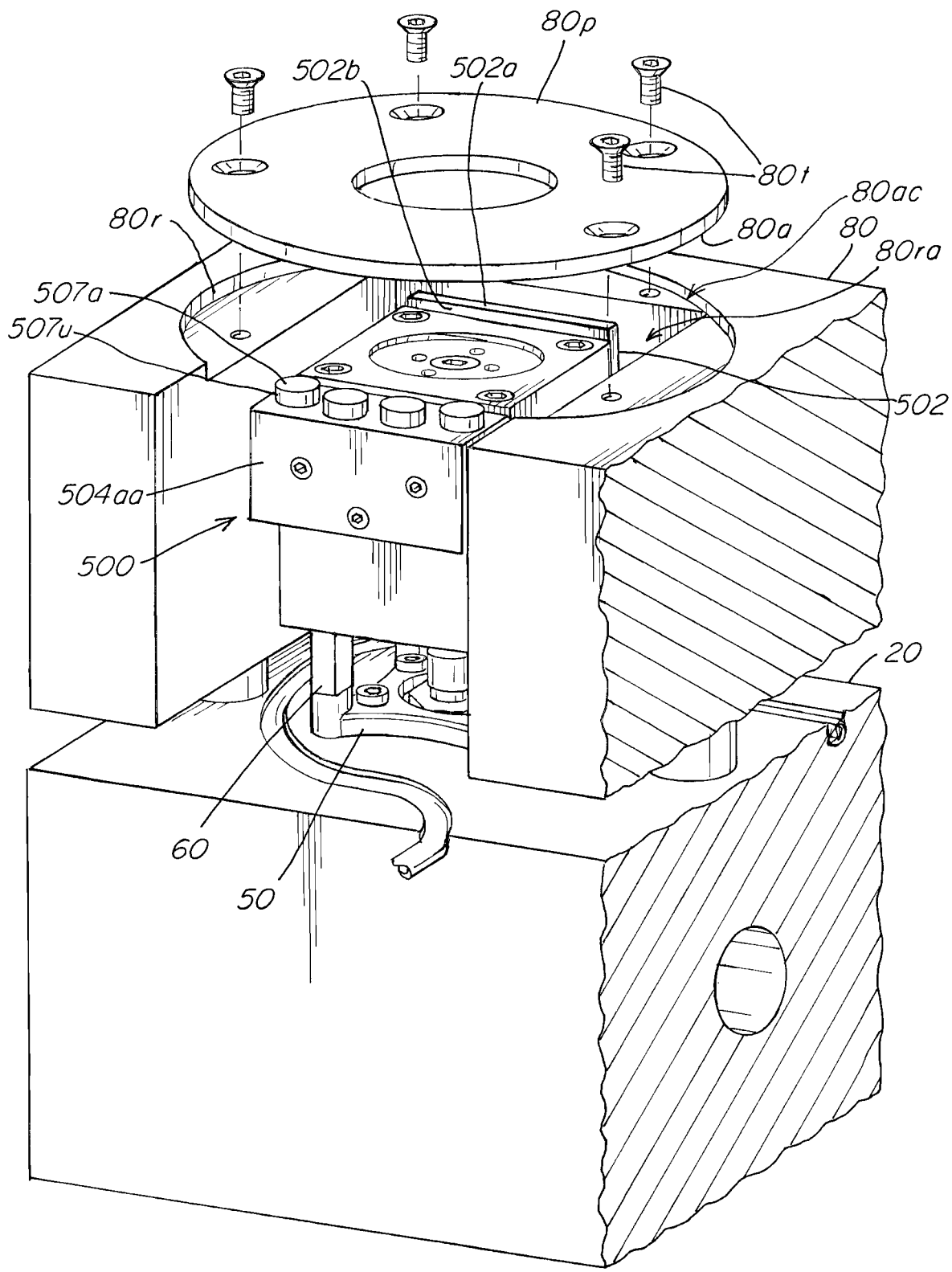
FIG. 25C is an exploded view of the device of FIG. 25B.
Figure 25D:
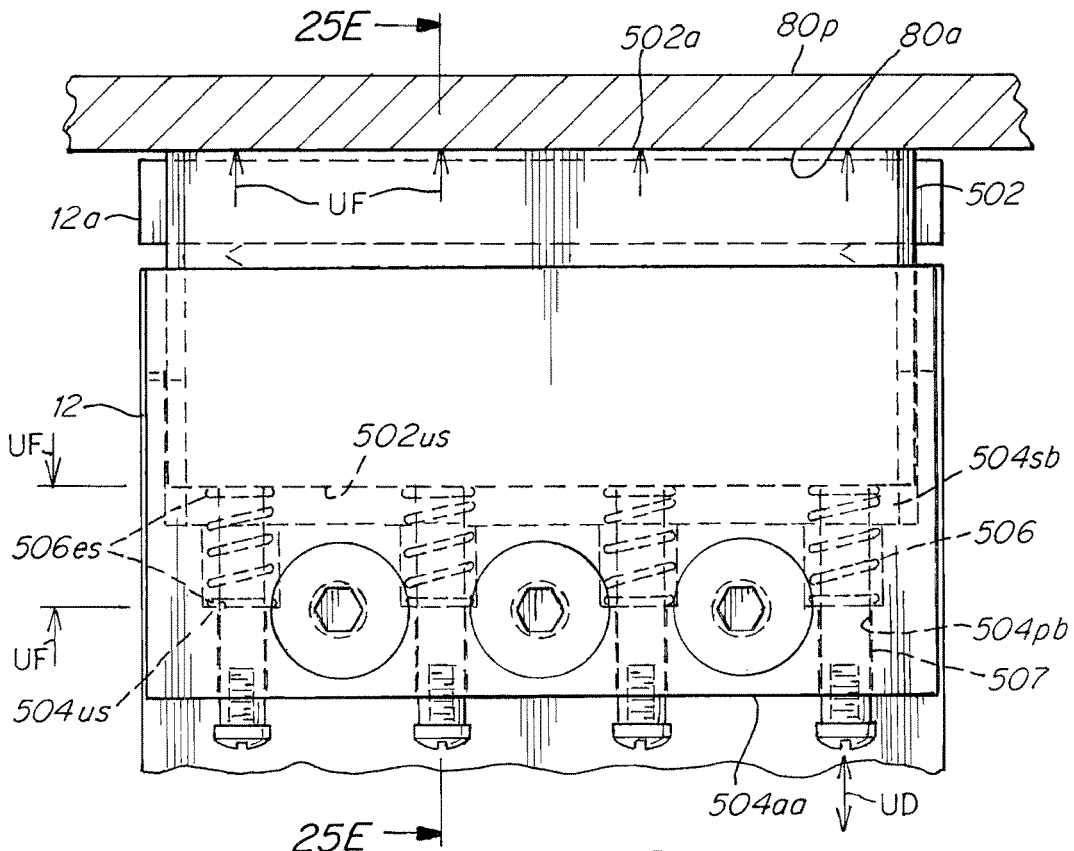
FIG. 25D is a cross-sectional view taken along lines 25D-25D of FIG. 25A.
Figure 25E:
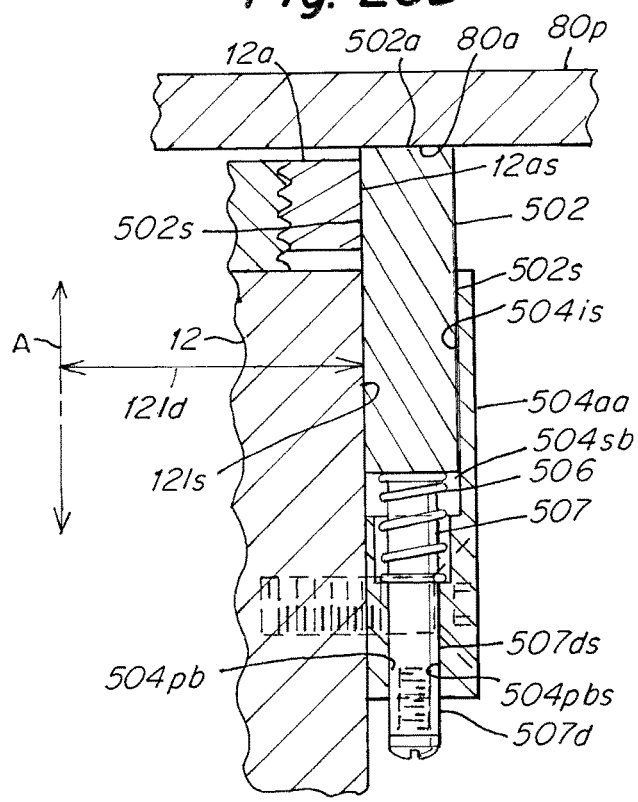
FIG. 25E is a cross-sectional view taken along lines 25E-25E of FIG. 25D.
Figure 25F:
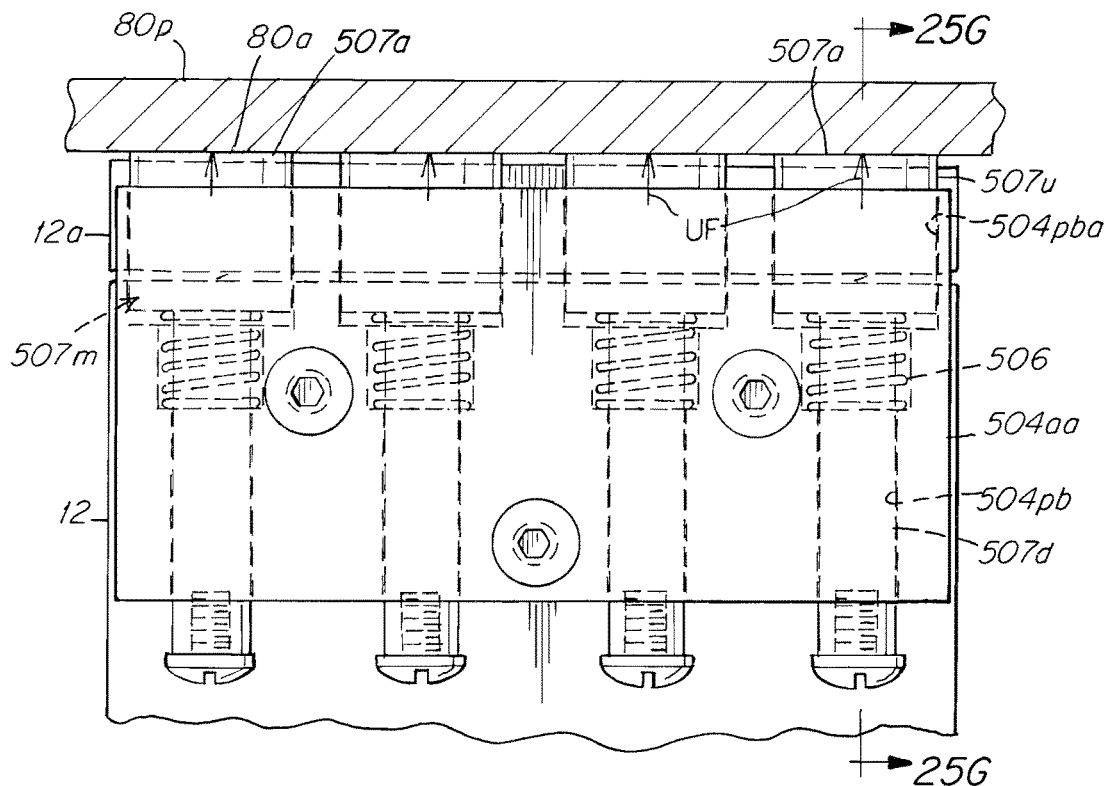
FIG. 25F is a cross-sectional view taken along lines 25F-25F of FIG. 25A.
Figure 25G:
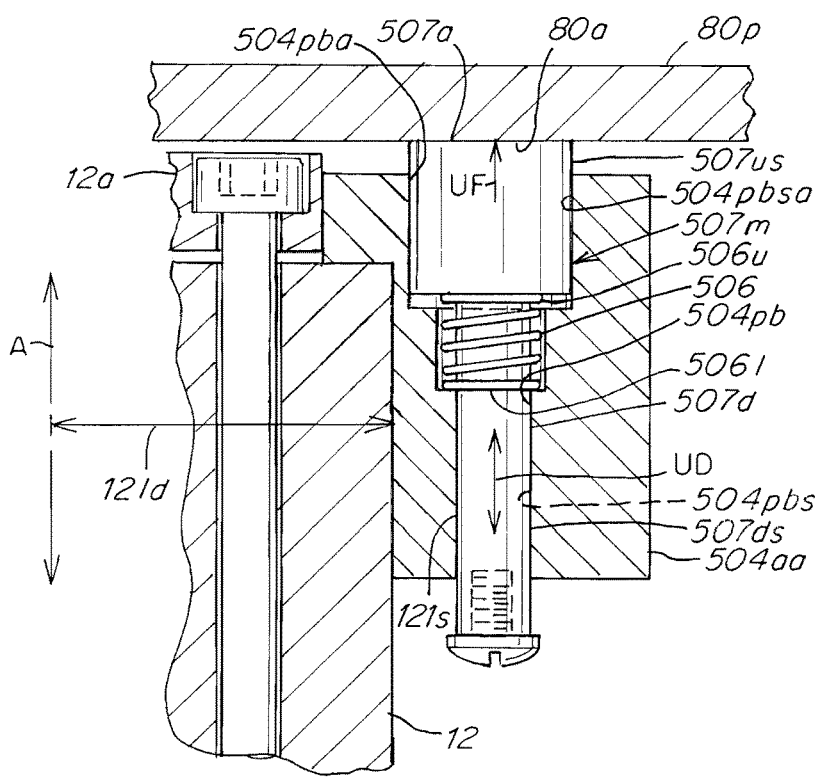
FIG. 25G is a cross-sectional view taken along lines 25G-25G of FIG. 25F.

With reference to FIGS. 25A-25G the actuator 12 of the apparatus 5 has a pair of cooling devices each having a base member 504aa. One of the two cooling devices 500 has cylindrical slots 504pb, 504pba that receive a complementary rod shaped member 507m comprised of an upper rod portion 507u connected to a lower rod portion 507d. The upper 507u and lower 507d portions of rod member 507m, FIGS. 25F, 25G are connected to each other and are both respectively slidably mounted within the complementary slots 504pb, 504pba for upstream and downstream movement UD. The configuration of the upper and lower 507u, 507d rod portions of the rod 507m is adapted so that the outside surfaces 507us, 507ds of the rod 507m are in slidable heat conductive engagement with the inside surfaces 504pbs, 504pbsa of the base member 504aa. The base member 504aa is mounted in heat conductive engagement with the outside surface of actuator housing 12. The base member 504aa is mounted such that it is spaced 12ls a lateral distance 12ld from the axis A of the valve pin 17 and housing 12 whereby the surface 12ls and the base member 504aa are laterally spaced apart from direct heat conductive communication with the heat manifold 20. The rod 507m is mounted such that the rod 507m is spring load biased via spring 506 which exerts upstream directed force UF to urge the distal end surface 507a of the rod 507m into contact heat conductive engagement with a surface 80a of the top clamp plate 80. As in embodiments described above, rods 507, 507m can comprise a heat conductive, fluid containing tube that are comprised of a material that is highly heat conductive such as copper, aluminum, gold, platinum and preferably contain a highly heat conductive fluid such as water, methanol or the like that facilitates the transmission of heat between the actuator housing 12, the proximal member 504, the walls of the tube 507m and the clamp plate 80. As with proximal heat conducting member 502, in such an embodiment where the rods 507, 507m comprise a heat pipe or tube, a distal end surface 507a of the rod or tube engages a surface 80a under compression via a spring load from spring 506 or otherwise.

Similarly with reference to FIGS. 25D, 25E the other cooling device of the FIGS. 25A-25G embodiment comprises a base member 504aa in which a rectangular shaped distal arm or member 502 is slidably mounted in a complementarily shaped slot 504sb. The rectangular arm or member 502 is connected to rods 507 having a lower rod member 507d that are slidably received within complementary slots 504pb. The outside surfaces 507ds of the lower rod 507d portion, FIG. 25E are in slidable heat conductive engagement with the inside surfaces 504*pbs* of the base member 504*aa*. The distal rectangular heat conducting member 502 is slidably received within the complementary receiving aperture 504*sb* such that the outside surface 502*s* of distal arm 502 is in slidable heat conductive engagement with the inside surface 504*is* of the slot 504*sb*. The outside surface 502*s* of the distal arm 502 is also preferably mounted such that surface 502*s* is in slidable heat conductive engagement with the outside surface 12*as* of the upstream actuator member 12*a* and surface 12*ls*. The base member 504*aa* is mounted in heat conductive engagement with the outside surface 12*ls* of actuator housing 12. The slidable mounting rod 507, 507*d* is mounted such that the rod 507 is spring load biased via spring 506 which exerts upstream directed force UF to urge the distal end surface 502*a* of the distal arm 502 into heat conductive engagement with a surface 80*a* of the top clamp plate 80.

FIGS. 25A-25C show an assembly of the FIG. 25A actuator 10 with the pair of cooling devices 500 attached to the actuator housing together with a manifold 20 and a top clamp plate 80. The top clamp plate 80 is formed with a receiving aperture or recess 80*ra* for ready manual insertion of the actuator 10 and cooling device subassembly that enables the actuator to be readily mounted on the preassembled manifold 20 and top clamp plate 80 whereby the actuator 10 is surrounded by the top clamp plate 80 as shown. The aperture or recess 80 ra provided in the top clamp plate 80 also provides ready manual access to remove and replace the actuator 10 without having to disassemble the top clamp plate 80 from the mold 300 or to disassemble any other plates in the system. As shown, the upstream end of the top clamp plate 80 has a recess 80*r* formed in a complementary configuration to a plate 80*p* that is insertable within the recess 80*r* in an upstream position relative to the actuator housing 12 and its attached cooling devices 500 such that the distal end surfaces 502*a* of the heat transmissive rods 507*m* and the heat transmissive block 502, FIGS. 25A-25G, engage the undersurface 80*a* of the clamp plate 80*p* under spring loaded compression. The plate 80*p* is readily attachable to and detachable from the upstream end surface of the clamp plate 80 via screws or bolts 80*t* after the actuator 10 with attached cooling devices 50 has been inserted in the receiving aperture 80*ra* and mounted on the manifold 20.

The invention claimed is:

1. An injection molding apparatus (5) comprising a clamp plate (80), a heated manifold (20), an actuator (10) interconnected to a valve pin (17) having an axis (A), a mold (300) wherein, when assembled, the clamp plate (80) is mounted upstream of the mold (300), the manifold (20) being disposed between the clamp plate and the mold, an actuator (10) comprising a rotor driven by a drive device (174) that consumes electrical energy (187) that generates heat (197), the rotor and drive device being housed within a heat conductive housing (12) in an arrangement such that the heat (197) generated by the electrical energy (187) is communicated to the heat conductive housing (12), the rotor being interconnected to the valve pin (17) in an arrangement such that the valve pin (17) is drivable along the axis (A) between an upstream fully gate open position and a downstream gate closed position, a thermal conductor (500) comprised of a thermally conductive material having first (500*f*) and second (500*s*) heat conductive surfaces disposed between the clamp plate (80) and the heat conductive housing (12) of the actuator, the heat conductive housing (12) being mounted in thermal communication with the first conductive surface (500*f*), the clamp plate (80) being mounted in thermal communication with the second conductive surface (500*s*), the second conductive surface (500*s*) of the thermal conductor being urged into contact with the clamp plate (80) under a spring force (SF) exerted between the actuator (10) and the thermal conductor (500), the heat (197) generated by the electrical energy (187) being conducted from the actuator housing (12) to the clamp plate (80) via conduction of the heat (197) from the first conductive surface (500*f*) to the second conductive surface (500*s*) and contact of the second conductive surface (500*s*) with the clamp plate (80).

2. An apparatus according to claim 1 further comprising a spring (SPR) comprised of a heat conductive material, the spring being disposed in intimate or compressed contact with a heat conductive surface (12*hcs*) of the actuator housing (12) and a heat conductive surface (500*f*) of the thermal conductor (500), the spring (SPR) exerting the spring force (SF) between the actuator (10) and the thermal conductor (500) and conducting heat (197) generated by the electrical energy (187) to the thermal conductor (500).

3. An apparatus according to claim 1 wherein the first conductive surface (500*f*) is adapted to be slidably engaged (SE) with an outside surface (120*s*) of the actuator housing (12) such that heat (197) generated by the electrical energy (187) is conducted between the actuator housing (12) and the thermal conductor (500) via the slidable engagement (SE), the second conductive surface (500*s*) being adjustable in distance toward and away from the actuator housing by sliding movement (SE) of the first conductive surface (500*f*) on the outside surface (12*os*) of the actuator housing.

4. An apparatus according to claim 2 wherein the thermal conductor, spring, actuator, manifold and clamp plate are assembled together in an arrangement wherein the spring is loaded urging the second conductive surface of the thermal conductor into compressed engagement with the clamp plate.

5. An apparatus according to claim 1 further comprising a thermally conductive mount (600) to which the actuator (12) is mounted in thermally conductive contact on an upstream side (USM) of the mount (600), the mount being mounted on a downstream side (DSM) in an arrangement in thermal communication with the manifold (20), the mount being mounted in relation to the manifold such that heat (607) generated by the manifold (20) is conducted from the manifold to the mount, the mount including a wing (610) extending laterally or radially (RADI) away from the mount and having a wing engagement surface (620) that engages a complementary surface (80*cs*) of the clamp plate such that heat (607) conducted from the manifold (20) to the mount (600) is further conducted via the wing mechanism (610) to the clamp plate (80) upon assembly of the mount (600) together with the clamp plate, manifold, mold and actuator into an operating condition where the manifold is brought to elevated operating temperature.

6. An apparatus according to claim 5 wherein the wing (610) is adapted to dispose the wing engagement surface (620) in compressed contact with the complementary surface (80*cs*) of the clamp plate when the clamp plate, manifold and mold are assembled together with the actuator and mount into an operating arrangement and the manifold is brought to elevated operating temperature.

7. An apparatus according to claim 5 wherein the wing (610) is adapted to exert a spring force (SF) that disposes the wing engagement surface (620) in constant compressed contact with the complementary surface (80cs) of the clamp plate.

8. An apparatus according to claim 7 wherein the spring force exerted by the wing is created by deformation of a portion (WP) of the wing,
the mount (600) comprising a highly thermally conductive base (630) to or on which the actuator housing (12) is mounted, the base (630) being disposed between the manifold (20) and the actuator housing (12) receiving heat (607) from the manifold (20) and conducting said heat (607) to the wing (610),
the wing (610) being attached to, formed together with or extending from a lateral surface (635) of the base such that heat (607) generated by the manifold (20) and received by the base (630) is transmitted to the wing (610).

9. An injection molding apparatus comprising a clamp plate (80), a heated manifold (20), an actuator (10) interconnected to a valve pin (17) having an axis (A), a mold (300) wherein, when assembled, the clamp plate (80) is mounted upstream of the mold (30), the manifold (20) being disposed between the clamp plate and the mold,
the actuator (10) comprising a rotor driven by a drive device that consumes electrical energy that generates heat, the rotor and drive device being housed within a heat conductive housing in an arrangement such that the heat generated by the electrical energy is communicated to the heat conductive housing, the rotor being interconnected to the valve pin (17) in an arrangement such that the valve pin (17) is drivable along the axis (A) between an upstream fully gate open position and a downstream gate closed position,
the mold having a mold cavity,
a thermally conductive mount (600) to which the actuator (10) is mounted on an upstream side (USM) of the mount,
the mount being mounted on a downstream side (DSM) in an arrangement in thermal communication with the manifold, the mount being mounted in relation to the manifold such that heat (607) generated by the manifold is conducted from the manifold to the mount,
the mount including a wing (610) extending laterally or radially away (RADI) from the mount and having a wing engagement surface (620) that engages a complementary surface (80cs) of the clamp plate (80) such that heat (607) conducted from the manifold to the mount is further conducted via the wing mechanism to the clamp plate upon assembly of the mount together with the clamp plate, manifold, mold and actuator into an operating condition where the manifold is brought to elevated operating temperature.

10. An apparatus according to claim 9 wherein the wing is adapted to dispose the wing engagement surface in compressed contact with the complementary surface of the clamp plate when the clamp plate, manifold and mold are assembled together with the actuator and mount into an operating arrangement and the manifold is brought to elevated operating temperature.

11. An apparatus according to claim 9 wherein the wing is adapted to exert a spring force that disposes the wing engagement surface in constant compressed contact with the complementary surface of the clamp plate.

12. An apparatus according to claim 11 wherein the spring force exerted by the wing is created by deformation of a portion of the wing.

13. An apparatus according to claim 9 further comprising a thermal conductor comprised of a thermally conductive material having first and second heat conductive surfaces disposed between the clamp plate and the heat conductive housing of the actuator, the heat conductive housing being mounted in thermal communication with the first conductive surface,
the clamp plate being mounted in thermal communication with the second conductive surface,
the second conductive surface of the thermal conductor being urged into contact with the clamp plate under a spring force exerted between the actuator and the thermal conductor,
the heat generated by the electrical energy being conducted from the actuator housing to the clamp plate via conduction of the heat from the first conductive surface to the second conductive surface and contact of the second conductive surface with the clamp plate.

14. An apparatus according to claim 9 further comprising a spring comprised of a heat conductive material, the spring being disposed in intimate or compressed contact with a heat conductive surface of the actuator housing and a heat conductive surface of the thermal conductor, the spring exerting the spring force between the actuator and the thermal conductor and conducting heat generated by the electrical energy to the thermal conductor.

15. An apparatus according to claim 13 wherein the first conductive surface is adapted to be slidably engaged with an outside surface of the actuator housing such that heat is conducted between the actuator housing and the thermal conductor via the slidable engagement, the second conductive surface being adjustable in distance toward and away from the actuator housing by sliding movement of the first conductive surface on the outside surface of the actuator housing.

16. An apparatus according to claim 14 wherein the thermal conductor, spring, actuator, manifold and clamp plate are assembled together in an arrangement wherein the spring is loaded urging the second conductive surface of the thermal conductor into compressed engagement with the clamp plate.

17. A method of performing an injection molding cycle comprising operating an apparatus according to claim 1 to form an injection molded part.

18. An injection molding apparatus (5) comprising a clamp plate (80), a heated manifold (20), an actuator (10) interconnected to a valve pin (17) having an axis (A), a mold (300) and a cooling device (500) that cools the actuator (10) wherein, when assembled, the clamp plate (80) mounted upstream of the mold (30), the manifold (20) being disposed between the clamp plate and the mold, wherein the actuator (10) comprises a housing body (12) that is mounted in thermally conductive contact along the axis (A) to one or more actuator mounts (50, 60, 803) that are mounted downstream in heat conductive communication with or contact with or on the manifold along the axis (A),
the actuator (10) comprising a rotor driven by a drive device (174) that consumes electrical energy (187) that generates heat (197), the rotor and drive device being housed within a heat conductive housing (12) in an arrangement such that the heat (197) generated by the electrical energy (187) is communicated to the heat conductive housing (12), the rotor being interconnected to the valve pin (17) in an arrangement such that the valve pin (17) is drivable along the axis (A) between an upstream fully gate open position and a downstream gate closed position, wherein the cooling device (500) comprises:

a heat transmitter comprising a proximal arm or member (504) comprised of a heat conductive material and a distal arm or member (502) comprised of a thermally conductive material, the distal arm or member (502) being mounted by a spring loadable interconnection or engagement (506) on or to the proximal base or member (504), the distal arm or member (502) having a distal end surface (502a) for engaging the clamp plate (80, 80a) under a spring load and a proximal surface (502b) for transmitting heat from the proximal surface to the distal end surface (502a), the housing body (12) having a lateral surface (12ls) that is spaced laterally (12ld) from the axis (A), the proximal base or member (504) being mounted in heat conductive contact with and to the lateral surface (12ls) such that the proximal base or member (504) is spaced laterally apart from contact with the one or more actuator mounts (50, 60, 803), the clamp plate, the mold (300), the manifold, the actuator and the heat transmitter being assemblable together in an arrangement wherein the spring loadable interconnection 506 is loaded urging the distal end surface (502a) of the distal arm or member (502) into compressed engagement with the clamp plate (80), (80a) at least when the manifold is heated to an elevated operating temperature, the proximal exterior surface (502b) being adapted to be engaged and slidable against the lateral surface (12ls, 12as) of the housing body (12, 12a) of the actuator 10 such that heat (197) generated by the electrical energy (187) is conducted from the actuator housing (12) to the distal end surface (502a) by contact of the proximal exterior surface (502b) of the distal arm or member (502) on the lateral surface (12ls, 12as) of the actuator.

19. The apparatus of claim 18 further comprising one or more heat conductive tubes (517a, 517b, 517c, 517d) containing a heat conductive liquid embedded within one or the other or both of the proximal (504) and distal (502) members.

20. The apparatus of claim 18 wherein the distal (502) and proximal (504) members are heat transmissively interconnected or engaged with each other by heat transmissive rods (507) or tubes (517r) that are intimately engaged with the members (502, 504).

21. The apparatus according claim 18 further comprising one or more hollow heat conductive tubes (517ah) having a cavity containing heat conductive fluid, the one or more tubes (517ah) being embedded within the body of the housing of the actuator (10, 12).

22. The apparatus according to claim 18 wherein the spring loaded interconnection (506) is adapted to urge the distal end surface (502a) of the distal arm or member into a compression of at least 1 pound per square inch (psi) with the clamp plate.

23. The apparatus according to claim 18 wherein the lateral surface (12ls) and the proximal member (504) are laterally spaced apart (12ld) from direct heat conductive communication with the heated manifold (20).

24. The apparatus according to claim 18 wherein the clamp plate is cooled.

25. The apparatus according to claim 18 wherein the cooling device (500) includes a resilient spring (506a) disposed between a body surface (504a) of the proximal base or member (504) and the distal arm or member (502), wherein the clamp plate, the mold, the manifold, the actuator and the cooling device are assembled together in an arrangement wherein the spring (506a) is resiliently compressed urging the distal end surface (502a) of the distal arm or member into compressed engagement with the clamp plate (80a).

26. The apparatus according to claim 18 further comprising a mount (803) separating the actuator housing from direct contact with the manifold, the mount being cooled and having an upstream mounting surface in thermally conductive communication with a complementary mounting surface (12d) of the actuator (10) and a downstream mounting surface in thermally conductive communication with the manifold (20).

27. The apparatus according to claim 18 wherein the actuator 10 is interconnected to a valve pin (17) that is mounted to the manifold and extends through a fluid material feed bore (22) in the manifold (20).

28. The apparatus according to claim 18 wherein the proximal base or member (504) is rigidly attached in thermally conductive contact to the laterally spaced surface 12ls of the housing body (12, 12a).

29. A method of cooling the actuator of the apparatus according to claim 18 comprising assembling the clamp plate, the mold, the manifold, the actuator and the cooling device such that the spring loadable interconnection is loaded urging the distal end surface of the distal arm or member into compressed engagement with the clamp plate.

30. A method of forming an injection molded article comprising forming the article employing the apparatus of claim 18.

31. An injection molding apparatus (5) comprising a clamp plate (80), a heated manifold (20), an actuator (10) interconnected to a valve pin (17) having an axis (A), a mold (300) wherein, when assembled, the clamp plate (80) is mounted upstream of the mold (300), the manifold (20) being disposed between the clamp plate and the mold, an actuator (10) comprising a rotor driven by a drive device (174) that consumes electrical energy (187) that generates heat (197), the rotor and drive device being housed within a heat conductive housing (12) in an arrangement such that the heat (197) generated by the electrical energy (187) is communicated to the heat conductive housing (12), the rotor being interconnected to the valve pin (17) in an arrangement such that the valve pin (17) is drivable along the axis (A) between an upstream fully gate open position and a downstream gate closed position, a thermal conductor (500) comprised of a thermally conductive material having first (500f) and second (500s) heat conductive surfaces disposed between the clamp plate (80) and the heat conductive housing (12) of the actuator, the heat conductive housing (12) being mounted in thermal communication with the first conductive surface (500f) via a spring (SPR) exerting a spring force (SF) between the actuator (10) and the thermal conductor (500) and conducting heat (197) generated by the electrical energy (187) to the thermal conductor (500), the clamp plate (80) being mounted in thermal communication with the second conductive surface (500s), the second conductive surface (500s) of the thermal conductor being urged into contact with the clamp plate (80) under the spring force (SF) exerted between the actuator (10) and the thermal conductor (500), the heat (197) generated by the electrical energy (187) being conducted from the actuator housing (12) to the clamp plate (80) via conduction of the heat (197) from the first conductive surface (500*f*) to the second conductive surface (500*s*) and contact of the second conductive surface (500*s*) with the clamp plate (80).

32. The apparatus of claim 31 wherein the spring (SPR) is disposed in intimate or compressed contact with a heat conductive surface (12*hcs*) of the actuator housing (12) and with the heat conductive surface (500*f*) of the thermal conductor (500).

33. A method of forming an injection molded article comprising forming the article employing the apparatus of claim 31.

34. An injection molding apparatus (5) comprising a clamp plate (80), a heated manifold (20), an actuator (10) interconnected to a valve pin (17) having an axis (A), a mold (300) and a cooling device (500) that cools the actuator (10) wherein, when assembled, the clamp plate (80) mounted upstream of the mold (300), the manifold (20) being disposed between the clamp plate and the mold, wherein the actuator (10) comprises a rotor driven by a drive device that consumes electrical energy that generates heat, the rotor and drive device being housed within a heat conductive housing (12) in an arrangement such that the heat generated by the electrical energy is communicated to the heat conductive housing (12), the rotor being interconnected to the valve pin (17) in an arrangement such that the valve pin (17) is drivable along the axis (A) between an upstream fully gate open position and a downstream gate closed position, the heat conductive housing (12) being mounted in thermally conductive contact along the axis (A) to one or more actuator mounts (50, 60, 803) that are mounted downstream in heat conductive communication with or contact with or on the manifold along the axis (A), wherein the cooling device (500) comprises:

a heat transmitter comprising a proximal arm or member (504) comprised of a heat conductive material and a distal arm or member (502) comprised of a thermally conductive material, the distal arm or member (502) being mounted by a spring loadable interconnection or engagement (506) on or to the proximal base or member (504), the distal arm or member (502) having a distal end surface (502*a*) for engaging the clamp plate (80, 80*a*) under a spring load and a proximal exterior surface (502*b*) for transmitting heat from the proximal surface to the distal end surface (502*a*), the housing body (12) having a surface (12*ls*) that is spaced laterally (12*ld*) from the axis (A), the distal arm or member (502) being mounted such that the proximal exterior surface (502*b*) of the distal arm or member (502) is disposed in thermal communication with the laterally spaced surface (12*ls*) enabling conduction of heat generated by the electrical energy from the heat conductive housing to the distal arm or member (502), the proximal base or member (504) being mounted in heat conductive contact with and to the lateral surface (12*ls*) such that the proximal base or member (504) is spaced laterally apart from contact with the one or more actuator mounts (50, 60, 803) in an arrangement wherein the distal end surface (502*a*) of the distal arm or member (502) is movable through the spring loadable interconnection (506) toward and away from the actuator (10), the clamp plate, the mold (300), the manifold, the actuator and the heat transmitter being assemblable together in an arrangement wherein the spring loadable interconnection (506) is loaded urging the distal end surface (502*a*) of the distal arm or member (502) into compressed engagement with the clamp plate (80, 80*a*) at least when the manifold is heated to an elevated operating temperature.

35. A method of forming an injection molded article comprising forming the article employing the apparatus of claim 34.

36. An injection molding apparatus (5) comprising a clamp plate (80), a heated manifold (20), an actuator (10) interconnected to a valve pin (17) having an axis (A), a mold (300) and a cooling device (500) that cools the actuator (10) wherein, when assembled, the clamp plate (80) is mounted upstream of the mold (300), the manifold (20) being disposed between the clamp plate and the mold (300), wherein the actuator (10) comprises a rotor driven by a drive device that consumes electrical energy that generates heat, the rotor and drive device being housed within a heat conductive housing (12) in an arrangement such that the heat generated by the electrical energy is communicated to the heat conductive housing (12), the rotor being interconnected to the valve pin (17) in an arrangement such that the valve pin (17) is drivable along the axis (A) between an upstream fully gate open position and a downstream gate closed position, wherein the cooling device (500) comprises:

a heat transmitter comprising a proximal base or member (504) comprised of a heat conductive material and a distal arm or member (502) comprised of a thermally conductive material, the distal arm or member (502) being mounted by one or more spring loadable interconnections (506) on or to the proximal base or member (504), the distal arm or member (502) having a distal end surface (502*a*) for engaging the clamp plate (80, 80*a*) under a spring load and a proximal surface (502*b*) for transmitting heat from the proximal surface to the distal end surface (502*a*), the spring or spring loadable interconnection (506) has an amount or degree of mass that renders the spring (506) substantially non-heat conductive between the proximal (504) and distal (502) members, the distal member (502) has a proximal exterior surface (502*b*) that is adapted to be engaged and slidable against a complementary surface (12*ls*,12*as*) of the housing body (12, 12*a*) of the actuator (10) such that heat generated by the electrical energy thermally conducts from the housing body (12, 12*a*) to the distal arm or member (502), the clamp plate, the mold (300), the manifold, the actuator and the heat transmitter being assemblable together in an arrangement wherein the spring loadable interconnection (506) is loaded urging the distal end surface (502*a*) of the distal arm or member (502) into compressed engagement with the clamp plate (80, 80*a*) at least when the manifold is heated to an elevated operating temperature.

37. A method of forming an injection molded article comprising forming the article employing the apparatus of claim 36.

38. An injection molding apparatus (5) comprising a clamp plate (80), a heated manifold (20), an actuator (10), a mold (300) and a cooling device (500) that cools the actuator (10), wherein when assembled the clamp plate (80) and the mold (300) are interconnected and spaced apart from each other, the manifold (20) is disposed between the clamp plate and the mold and the actuator (10) is mounted in thermally conductive communication with the manifold (20), wherein the actuator (10) comprises a rotor driven by a drive device that consumes electrical energy that generates heat, the rotor and drive device being housed within a heat conductive housing (12) in an arrangement such that the heat generated by the electrical energy is communicated to the heat conductive housing (12), the rotor being interconnected to the valve pin (17) in an arrangement such that the valve pin (17) is drivable along the axis (A) between an upstream fully gate open position and a downstream gate closed position, the housing (12, 12*a*) being mounted in thermal communication with the manifold (20), wherein the cooling device (500) comprises:

a heat transmitter comprising a distal arm or member (502) and a proximal base or member (504), the distal arm or member (502) being mounted by a spring loadable interconnection or engagement (506) to or with the proximal base or member (504), the distal arm or member (502) being comprised of a thermally conductive material having a distal end surface (502*a*) for engaging the clamp plate (80, 80*a*) under a spring load, the proximal base or member (504) being mounted to the housing body (12) of the actuator (10) in an arrangement wherein the distal end surface (502*a*) of the distal arm or member (502) is movable through the spring loadable interconnection (506) toward and away from the actuator (10), wherein the spring or spring loadable interconnection (506) has engagement surfaces (506*es*) that engage against complementary opposing engagement surfaces (504*us*, 502*us*) of proximal (504) and distal (502) members having a selected area of engagement that renders spring (506) substantially non-heat conductive between the proximal and distal arms or members, the distal member (502) has a proximal exterior surface (502*b*) that is adapted to be engaged and slidable against a complementary surface (12*ls*, 12*as*) of the housing body (12, 12*a*) of the actuator (10) such that heat generated by the electrical energy thermally conducts from the housing body (12, 12*a*) to the distal arm or member (502), the clamp plate, the mold (300), the manifold, the actuator and the heat transmitter being assemblable together in an arrangement wherein the proximal surface (502*b*) slides along the complementary surface (12*ls*, 12*as*) and the spring loadable interconnection (506) is loaded urging the distal end surface (502*a*) of the distal arm or member (502) into compressed engagement with the clamp plate (80, 80*a*) at least when the manifold is heated to an elevated operating temperature.

39. A method of forming an injection molded article comprising forming the article employing the apparatus of claim 38.

\* \* \* \* \*